United States Patent
Kim et al.

(10) Patent No.: US 11,206,401 B2
(45) Date of Patent: Dec. 21, 2021

(54) VIDEO ENCODING METHOD AND DEVICE AND VIDEO DECODING METHOD AND DEVICE

(71) Applicant: SAMSUNG ELECTRONICS CO., LTD., Suwon-si (KR)

(72) Inventors: Jae-hwan Kim, Yongin-si (KR); Jong-seok Lee, Suwon-si (KR); Young-o Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 704 days.

(21) Appl. No.: 16/077,181

(22) PCT Filed: Feb. 10, 2017

(86) PCT No.: PCT/KR2017/001467
§ 371 (c)(1),
(2) Date: Aug. 10, 2018

(87) PCT Pub. No.: WO2017/138761
PCT Pub. Date: Aug. 17, 2017

(65) Prior Publication Data
US 2021/0211668 A1    Jul. 8, 2021

Related U.S. Application Data

(60) Provisional application No. 62/293,964, filed on Feb. 11, 2016.

(51) Int. Cl.
*H04N 19/124* (2014.01)
*H04N 19/136* (2014.01)
(Continued)

(52) U.S. Cl.
CPC ......... *H04N 19/124* (2014.11); *H04N 19/136* (2014.11); *H04N 19/176* (2014.11); *H04N 19/184* (2014.11)

(58) Field of Classification Search
CPC .. H04N 19/124; H04N 19/184; H04N 19/136; H04N 19/176
See application file for complete search history.

(56) References Cited

U.S. PATENT DOCUMENTS 9,445,100 B2    9/2016   Oh et al.
9,571,828 B2    2/2017   Okawa et al.
(Continued)

FOREIGN PATENT DOCUMENTS

EP    2 445 217 A1    4/2012
JP    2013-138361 A    7/2013
(Continued)

OTHER PUBLICATIONS

Communication dated May 15, 2017 by the International Searching Authority in counterpart International Patent Application No. PCT/KR2017/001467. (PCT/ISA/210).
(Continued)

*Primary Examiner* — Joseph Suh
(74) *Attorney, Agent, or Firm* — Sughrue Mion, PLLC

(57) ABSTRACT

Provided is an image encoding or decoding method and device capable of increasing image compression efficiency by determining a differential quantization parameter of a current block based on statistical information of original samples of the current block or samples reconstructed previously to the current block. The image decoding method includes receiving a bitstream, obtaining a predicted quantization parameter value and a quantized transformation coefficient of a current block from the bitstream, obtaining a differential quantization parameter of the current block based on statistical information of samples reconstructed previously to the current block, obtaining a quantization parameter of the current block based on the differential quantization parameter of the current block and the predicted quantization parameter value, and inversely quantiz-
(Continued)

AVERAGE OF PREVIOUSLY RECONSTRUCTED SAMPLES < FIRST THRESHOLD VALUE — 500

| Luma L range | dQP |
|---|---|
| L < TH1 | Qa1 |
| TH1 ≤ L < TH2 | Qa2 |
| TH2 ≤ L < TH3 | Qa3 |
| TH3 ≤ L < TH4 | Qa4 |
| TH4 ≤ L < TH5 | Qa5 |
| TH5 ≤ L < TH6 | Qa6 |
| TH6 <= L < TH7 | Qa7 |
| TH7 <= L < TH8 | Qa8 |
| TH8 <= L < TH9 | Qa9 |
| L >= TH9 | Qa10 |

(510, 520 braces)

AVERAGE OF PREVIOUSLY RECONSTRUCTED SAMPLES >= FIRST THRESHOLD VALUE — 560

| Luma L range | dQP |
|---|---|
| L < TH1 | Qb1 |
| TH1 ≤ L < TH2 | Qb2 |
| TH2 ≤ L < TH3 | Qb3 |
| TH3 ≤ L < TH4 | Qb4 |
| TH4 ≤ L < TH5 | Qb5 |
| TH5 ≤ L < TH6 | Qb6 |
| TH6 <= L < TH7 | Qb7 |
| TH7 <= L < TH8 | Qb8 |
| TH8 <= L < TH9 | Qb9 |
| L >= TH9 | Qb10 |

(570, 580 braces)

ing the quantized transformation coefficient of the current block based on the quantization parameter of the current block.

9 Claims, 23 Drawing Sheets

(51) Int. Cl.
*H04N 19/176* (2014.01)
*H04N 19/184* (2014.01)

(56) References Cited

U.S. PATENT DOCUMENTS

| | | |
|---|---|---|
| 2008/0187042 A1 | 8/2008 | Jasinschi |
| 2012/0093427 A1 | 4/2012 | Itani et al. |
| 2013/0170545 A1* | 7/2013 | Okawa ............... H04N 19/124 |
| | | 375/240.04 |
| 2013/0188692 A1* | 7/2013 | Chiu ............... H04N 19/154 |
| | | 375/240.03 |
| 2013/0195178 A1 | 8/2013 | Price et al. |
| 2013/0287103 A1 | 10/2013 | Seregin et al. |
| 2014/0198126 A1* | 7/2014 | Parmar ............ H04N 1/40087 |
| | | 345/597 |
| 2014/0286398 A1 | 9/2014 | Chono et al. |
| 2014/0286402 A1 | 9/2014 | Nishitani et al. |
| 2015/0071348 A1* | 3/2015 | Oh ................. H04N 19/124 |
| | | 375/240.03 |
| 2015/0229933 A1* | 8/2015 | Guo ................. G06T 9/00 |
| | | 375/240.02 |
| 2015/0281693 A1* | 10/2015 | Okawa ............. H04N 19/176 |
| | | 375/240.03 |
| 2016/0227225 A1* | 8/2016 | Zou ................. H04N 19/96 |
| 2017/0127062 A1 | 5/2017 | Zhao et al. |
| 2019/0306557 A1* | 10/2019 | Miller ............. H04N 21/2187 |

FOREIGN PATENT DOCUMENTS

| | | |
|---|---|---|
| KR | 10-2012-0030537 A | 3/2012 |
| KR | 10-2014-0088099 A | 7/2014 |
| KR | 10-2014-0110008 A | 9/2014 |
| WO | 2011/043793 A1 | 4/2011 |
| WO | 2013/075589 A1 | 5/2013 |
| WO | 2013/112814 A1 | 8/2013 |
| WO | 2016/011796 A1 | 1/2016 |

OTHER PUBLICATIONS

Communication dated May 15, 2017 by the International Searching Authority in counterpart International Patent Application No. PCT/KR2017/001467. (PCT/ISA/237).

Communication dated Oct. 24, 2018 by the European Patent Office in counterpart European Patent Application No. 17750453.7.

* cited by examiner

FIG. 6

AVERAGE OF PREVIOUSLY RECONSTRUCTED SAMPLES < FIRST THRESHOLD VALUE
VARIANCE OF PREVIOUSLY RECONSTRUCTED SAMPLES < THIRD THRESHOLD VALUE ⟋600

| Luma L range | dQP |
|---|---|
| L < TH1 | Qc1 |
| TH1 ≤ L < TH2 | Qc2 |
| TH2 ≤ L < TH3 | Qc3 |
| TH3 ≤ L < TH4 | Qc4 |
| TH4 ≤ L < TH5 | Qc5 |
| TH5 ≤ L < TH6 | Qc6 |
| TH6 <= L < TH7 | Qc7 |
| TH7 <= L < TH8 | Qc8 |
| TH8 <= L < TH9 | Qc9 |
| L >= TH9 | Qc10 |

}601 (rows 1-3)
}602 (rows 4-10)

AVERAGE OF PREVIOUSLY RECONSTRUCTED SAMPLES >= FIRST THRESHOLD VALUE
VARIANCE OF PREVIOUSLY RECONSTRUCTED SAMPLES < THIRD THRESHOLD VALUE ⟋610

| Luma L range | dQP |
|---|---|
| L < TH1 | Qd1 |
| TH1 ≤ L < TH2 | Qd2 |
| TH2 ≤ L < TH3 | Qd3 |
| TH3 ≤ L < TH4 | Qd4 |
| TH4 ≤ L < TH5 | Qd5 |
| TH5 ≤ L < TH6 | Qd6 |
| TH6 <= L < TH7 | Qd7 |
| TH7 <= L < TH8 | Qd8 |
| TH8 <= L < TH9 | Qd9 |
| L >= TH9 | Qd10 |

}611 (rows 1-3)
}612 (rows 4-10)

AVERAGE OF PREVIOUSLY RECONSTRUCTED SAMPLES < FIRST THRESHOLD VALUE
VARIANCE OF PREVIOUSLY RECONSTRUCTED SAMPLES >= THIRD THRESHOLD VALUE ⟋620

| Luma L range | dQP |
|---|---|
| L < TH1 | Qe1 |
| TH1 ≤ L < TH2 | Qe2 |
| TH2 ≤ L < TH3 | Qe3 |
| TH3 ≤ L < TH4 | Qe4 |
| TH4 ≤ L < TH5 | Qe5 |
| TH5 ≤ L < TH6 | Qe6 |
| TH6 <= L < TH7 | Qe7 |
| TH7 <= L < TH8 | Qe8 |
| TH8 <= L < TH9 | Qe9 |
| L >= TH9 | Qe10 |

}621 (rows 1-3)
}622 (rows 4-10)

AVERAGE OF PREVIOUSLY RECONSTRUCTED SAMPLES >= FIRST THRESHOLD VALUE
VARIANCE OF PREVIOUSLY RECONSTRUCTED SAMPLES >= THIRD THRESHOLD VALUE ⟋630

| Luma L range | dQP |
|---|---|
| L < TH1 | Qf1 |
| TH1 ≤ L < TH2 | Qf2 |
| TH2 ≤ L < TH3 | Qf3 |
| TH3 ≤ L < TH4 | Qf4 |
| TH4 ≤ L < TH5 | Qf5 |
| TH5 ≤ L < TH6 | Qf6 |
| TH6 <= L < TH7 | Qf7 |
| TH7 <= L < TH8 | Qf8 |
| TH8 <= L < TH9 | Qf9 |
| L >= TH9 | Qf10 |

}631 (rows 1-3)
}632 (rows 4-10)

FIG. 7

| | SECOND STATISTICAL INFORMATION OF PREVIOUSLY RECONSTRUCTED SAMPLES < FIRST THRESHOLD VALUE | SECOND STATISTICAL INFORMATION OF PREVIOUSLY RECONSTRUCTED SAMPLES >= FIRST THRESHOLD VALUE |
|---|---|---|
| THIRD STATISTICAL INFORMATION OF PREVIOUSLY RECONSTRUCTED SAMPLES < THIRD THRESHOLD VALUE | SIZE OF DIFFERENTIAL QUANTIZATION PARAMETER IN LOW LUMA RANGE: A<br>SIZE OF DIFFERENTIAL QUANTIZATION PARAMETER IN HIGH LUMA RANGE: E | SIZE OF DIFFERENTIAL QUANTIZATION PARAMETER IN LOW LUMA RANGE: B<br>SIZE OF DIFFERENTIAL QUANTIZATION PARAMETER IN HIGH LUMA RANGE: F |
| THIRD STATISTICAL INFORMATION OF PREVIOUSLY RECONSTRUCTED SAMPLES >= THIRD THRESHOLD VALUE | SIZE OF DIFFERENTIAL QUANTIZATION PARAMETER IN LOW LUMA RANGE: C<br>SIZE OF DIFFERENTIAL QUANTIZATION PARAMETER IN HIGH LUMA RANGE: G | SIZE OF DIFFERENTIAL QUANTIZATION PARAMETER IN LOW LUMA RANGE: D<br>SIZE OF DIFFERENTIAL QUANTIZATION PARAMETER IN HIGH LUMA RANGE: H |

FIG. 12
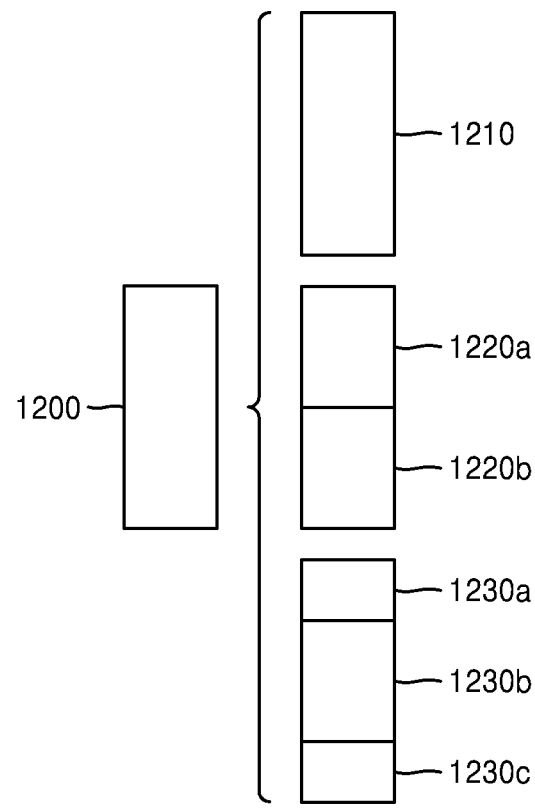
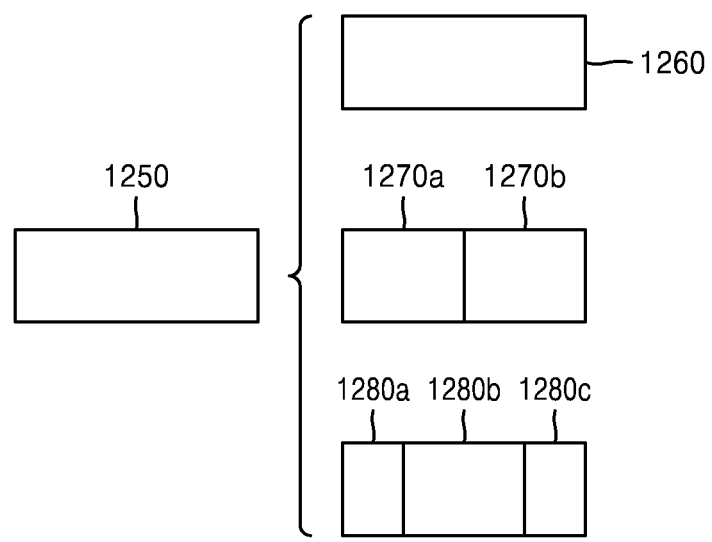

FIG. 21

| BLOCK SHAPE DEPTH | 0: SQUARE | 1: NS_VER | 2: NS_HOR |
|---|---|---|---|
| DEPTH D | 2100 □ | 2110 □ | 2120 □ |
| DEPTH D+1 | 2102 □ | 2112 □ | 2122 □ |
| DEPTH D+2 | 2104 □ | 2114 □ | 2124 □ |
| ... | ... | ... | ... |

VIDEO ENCODING METHOD AND DEVICE AND VIDEO DECODING METHOD AND DEVICE

TECHNICAL FIELD

The present disclosure relates to an image encoding or decoding method and device, and more particularly, to an image encoding or decoding method and device capable of increasing image compression efficiency by determining a differential quantization parameter of a current block based on statistical information of original samples of the current block or samples reconstructed previously to the current block.

BACKGROUND ART

Hardware capable of reproducing and storing high-resolution or high-definition image content has been developed, and ultra-high-definition (UHD) technology enables reproduction, transmission, and storage of up to 8,000,000 pixels on a single screen. However, the UHD technology has a low light reproducibility. The brightness of a scene viewable to human eyes broadly ranges from 0 nit (black) to 40,000 nits (where nit is a unit of brightness and one nit indicates the brightness of one candle in a 1 $m^2$ space), but brightness over 100 nits was not easily expressed on a screen due to technical limitations. A technology capable of supplementing the technical limitations is high dynamic range (HDR) technology. Using the HDR technology, a dark place may be displayed darker and a bright place may be displayed brighter.

A bit depth indicates the number of bits used in a pixel to display a color, and the HDR technology may be implemented by increasing bit depths. Currently, a color may be displayed using a bit depth of 10 or more bits. Since the number of bits for displaying a color is increased, demands for a codec capable of efficiently encoding or decoding image content has also increased.

Human eyes have different perception characteristics depending on frequencies. In general, human eyes easily perceive deterioration at low and medium frequencies but do not easily perceive deterioration at high frequencies. However, in some cases, human eyes easily perceive deterioration at high frequencies but do not easily perceive deterioration at low and medium frequencies on an HDR image. Furthermore, when the same quantization step is determined for all cases, image characteristics are not appropriately reflected, and thus a certain image may have serious deterioration.

DESCRIPTION OF EMBODIMENTS

Technical Problem

Provided is an encoding or decoding method and device for obtaining a differential quantization parameter of a current block based on statistical information of the current block or samples reconstructed previously to the current block.

Solution to Problem

According to an aspect of the present disclosure, an image decoding method includes receiving a bitstream, obtaining a predicted quantization parameter value and a quantized transformation coefficient of a current block from the bitstream, obtaining a differential quantization parameter of the current block based on statistical information of samples reconstructed previously to the current block, obtaining a quantization parameter of the current block based on the differential quantization parameter of the current block and the predicted quantization parameter value, and inversely quantizing the quantized transformation coefficient of the current block based on the quantization parameter of the current block.

The obtaining of the differential quantization parameter of the current block may include obtaining first statistical information of the previously reconstructed samples, the first statistical information being used to obtain the differential quantization parameter of the current block, obtaining a plurality of predetermined first differential quantization parameters respectively corresponding to a plurality of sample ranges, and obtaining the differential quantization parameter of the current block corresponding to the first statistical information of the previously reconstructed samples, among the plurality of first differential quantization parameters. The first statistical information of the previously reconstructed samples may include at least one of an average, a median, a maximum value, and a minimum value of the previously reconstructed samples.

The obtaining of the differential quantization parameter of the current block may further include obtaining a plurality of second differential quantization parameters by changing some of the plurality of first differential quantization parameters when second statistical information of the previously reconstructed samples is lower than a first threshold value, obtaining a plurality of third differential quantization parameters by changing some of the plurality of first differential quantization parameters when the second statistical information of the previously reconstructed samples is higher than or equal to the first threshold value, and obtaining the differential quantization parameter of the current block corresponding to the first statistical information of the previously reconstructed samples, among the plurality of second or third differential quantization parameters. The plurality of second differential quantization parameters corresponding to a sample range lower than a second threshold value may be lower than or equal to the plurality of first differential quantization parameters corresponding to the sample range lower than the second threshold value, the plurality of third differential quantization parameters corresponding to a sample range higher than or equal to the second threshold value may be lower than or equal to the plurality of first differential quantization parameters corresponding to the sample range higher than or equal to the second threshold value, and the second statistical information of the previously reconstructed samples may include at least one of an average, a median, a maximum value, and a minimum value of the previously reconstructed samples.

The obtaining of the differential quantization parameter of the current block may further include obtaining a plurality of fourth differential quantization parameters by changing some of the plurality of first differential quantization parameters when second statistical information of the previously reconstructed samples is lower than a first threshold value and third statistical information of the previously reconstructed samples is lower than a third threshold value, obtaining a plurality of fifth differential quantization parameters by changing some of the plurality of first differential quantization parameters when the second statistical information of the previously reconstructed samples is higher than or equal to the first threshold value and the third statistical information of the previously reconstructed samples is lower than the third threshold value, obtaining a plurality of sixth differential quantization parameters by changing some of the plurality of first differential quantization parameters when the second statistical information of the previously reconstructed samples is lower than the first threshold value and the third statistical information of the previously reconstructed samples is higher than or equal to the third threshold value, obtaining a plurality of seventh differential quantization parameters by changing some of the plurality of first differential quantization parameters when the second statistical information of the previously reconstructed samples is higher than or equal to the first threshold value and the third statistical information of the previously reconstructed samples is higher than or equal to the third threshold value, and obtaining the differential quantization parameter of the current block corresponding to the first statistical information of the previously reconstructed samples, among the plurality of fourth, fifth, sixth, or seventh differential quantization parameters. The pluralities of fourth and sixth differential quantization parameters corresponding to a sample range lower than a second threshold value may be lower than or equal to the plurality of first differential quantization parameters corresponding to the sample range lower than the second threshold value, the pluralities of fifth and seventh differential quantization parameters corresponding to a sample range higher than or equal to the second threshold value may be lower than or equal to the plurality of first differential quantization parameters corresponding to the sample range higher than or equal to the second threshold value, the second statistical information may include at least one of an average, a median, a maximum value, and a minimum value of the previously reconstructed samples, and the third statistical information may include at least one of a variance and a standard deviation of the previously reconstructed samples.

The plurality of fourth differential quantization parameters corresponding to the sample range lower than the second threshold value may be lower than or equal to the pluralities of fifth, sixth, and seventh differential quantization parameters corresponding to the sample range lower than the second threshold value, and the plurality of fifth differential quantization parameters corresponding to the sample range higher than or equal to the second threshold value may be lower than or equal to the pluralities of fourth, sixth, and seventh differential quantization parameters corresponding to the sample range higher than or equal to the second threshold value.

According to another aspect of the present disclosure, an image decoding device includes a receiver configured to receive a bitstream, and a decoder configured to obtain a predicted quantization parameter value and a quantized transformation coefficient of a current block from the bitstream, obtain a differential quantization parameter of the current block based on statistical information of samples reconstructed previously to the current block, obtain a quantization parameter of the current block based on the differential quantization parameter of the current block and the predicted quantization parameter value, and inversely quantize the quantized transformation coefficient of the current block based on the quantization parameter of the current block.

The decoder may be further configured to obtain first statistical information of the previously reconstructed samples, the first statistical information being used to obtain the differential quantization parameter of the current block, obtain a plurality of predetermined first differential quantization parameters respectively corresponding to a plurality of sample ranges, and obtain the differential quantization parameter of the current block corresponding to the first statistical information of the previously reconstructed samples, among the plurality of first differential quantization parameters. The first statistical information of the previously reconstructed samples may include at least one of an average, a median, a maximum value, and a minimum value of the previously reconstructed samples.

The decoder may be further configured to obtain a plurality of second differential quantization parameters by changing some of the plurality of first differential quantization parameters when second statistical information of the previously reconstructed samples is lower than a first threshold value, obtain a plurality of third differential quantization parameters by changing some of the plurality of first differential quantization parameters when the second statistical information of the previously reconstructed samples is higher than or equal to the first threshold value, and obtain the differential quantization parameter of the current block corresponding to the first statistical information of the previously reconstructed samples, among the plurality of second or third differential quantization parameters. The plurality of second differential quantization parameters corresponding to a sample range lower than a second threshold value may be lower than or equal to the plurality of first differential quantization parameters corresponding to the sample range lower than the second threshold value, the plurality of third differential quantization parameters corresponding to a sample range higher than or equal to the second threshold value may be lower than or equal to the plurality of first differential quantization parameters corresponding to the sample range higher than or equal to the second threshold value, and the second statistical information of the previously reconstructed samples may include at least one of an average, a median, a maximum value, and a minimum value of the previously reconstructed samples.

The decoder may be further configured to obtain a plurality of fourth differential quantization parameters by changing some of the plurality of first differential quantization parameters when second statistical information of the previously reconstructed samples is lower than a first threshold value and third statistical information of the previously reconstructed samples is lower than a third threshold value, obtain a plurality of fifth differential quantization parameters by changing some of the plurality of first differential quantization parameters when the second statistical information of the previously reconstructed samples is higher than or equal to the first threshold value and the third statistical information of the previously reconstructed samples is lower than the third threshold value, obtain a plurality of sixth differential quantization parameters by changing some of the plurality of first differential quantization parameters when the second statistical information of the previously reconstructed samples is lower than the first threshold value and the third statistical information of the previously reconstructed samples is higher than or equal to the third threshold value, obtain a plurality of seventh differential quantization parameters by changing some of the plurality of first differential quantization parameters when the second statistical information of the previously reconstructed samples is higher than or equal to the first threshold value and the third statistical information of the previously reconstructed samples is higher than or equal to the third threshold value, and obtain the differential quantization parameter of the current block corresponding to the first statistical information of the previously reconstructed samples, among the plurality of fourth, fifth, sixth, or seventh differential quantization parameters. The pluralities of fourth and sixth differential quantization parameters corresponding to a sample range lower than a second threshold value may be lower than or equal to the plurality of first differential quantization parameters corresponding to the sample range lower than the second threshold value, the pluralities of fifth and seventh differential quantization parameters corresponding to a sample range higher than or equal to the second threshold value may be lower than or equal to the plurality of first differential quantization parameters corresponding to the sample range higher than or equal to the second threshold value, the second statistical information may include at least one of an average, a median, a maximum value, and a minimum value of the previously reconstructed samples, and the third statistical information may include at least one of a variance and a standard deviation of the previously reconstructed samples.

The plurality of fourth differential quantization parameters corresponding to the sample range lower than the second threshold value may be lower than or equal to the pluralities of fifth to seventh differential quantization parameters corresponding to the sample range lower than the second threshold value, and the plurality of fifth differential quantization parameters corresponding to the sample range higher than or equal to the second threshold value may be lower than or equal to the pluralities of fourth, sixth, and seventh differential quantization parameters corresponding to the sample range higher than or equal to the second threshold value.

According to another aspect of the present disclosure, an image encoding method includes obtaining a predicted quantization parameter value of a current block, obtaining first statistical information of samples reconstructed previously to the current block, obtaining a plurality of predetermined first differential quantization parameters respectively corresponding to a plurality of sample ranges, obtaining a differential quantization parameter of the current block corresponding to the first statistical information of the previously reconstructed samples, among the plurality of first differential quantization parameters, quantizing a transformation coefficient of the current block based on the predicted quantization parameter value and the differential quantization parameter of the current block, and generating a bitstream based on the predicted quantization parameter value and the quantized transformation coefficient.

According to another aspect of the present disclosure, an image encoding device includes an encoder configured to obtain a predicted quantization parameter value of a current block, obtain first statistical information of samples reconstructed previously to the current block, obtain a plurality of predetermined first differential quantization parameters respectively corresponding to a plurality of sample ranges, obtain a differential quantization parameter of the current block corresponding to the first statistical information of the previously reconstructed samples, among the plurality of first differential quantization parameters, and quantize a transformation coefficient of the current block based on the predicted quantization parameter value and the differential quantization parameter of the current block, and a bitstream generator configured to generate a bitstream based on the predicted quantization parameter value and the quantized transformation coefficient.

According to another aspect of the present disclosure, an image encoding method includes obtaining a predicted quantization parameter value of a current block, obtaining a plurality of differential quantization parameters respectively corresponding to a plurality of sample ranges, based on a result of comparing second statistical information of original samples of the current block to a first threshold value, obtaining a differential quantization parameter of the current block corresponding to first statistical information of the original samples of the current block, among the plurality of differential quantization parameters, quantizing a transformation coefficient of the current block based on the predicted quantization parameter value and the differential quantization parameter of the current block, and generating a bitstream based on the predicted quantization parameter value, the differential quantization parameter of the current block, and the quantized transformation coefficient of the current block.

BRIEF DESCRIPTION OF DRAWINGS

FIG. 6 illustrates tables used by the image decoding device or the image encoding device to obtain the differential quantization parameter of the current block, according to an embodiment.

FIG. 7 illustrates a table comparatively showing sizes of differential quantization parameters of the current block based on statistical information of the previously reconstructed samples, according to an embodiment.

FIG. 12 illustrates a process of determining at least one coding unit when a coding unit having a non-square shape is split, according to an embodiment.

FIG. 21 illustrates a process of determining a depth of a coding unit when a shape and size of the coding unit changes, when a plurality of coding units are determined when the coding unit is recursively split, according to an embodiment.

MODE OF DISCLOSURE

Figure 1:
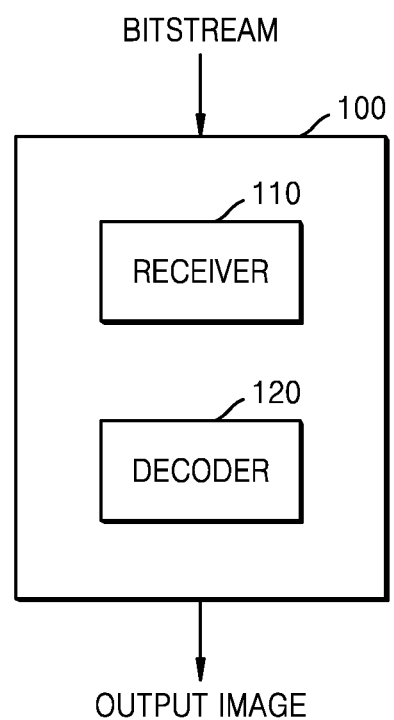
FIG. 1 is a block diagram of an image decoding device according to an embodiment.

Advantages and features of one or more embodiments of the present disclosure and methods of accomplishing the same may be understood more readily by reference to the following detailed description of the embodiments and the accompanying drawings. In this regard, the present embodiments may have different forms and should not be construed as being limited to the descriptions set forth herein. Rather, these embodiments are provided so that this disclosure will be thorough and complete and will fully convey the concept of the present embodiments to one of ordinary skill in the art.

Hereinafter, the terms used in the specification will be briefly defined, and the embodiments will be described in detail.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the specification.

An expression used in the singular encompasses the expression of the plural, unless it has a clearly different meaning in the context.

When a part "includes" or "comprises" an element, unless there is a particular description contrary thereto, the part may further include other elements, not excluding the other elements.

Also, the term "unit" in the embodiments of the present disclosure means a software component or hardware component such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units".

Hereinafter, an "image" may denote a static image such as a still image of a video or a dynamic image such as a moving image, i.e., a video itself.

Hereinafter, a "sample" is data allocated to a sampling location of an image and may mean data that is a processing target. For example, pixel values in an image of a spatial domain or transformation coefficients on a transformation domain may be samples. A unit including at least one sample may be defined as a block.

Reference will now be made in detail to embodiments, examples of which are illustrated in the accompanying drawings. In the following description, well-known functions or constructions are not described in detail so as not to obscure the embodiments with unnecessary detail.

An image encoding device, an image decoding device, an image encoding method, and an image decoding method will be described below with reference to FIGS. 1 to 24 according to an embodiment. An encoding or decoding method and device using image prediction according to an embodiment will be described with reference to FIGS. 1 to 10, and a method of determining a data unit of an image according to an embodiment will be described with reference to FIGS. 11 to 24.

A method and device capable of efficiently encoding or decoding an image by determining a differential quantization parameter based on statistical information of samples, according to an embodiment of the present disclosure, will now be described in detail with reference to FIGS. 1 to 10.

FIG. 1 is a block diagram of an image decoding device 100 according to an embodiment.

The image decoding device 100 may include a receiver 110 and a decoder 120. The receiver 110 may receive a bitstream. The bitstream includes information about encoding of an image by an image encoding device 800 to be described below. The bitstream may be received from the image encoding device 800. The image encoding device 800 may be connected to the image decoding device 100 in a wired or wireless manner, and the receiver 110 may receive the bitstream in a wired or wireless manner. The decoder 120 may obtain the information from the received bitstream and reconstruct the image. Operation of the decoder 120 will now be described in detail with reference to FIG. 2.

Figure 2:
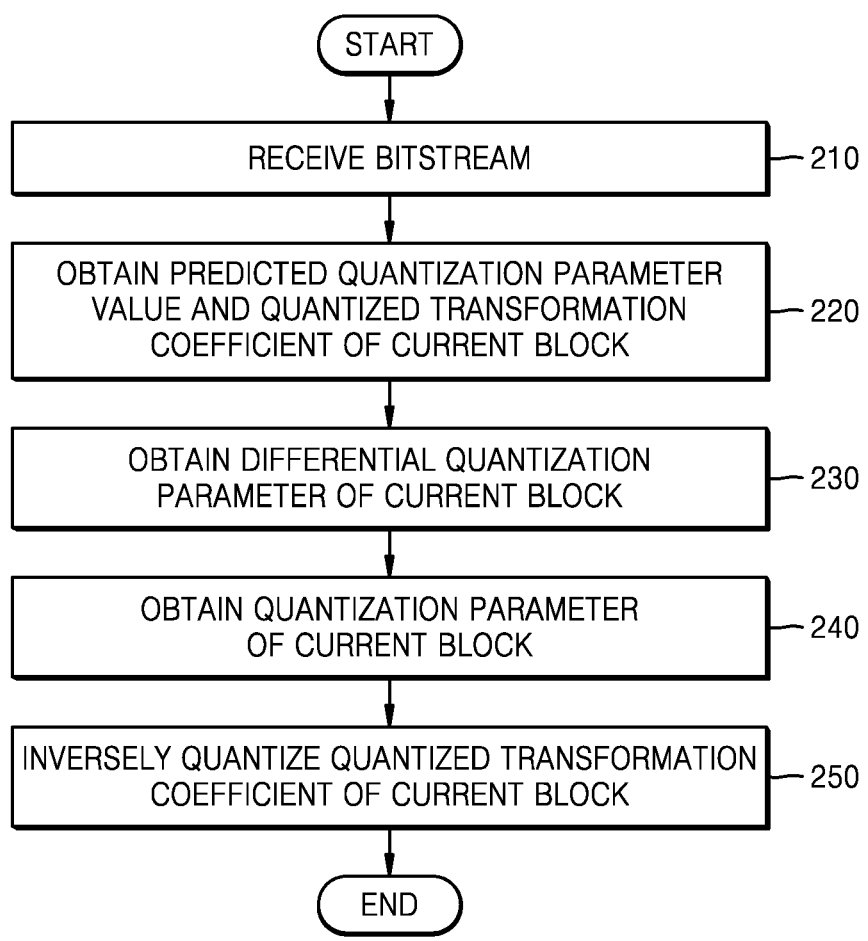
FIG. 2 is a flowchart of an image decoding method according to an embodiment.

FIG. 2 is a flowchart of an image decoding method according to an embodiment.

The receiver 110 according to an embodiment of the present disclosure may perform an operation 210 for receiving a bitstream. The decoder 120 may perform an operation 220 for obtaining a predicted quantization parameter value and a quantized transformation coefficient of a current block from the bitstream. The decoder 120 may perform an operation 230 for obtaining a differential quantization parameter of the current block based on statistical information of samples reconstructed previously to the current block. The decoder 120 may perform an operation 240 for obtaining a quantization parameter of the current block based on the differential quantization parameter of the current block and the predicted quantization parameter value. The decoder 120 may perform an operation 250 for inversely quantizing the quantized transformation coefficient of the current block based on the quantization parameter of the current block.

An image may be partitioned into largest coding units. The size of the largest coding units may be determined based on information obtained from the bitstream. The largest coding units may have equal-sized square shapes. However, the largest coding units are not limited thereto. The largest coding unit may be hierarchically partitioned into coding units based on partition information obtained from the bitstream. The sizes of the coding units may be smaller than or equal to the size of the largest coding unit. For example, when the partition information indicates that the largest coding unit is not partitioned, the coding unit has the same size as the largest coding unit. When the partition information indicates that the largest coding unit is partitioned, the largest coding unit may be partitioned into coding units of a deeper depth. When the partition information of the coding unit of the deeper depth indicates that the coding unit is partitioned, the coding unit of the deeper depth may be partitioned into smaller coding units. However, the partitioning of the image is not limited thereto and the largest coding unit may be the same as the coding unit. The partitioning of the coding unit will be described in detail below with reference to FIGS. 11 to 24.

The coding unit may be partitioned into prediction units for prediction of the image. The size of the prediction unit may be equal to or smaller than the size of the coding unit. The coding unit may also be partitioned into transformation units for transformation of the image. The size of the transformation unit may be equal to or smaller than the size of the coding unit. The shape and size of the transformation unit may be irrelevant to those of the prediction unit. The coding unit may differ from the prediction unit and the transformation unit, or may serve as the prediction unit and the transformation unit. The partitioning of the coding unit will be described in detail below with reference to FIGS. 11 to 24. In the present disclosure, the current block may indicate one of the largest coding unit, the coding unit, the prediction unit, and the transformation unit. The current block indicates a currently decoded or encoded block.

Quantization is the only operation of causing data loss in video compression, and is a process of approximating a transformation coefficient into a few representative values. That is, quantization serves to reduce data quantity to achieve high compression efficiency in an entropy encoding process. The image encoding device 800 determines a quantization rate based on the quantization parameter, and obtains the quantized transformation coefficient by dividing the transformation coefficient by the quantization rate. The image encoding device 800 generates the quantized transformation coefficient into a bitstream and transmits the bitstream to the image decoding device 100. The receiver 110 of the image decoding device 100 obtains the quantized transformation coefficient from the bitstream. The decoder 120 reconstructs the transformation coefficient by multiplying the quantized transformation coefficient by the quantization rate, and this process is called inverse quantization.

When the image encoding device 800 and the image decoding device 100 use a high quantization rate, the quantized transformation coefficient having a low value may be obtained. That is, compression efficiency may be high but an error may be increased. Otherwise, when the image encoding device 800 and the image decoding device 100 use a low quantization rate, the quantized transformation coefficient having a high value may be obtained. Thus, compression efficiency may be low but an error may be reduced. Therefore, the image encoding device 800 and the image decoding device 100 need to select an appropriate quantization rate.

The image encoding device 800 and the image decoding device 100 may change the quantization rate, and adjust a compression ratio by using the changed quantization rate. The quantization rate may have a real value. However, access to or division by a real value is not efficient according to implemental aspects of the image encoding device 800 and the image decoding device 100. Therefore, instead of directly using the quantization rate, the image encoding device 800 and the image decoding device 100 may use the quantization parameter having an integer value. The quantization parameter having an integer value may correspond to the quantization rate having a real value.

The image decoding device 100 may obtain the predicted quantization parameter value from the bitstream received from the image encoding device 800. According to an embodiment of the present disclosure, the image decoding device 100 may obtain information about the predicted quantization parameter value from the bitstream to obtain the predicted quantization parameter value. The image decoding device 100 may receive the information about the predicted quantization parameter value from the image encoding device 800 on a picture or slice basis. Since the information about the predicted quantization parameter value is received on a picture or slice basis, when the image decoding device 100 inversely quantizes the current block by using only the information about the predicted quantization parameter value, characteristics of the current block may not be appropriately reflected and quality of a reconstructed image may be reduced. Therefore, the image decoding device 100 obtains the differential quantization parameter in addition to the information about the predicted quantization parameter value. The image decoding device 100 may obtain the quantization parameter of the current block by summing the predicted quantization parameter value and the differential quantization parameter. The differential quantization parameter will be described below with reference to FIGS. 3 to 7.

The image decoding device 100 may obtain the predicted quantization parameter value based on the information about the predicted quantization parameter value, which is obtained from the bitstream. The image decoding device 100 may determine the predicted quantization parameter value to be the same value indicated by the obtained information about the predicted quantization parameter value.

Figure 15:
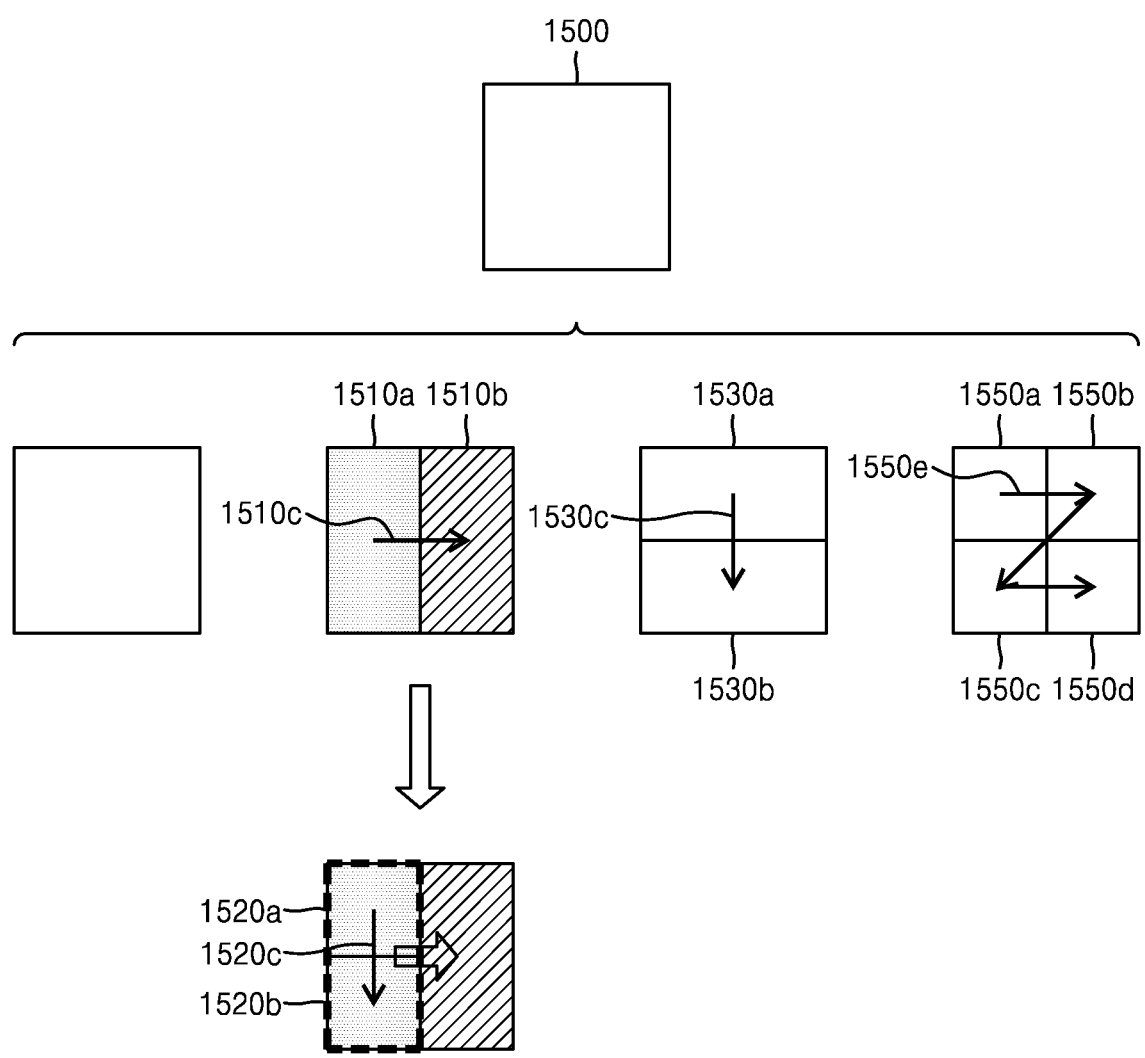
FIG. 15 illustrates an order of processing a plurality of coding units when the plurality of coding units are determined when a current coding unit is split, according to an embodiment.
Figure 16:
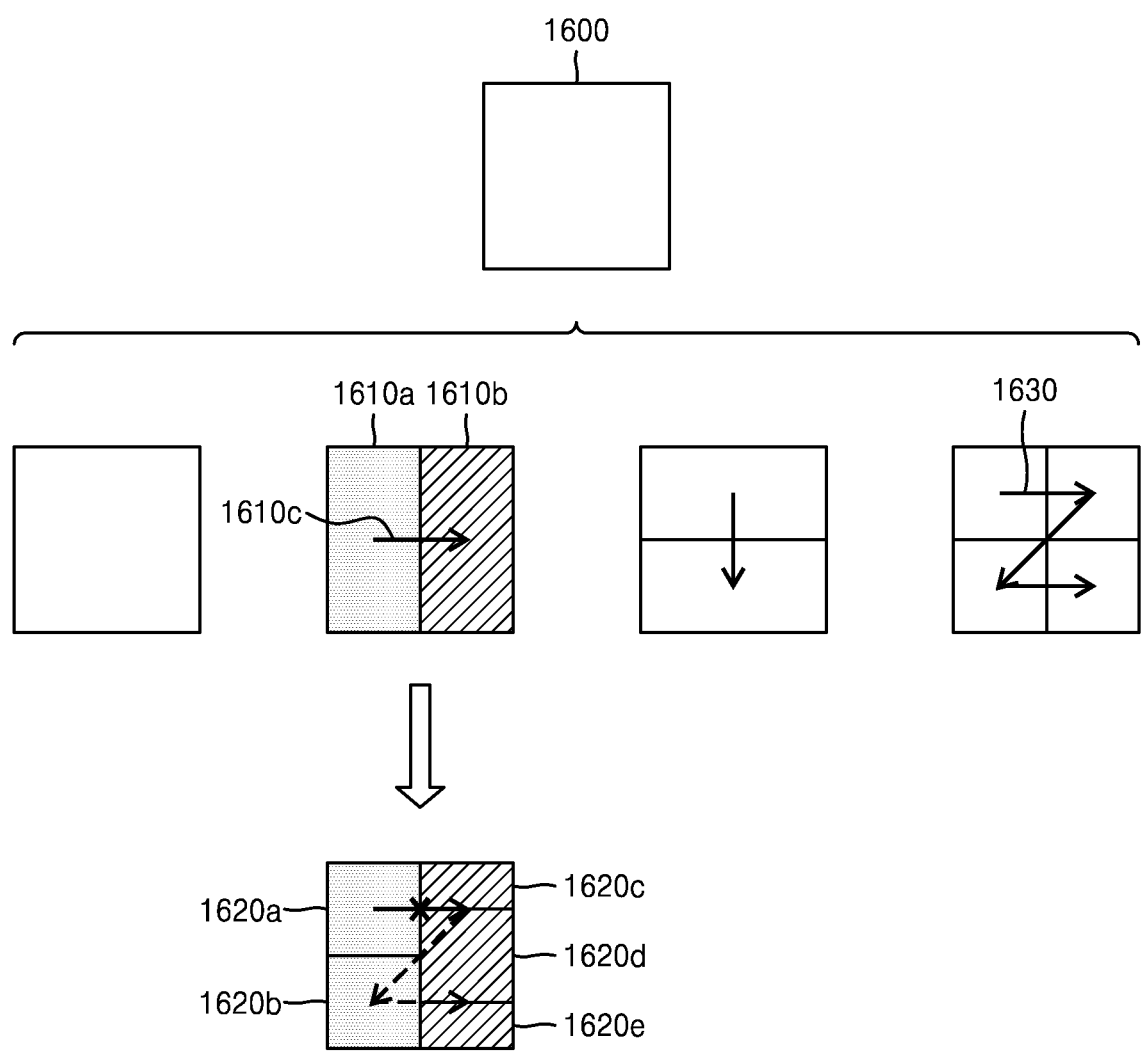
FIG. 16 illustrates a process of determining that a current coding unit is split into an odd number of coding units when coding units are unable to be processed in a predetermined order, according to an embodiment.
Figure 20:
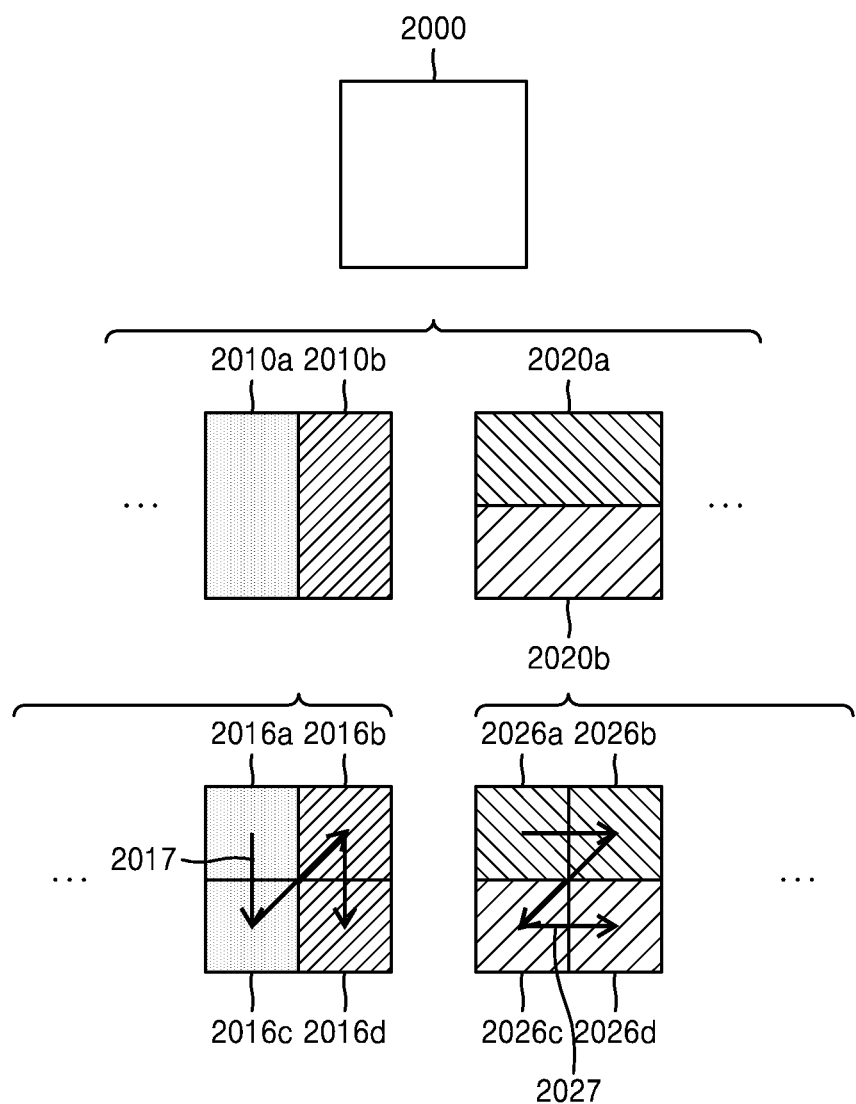
FIG. 20 illustrates that a processing order between a plurality of coding units may be changed according to a split process of a coding unit, according to an embodiment.

The image decoding device 100 may determine the predicted quantization parameter value of the current block based on a quantization parameter of a block reconstructed previously to the current block. A reconstruction order of blocks may be as illustrated in FIG. 15, 16, or 20. The block reconstructed previously to the current block may include at least one of upper-left, upper, upper-right, right, lower-right, lower, lower-left, and left blocks of the current block. For example, when the block reconstructed previously to the current block includes the left and upper blocks, the predicted quantization parameter value of the current block may include an average of a quantization parameter of the left block of the current block and a quantization parameter of the upper block of the current block. In this case, the image decoding device 100 may obtain at least one of the quantization parameter of the left block of the current block and the quantization parameter of the upper block of the current block based on the obtained information about the predicted quantization parameter value.

According to another embodiment of the present disclosure, the image decoding device 100 may not receive the information about the predicted quantization parameter value from the image encoding device 800 and use a preset value as the information about the predicted quantization parameter value. The information about the predicted quantization parameter value may be stored in memories of the image decoding device 100 and the image encoding device 800. When the image decoding device 100 does not receive the information about the predicted quantization parameter value of the current block, the image decoding device 100 may obtain the predicted quantization parameter value of the current block by using the information about the predicted quantization parameter value, which is stored in the memory. When the image decoding device 100 does not receive the information about the predicted quantization parameter value from the image encoding device 800, the number of bits transmitted by the image encoding device 800 may be reduced and thus data transmission efficiency may be increased.

The image decoding device 100 may obtain the quantized transformation coefficient of the current block from the bitstream. That is, the quantized transformation coefficient is one of various types of information received by the image decoding device 100 from the image encoding device 800 to decode the image. The image decoding device 100 may obtain a residual block by inversely quantizing and inversely transforming the quantized transformation coefficient. The image decoding device 100 may obtain the current block reconstructed based on a predicted current block and the residual block. The image decoding device 100 may use inter prediction or intra prediction to predict the current block. The image decoding device 100 may generate an output image by applying at least one of a deblocking filter and a sample adaptive offset to the reconstructed current block.

As described above, the image decoding device 100 may obtain the quantization parameter of the current block based on the differential quantization parameter of the current block and the predicted quantization parameter value. The image decoding device 100 may obtain the quantization parameter of the current block by summing the differential quantization parameter of the current block and the predicted quantization parameter value.

The image decoding device 100 may receive the information about the predicted quantization parameter value on a picture or slice basis. When inverse quantization is performed using only the predicted quantization parameter value, the image decoding device 100 may not appropriately reflect characteristics of the current block. The image decoding device 100 may determine a quantization parameter predictor of the current block, which is consistent with characteristics of the current block, based on at least one of the information about the predicted quantization parameter value and a neighboring block of the current block. The image decoding device 100 may obtain the differential quantization parameter, which is consistent with characteristics of the current block, to minutely adjust the quantization parameter of the current block. The image decoding device 100 may accurately inversely quantize the quantized transformation coefficient of the current block by using the quantization parameter based on the quantization parameter predictor and the differential quantization parameter.

The image decoding device 100 may obtain the differential quantization parameter of the current block based on the statistical information of the samples reconstructed previously to the current block. The image decoding device 100 may obtain the differential quantization parameter on a quantization unit basis. The quantization unit is a unit for which the quantization parameter is determined. The quantization unit may be the same as the coding unit. The quantization unit may include a plurality of smallest coding units. Therefore, the image decoding device 100 may minutely adjust the quantization parameter for each coding unit.

As described above, the sample may be a pixel value of a pixel. A minimum value of the sample may be 0. A maximum value of the sample may be determined based on a bit depth. That is, the sample may have a value within a range higher than or equal to 0 and lower than or equal to $2^{(bit\ depth)}-1$. For example, when the bit depth is 10, the sample may have a value within a range higher than or equal to 0 and lower than 1023.

The image decoding device 100 or the image encoding device 800 may decode or encode the image based on a certain order. The statistical information of the samples reconstructed previously to a certain current block may include at least one of an average, a variance, a median, a standard deviation, a maximum value, and a minimum value of the previously reconstructed samples.

The image decoding device 100 may receive, from the image encoding device 800, information indicating whether to receive the differential quantization parameter. When the information indicates not to receive the differential quantization parameter, the image decoding device 100 may obtain the differential quantization parameter of the current block, which is predetermined based on the statistical information of the samples reconstructed previously to the current block. When the information indicates to receive the differential quantization parameter, the image decoding device 100 may obtain information about the differential quantization parameter from the bitstream received from the image encoding device 800. The image encoding device 800 may determine the differential quantization parameter based on the information about the differential quantization parameter.

A method of obtaining the differential quantization parameter of the current block will now be described with reference to FIGS. 3 to 7.

Figure 3:
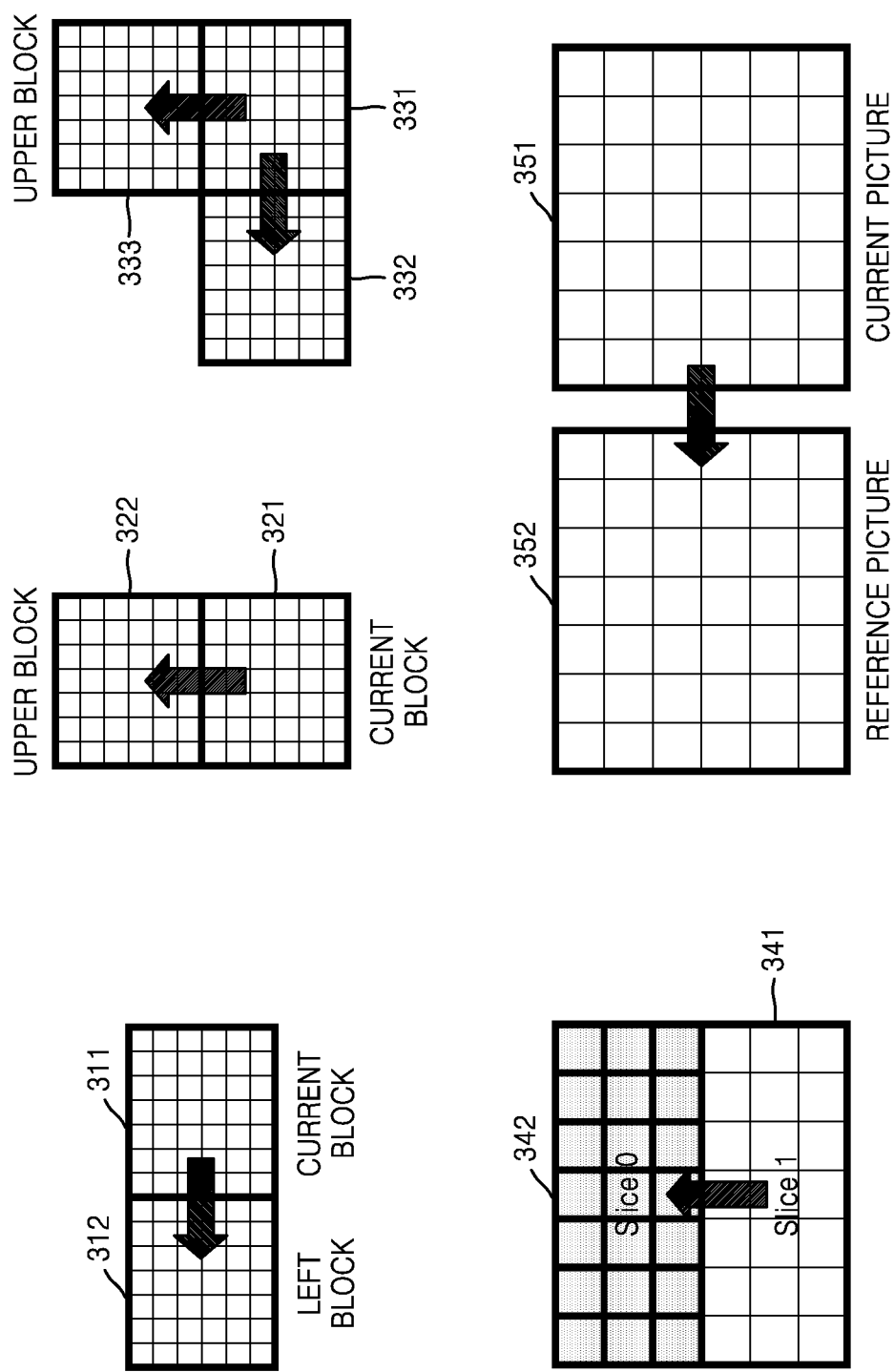
FIG. 3 is a schematic diagram illustrating previously reconstructed samples according to an embodiment.

FIG. 3 is a schematic diagram illustrating previously reconstructed samples according to an embodiment.

Samples reconstructed previously to a current block may be pixel values of pixels included in a block reconstructed previously to the current block. A reconstruction order may be the same as a processing order illustrated in FIG. 15, 16, or 20. The previously reconstructed samples may be pixel values of pixels included in a neighboring block of the current block. For example, the previously reconstructed samples may be pixel values of pixels included in upper-left, upper, upper-right, right, lower-right, lower, lower-left, and left blocks. Alternatively, the previously reconstructed samples may be pixel values of pixels included in at least one of a previous slice of a slice including the current block, a previous picture of a picture including the current block, and a previous group of pictures (GOP) of a GOP including the current block. Otherwise, the previously reconstructed samples may be pixel values of pixels included in a reference picture most similar to the picture including the current block. The image decoding device 100 may determine the reference picture most similar to the picture including the current block, based on information obtained from a bitstream received from the image encoding device 800.

For example, the image decoding device 100 may obtain a differential quantization parameter of a current block 311 based on statistical information of samples of a left block 312 reconstructed previously to the current block 311. The image decoding device 100 may obtain a differential quantization parameter of a current block 321 based on statistical information of samples of an upper block 322 reconstructed previously to the current block 321. The image decoding device 100 may obtain a differential quantization parameter of a current block 331 based on statistical information of samples of left and upper blocks 332 and 333 reconstructed previously to the current block 331. The image decoding device 100 may obtain a differential quantization parameter of a current block based on statistical information of samples of a previous slice 342 reconstructed previously to a slice 341 including the current block. The image decoding device 100 may obtain a differential quantization parameter of a current block based on statistical information of samples of a reference picture 352 which is reconstructed previously to a current picture 351 including the current block and is most similar to the current picture 351.

The image decoding device 100 may obtain a differential quantization parameter of a current block based on neighboring samples which are reconstructed previously to the current block and are likely to have characteristics similar to those of the current block. Therefore, the image decoding device 100 may reduce an error due to inverse quantization. In addition, since the image decoding device 100 does not receive the differential quantization parameter from the image encoding device 800, data transmission efficiency may be increased.

Figure 4:
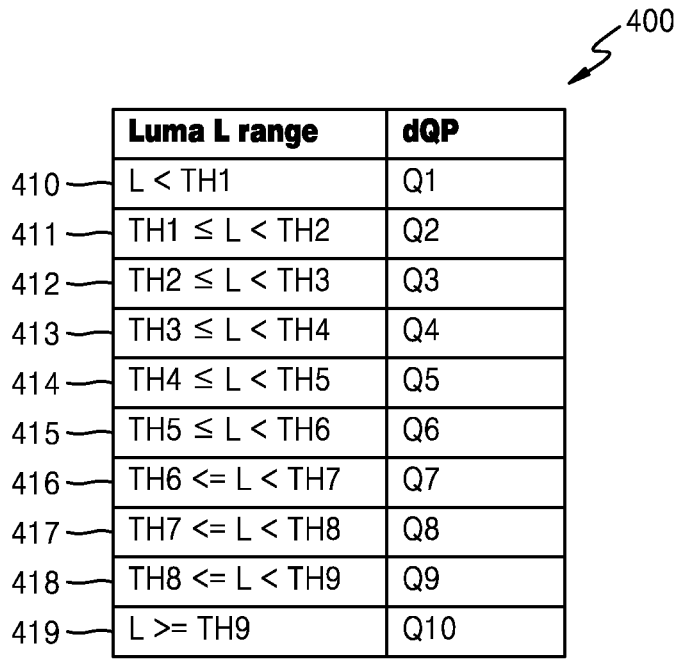
FIG. 4 illustrates a table used by the image decoding device or an image encoding device to obtain a differential quantization parameter of a current block, according to an embodiment.

FIG. 4 illustrates a table 400 used by the image decoding device 100 or the image encoding device 800 to obtain the differential quantization parameter of the current block, according to an embodiment.

The image decoding device 100 may obtain first statistical information of the previously reconstructed samples. The image decoding device 100 may also obtain a plurality of predetermined first differential quantization parameters respectively corresponding to a plurality of sample ranges. The predetermined first differential quantization parameters respectively corresponding to the sample ranges may be as shown in the table 400.

The first statistical information of the previously reconstructed samples is information used to obtain the differential quantization parameter of the current block. The first statistical information may include a value representative of the previously reconstructed samples. The first statistical information of the previously reconstructed samples may include at least one of an average, a median, a variance, a standard deviation, a maximum value, and a minimum value of the previously reconstructed samples. The sample ranges corresponding to the first differential quantization parameters may be determined based on threshold values TH1, TH2, TH3, TH4, TH5, TH6, TH7, TH8, and TH9. The threshold values may be increased from TH1 to TH9. That is, referring to the table 400, indicated luma values may be increased from a sample range 410 to a sample range 419. In other words, the indicated luma values may be reduced from the sample range 419 to the sample range 410.

The YCbCr color space may include one luma component and two chroma components. Each pixel may have pixel values for the luma and chroma components. In the present disclosure, "luma" may indicate a pixel value of a luma component and "chroma" may indicate a pixel value of a chroma component. The luma value represents brightness. A pixel having a high luma value is a bright pixel, and a pixel having a low luma value is a dark pixel. Although the luma values are representatively described herein, the present disclosure is not limited thereto. The present disclosure may also be implemented by changing the luma values into chroma values. The predetermined first differential quantization parameters respectively corresponding to the sample ranges may be respectively denoted by Q1, Q2, Q3, Q4, Q5, Q6, Q7, Q8, Q9, and Q10. For the sample range 410 lower than TH1, the image decoding device 100 may set the differential quantization parameter to be Q1. For the sample range 411 higher than or equal to TH1 and lower than TH2, the image decoding device 100 may set the differential quantization parameter to be Q2. In this manner, the image decoding device 100 may compare the sample ranges to TH2 to TH9 and set the differential quantization parameters Q3, Q4, Q5, Q6, Q7, Q8, and Q9 corresponding to the sample ranges. For the sample range 419 higher than or equal to TH9, the image decoding device 100 may set the differential quantization parameter to be Q10.

The image decoding device 100 may set the differential quantization parameters to be reduced from Q1 to Q10. That is, a low differential quantization parameter may be allocated for a high luma value. Since a quantization parameter is proportional to a differential quantization parameter, when the differential quantization parameter is low, the quantization parameter is also low. The low quantization parameter represents that data loss due to quantization is small. That is, data loss may be reduced at a part of an image having a high luma value.

Human eyes may be sensitive to a part of a high dynamic range (HDR) image having a high luma value. That is, human eyes may sensitively perceive a change in a bright part of an image. Therefore, the image decoding device 100 may clearly show a part of an image having a high luma value by setting a low differential quantization parameter for the part of the image having a high luma value. The image decoding device 100 may change the differential quantization parameters to be reduced or increased from Q1 to Q10 based on second statistical information, third statistical information, a first threshold value, or a third threshold value of the previously reconstructed samples. A detailed description thereof will be provided with reference to FIGS. 5 and 6.

The image decoding device 100 may obtain a differential quantization parameter of the current block corresponding to the first statistical information of the previously reconstructed samples, among the predetermined first differential quantization parameters Q1, Q2, Q3, Q4, Q5, Q6, Q7, Q8, Q9, and Q10. The first statistical information of the previously reconstructed samples may include at least one of an average, a minimum value, a maximum value, and a median thereof. The image decoding device 100 may determine a sample range including the first statistical information of the previously reconstructed samples, among the sample ranges 410 to 419. The image decoding device 100 may obtain the differential quantization parameter among the predetermined first differential quantization parameters Q1, Q2, Q3, Q4, Q5, Q6, Q7, Q8, Q9, and Q10 based on the determined sample range.

For example, for the sample range 414 in which an average of the previously reconstructed samples is higher than or equal to TH4 and is lower than TH5, the image decoding device 100 may determine the differential quantization parameter of the current block to be Q among the predetermined first differential quantization parameters Q1, Q2, Q3, Q4, Q5, Q6, Q7, Q8, Q9, and Q10.

Figure 5:
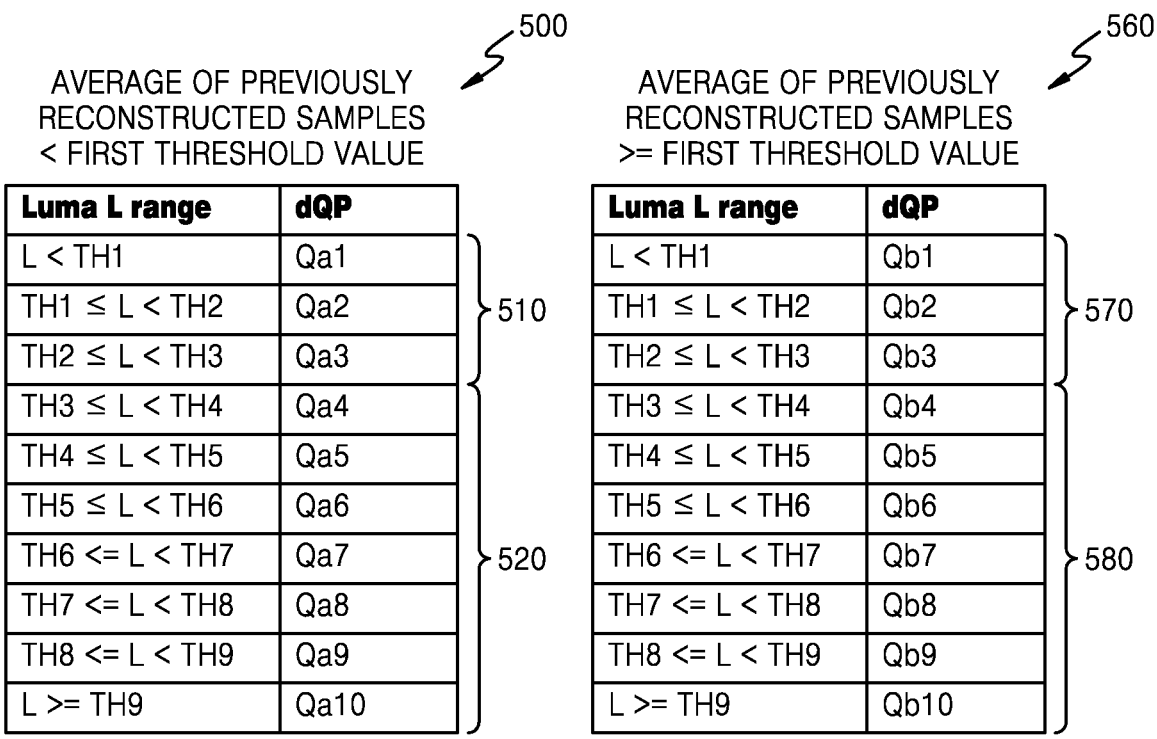
FIG. 5 illustrates tables used by the image decoding device or the image encoding device to obtain the differential quantization parameter of the current block, according to an embodiment.

FIG. 5 illustrates tables 500 and 560 used by the image decoding device 100 or the image encoding device 800 to obtain the differential quantization parameter of the current block, according to an embodiment.

The image decoding device 100 and the image encoding device 800 may change some of the first differential quantization parameters based on at least one type of statistical information of the previously reconstructed samples. The at least one type of statistical information of the previously reconstructed samples may include second statistical information. The second statistical information may be information representative of the previously reconstructed samples. The second statistical information may include at least one of an average, a median, a maximum value, and a minimum value of the previously reconstructed samples. The first statistical information may be the same as the second statistical information.

A first threshold value may be a value for classifying the second statistical information as a low luma value or a high luma value. That is, the second statistical information lower than the first threshold value may be classified as a low luma value, and the second statistical information higher than or equal to the first threshold value may be classified as a high luma value. The first threshold value may be a value predetermined between the image decoding device 100 and the image encoding device 800. The first threshold value may be pre-stored in memories of the image decoding device 100 and the image encoding device 800. Alternatively, the image encoding device 800 may transmit the first threshold value to the image decoding device 100.

Specifically, the image decoding device 100 or the image encoding device 800 may determine the second statistical information as an average or a median of the previously reconstructed samples. The average or the median of the previously reconstructed samples may be a value representative of the previously reconstructed samples. Therefore, when the second statistical information is higher than or equal to the first threshold value, the image decoding device 100 or the image encoding device 800 may classify the second statistical information as a high luma value. In addition, the image decoding device 100 or the image encoding device 800 may determine that the previously reconstructed samples are mainly distributed in a high luma range. Otherwise, when the second statistical information is lower than the first threshold value, the image decoding device 100 or the image encoding device 800 may classify the second statistical information as a low luma value. In addition, the image decoding device 100 or the image encoding device 800 may determine that the previously reconstructed samples are mainly distributed in a low luma range.

The image decoding device 100 or the image encoding device 800 may determine the second statistical information as a maximum value of the previously reconstructed samples. When the second statistical information is lower than the first threshold value, the image decoding device 100 or the image encoding device 800 may determine that the previously reconstructed samples are not distributed in a range higher than or equal to the first threshold value. That is, the image decoding device 100 or the image encoding device 800 may determine that the previously reconstructed samples are mainly distributed in a low luma range.

Alternatively, the image decoding device 100 or the image encoding device 800 may determine the second statistical information as a minimum value of the previously reconstructed samples. When the second statistical information is higher than or equal to the first threshold value, the image decoding device 100 or the image encoding device 800 may determine that the previously reconstructed samples are not distributed in a range lower than the first threshold value. That is, the image decoding device 100 or the image encoding device 800 may determine that the previously reconstructed samples are mainly distributed in a high luma range.

The fact that the second statistical information of the previously reconstructed samples is lower than the first threshold value may mean that the previously reconstructed samples are mainly distributed in a low luma range. The fact that the second statistical information of the previously reconstructed samples is higher than or equal to the first threshold value may mean that the previously reconstructed samples are mainly distributed in a high luma range. The previously reconstructed samples may be samples temporally or spatially adjacent to or highly relevant to the current block. Therefore, when the previously reconstructed samples are mainly distributed in a low luma range, samples of the current block may also be mainly distributed in a low luma range. Otherwise, when the previously reconstructed samples are mainly distributed in a high luma range, samples of the current block may also be mainly distributed in a high luma range.

When the samples of the current block are mainly distributed in a low luma range, the image decoding device 100 and the image encoding device 800 may reduce data loss due to inverse quantization and quantization by setting a low quantization parameter for the low luma range. Otherwise, when the samples of the current block are mainly distributed in a high luma range, the image decoding device 100 and the image encoding device 800 may reduce data loss due to inverse quantization and quantization by setting a low quantization parameter for the high luma range.

The image decoding device 100 and the image encoding device 800 may change some of the first differential quantization parameters based on the first threshold value and the second statistical information of the previously reconstructed samples. When the second statistical information of the previously reconstructed samples is lower than the first threshold value (see the table 500), the image decoding device 100 may obtain a plurality of second differential quantization parameters Qa1, Qa2, Qa3, Qa4, Qa5, Qa6, Qa7, Qa8, Qa9, and Qa10 by changing some of the first differential quantization parameters Q1, Q2, Q3, Q4, Q5, Q6, Q7, Q8, Q9, and Q10. The image decoding device 100 may obtain a differential quantization parameter corresponding to the first statistical information of the previously reconstructed samples among the second differential quantization parameters Qa1, Qa2, Qa3, Qa4, Qa5, Qa6, Qa7, Qa8, Qa9, and Qa10, as the differential quantization parameter of the current block. For example, when an average of the previously reconstructed samples is higher than or equal to TH4 and is lower than TH5, the differential quantization parameter of the current block may be Qa5.

Otherwise, when the statistical information of the previously reconstructed samples is higher than or equal to a second threshold value (see the table 560), the image decoding device 100 may obtain a plurality of third differential quantization parameters Qb1, Qb2, Qb3, Qb4, Qb5, Qb6, Qb7, Qb8, Qb9, and Qb10 by changing some of the first differential quantization parameters Q1, Q2, Q3, Q4, Q5, Q6, Q7, Q8, Q9, and Q10. The image decoding device 100 may obtain a differential quantization parameter corresponding to the first statistical information of the previously reconstructed samples among the third differential quantization parameters Qb1, Qb2, Qb3, Qb4, Qb5, Qb6, Qb7, Qb8, Qb9, and Qb10, as the differential quantization parameter of the current block. For example, when an average of the previously reconstructed samples is higher than or equal to TH7 and is lower than TH8, the differential quantization parameter of the current block may be Qb8.

The second differential quantization parameters corresponding to a low luma range 510 may have values lower than or equal to those of the third differential quantization parameters corresponding to a low luma range 570. The second differential quantization parameters corresponding to a high luma range 520 may have values higher than or equal to those of the third differential quantization parameters corresponding to a high luma range 580.

Specifically, the second threshold value may be a reference value for determining whether samples are within a high luma range or a low luma range. The image decoding device 100 may determine samples lower than the second threshold value, as being included in a low luma range. The image decoding device 100 may determine samples higher than or equal to the second threshold value, as being included in a high luma range. The second threshold value may be a value predetermined between the image decoding device 100 and the image encoding device 800. The second threshold value may be pre-stored in memories of the image decoding device 100 and the image encoding device 800. Alternatively, the image encoding device 800 may transmit the second threshold value to the image decoding device 100.

For example, the second threshold value may be a value near TH3. The image decoding device 100 may obtain the second differential quantization parameters Qa1, Qa2, and Qa3 by subtracting predetermined integers higher than or equal to 0, from the first differential quantization parameters Q1, Q2, and Q3 corresponding to the low luma ranges 410 to 412 lower than the second threshold value. That is, the second differential quantization parameters Qa1, Qa2, and Qa3 corresponding to the sample ranges lower than the second threshold value may be lower than or equal to the first differential quantization parameters Q1, Q2, and Q3 corresponding to the sample ranges lower than the second threshold value.

The image decoding device 100 may obtain the second differential quantization parameters Qa4, Qa5, Qa6, Qa7, Qa8, Qa9, and Qa10 by adding predetermined integers higher than or equal to 0, to the first differential quantization parameters Q4, Q5, Q6, Q7, Q8, Q9, and Q10 corresponding to the high luma ranges 413 to 419 higher than or equal to the second threshold value.

The image decoding device 100 may obtain the third differential quantization parameters Qb1, Qb2, and Qb3 by adding predetermined integers higher than or equal to 0, to the first differential quantization parameters Q1, Q2, and Q3 corresponding to the low luma ranges 410 to 412 lower than the second threshold value.

The image decoding device 100 may obtain the third differential quantization parameters Qb4, Qb5, Qb6, Qb7, Qb8, Qb9, and Qb10 by subtracting predetermined integers higher than or equal to 0, from the first differential quantization parameters Q4, Q5, Q6, Q7, Q8, Q9, and Q10 corresponding to the high luma ranges 413 to 419 higher than or equal to the second threshold value. That is, the third differential quantization parameters Qb4, Qb5, Qb6, Qb7, Qb8, Qb9, and Qb10 corresponding to the sample ranges higher than or equal to the second threshold value may be lower than or equal to the first differential quantization parameters Q4, Q5, Q6, Q7, Q8, Q9, and Q10 corresponding to the sample ranges higher than or equal to the second threshold value.

The image decoding device 100 may determine the second differential quantization parameters Qa1, Qa2, and Qa3 corresponding to the low luma range 510 lower than the second threshold value, to be lower than or equal to the third differential quantization parameters Qb1, Qb2, and Qb3 corresponding to the low luma range 570 lower than the second threshold value. Based on the second differential quantization parameters, the image decoding device 100 or the image encoding device 800 may reduce data loss due to inverse quantization or quantization of the current block classified as a low luma block.

The image decoding device 100 may determine the third differential quantization parameters Qb4, Qb5, Qb6, Qb7, Qb8, Qb9, and Qb10 corresponding to the high luma range 580 higher than the second threshold value, to be lower than or equal to the second differential quantization parameters Qa4, Qa5, Qa6, Qa7, Qa8, Qa9, and Qa10 corresponding to the high luma range 520 higher than the second threshold value. Based on the second differential quantization parameters, the image decoding device 100 or the image encoding device 800 may reduce data loss inverse quantization or quantization of the current block classified as a high luma block.

FIG. 6 illustrates tables 600, 610, 620, and 630 used by the image decoding device 100 or the image encoding device 800 to obtain the differential quantization parameter of the current block, according to an embodiment.

The image decoding device 100 and the image encoding device 800 may change some of the first differential quantization parameters based on multiple types of statistical information of the previously reconstructed samples.

The image decoding device 100 and the image encoding device 800 may change some of the first differential quantization parameters based on the first threshold value, a third threshold value, and the second statistical information and third statistical information of the previously reconstructed samples. The second statistical information has been described above and thus a detailed description thereof will not be provided herein. The third statistical information is information indicating how much the previously reconstructed samples differ from an average thereof. The third statistical information may include at least one of a variance and a standard deviation of the previously reconstructed samples.

The first threshold value has been described above and thus a detailed description thereof will not be provided herein. The third threshold value may be a value for determining how much the previously reconstructed samples differ from an average of the samples. That is, when the third statistical information is lower than the third threshold value, it may be determined that the previously reconstructed samples are distributed in a narrow range from the average. Otherwise, when the third statistical information is higher than or equal to the third threshold value, it may be determined that the previously reconstructed samples are distributed in a wide range from the average. The third threshold value may be a value predetermined between the image decoding device 100 and the image encoding device 800. The third threshold value may be pre-stored in memories of the image decoding device 100 and the image encoding device 800. Alternatively, the image encoding device 800 may transmit the third threshold value to the image decoding device 100.

As described above, when the second statistical information of the previously reconstructed samples is lower than the first threshold value, the previously reconstructed samples may be classified as low luma samples. In this case, when the third statistical information is lower than the third threshold value (see the table 600), it may be determined that the previously reconstructed samples are concentrated in a low luma range. Otherwise, when the third statistical information is higher than or equal to the third threshold value (see the table 620), it may be determined that the previously reconstructed samples are mainly distributed in a low luma range and are widely distributed to a high luma range.

When the second statistical information of the previously reconstructed samples is higher than or equal to the first threshold value, the previously reconstructed samples may be classified as high luma samples. In this case, when the third statistical information is lower than the third threshold value (see the table 610), it may be determined that the previously reconstructed samples are concentrated in a high luma range. Otherwise, when the third statistical information is higher than or equal to the third threshold value (see the table 630), it may be determined that the previously reconstructed samples are mainly distributed in a high luma range and are widely distributed to a low luma range.

The previously reconstructed samples may be samples temporally or spatially adjacent to or highly relevant to the current block. Therefore, characteristics of samples included in the current block may be inferred based on characteristics of the previously reconstructed samples.

When the previously reconstructed samples are concentrated in a low luma range, the samples included in the current block may also be concentrated in a low luma range. When the previously reconstructed samples are mainly distributed in a low luma range and are widely distributed to a high luma range, the samples included in the current block may also be mainly distributed in a low luma range and be widely distributed to a high luma range. When the previously reconstructed samples are concentrated in a high luma range, the samples included in the current block may also be concentrated in a high luma range. When the previously reconstructed samples are mainly distributed in a high luma range and are widely distributed to a low luma range, the samples included in the current block may also be mainly distributed in a high luma range and be widely distributed to a low luma range. Therefore, the image decoding device 100 or the image encoding device 800 may determine the differential quantization parameter of the current block based on the previously reconstructed samples.

When the second statistical information of the previously reconstructed samples is lower than the first threshold value and the third statistical information of the previously reconstructed samples is lower than the third threshold value (see the table 600), the image decoding device 100 may obtain a plurality of fourth differential quantization parameters Qc1, Qc2, Qc3, Qc4, Qc5, Qc6, Qc7, Qc8, Qc9, and Qc10 by changing some of the first differential quantization parameters. The image decoding device 100 may obtain a differential quantization parameter corresponding to the first statistical information of the previously reconstructed samples among the fourth differential quantization parameters Qc1, Qc2, Qc3, Qc4, Qc5, Qc6, Qc7, Qc8, Qc9, and Qc10, as the differential quantization parameter of the current block. The first statistical information of the previously reconstructed samples may include at least one of an average, a median, a maximum value, and a minimum value thereof. For example, when an average of the previously reconstructed samples is higher than or equal to TH4 and is lower than TH5, the differential quantization parameter of the current block may be Qc5.

When the second statistical information of the previously reconstructed samples is higher than or equal to the first threshold value and the third statistical information of the previously reconstructed samples is lower than the third threshold value, the image decoding device 100 may obtain a plurality of fifth differential quantization parameters Qd1, Qd2, Qd3, Qd4, Qd5, Qd6, Qd7, Qd8, Qd9, and Qd10 by changing some of the first differential quantization parameters. The image decoding device 100 may obtain a differential quantization parameter corresponding to the first statistical information of the previously reconstructed samples among the fifth differential quantization parameters Qd1, Qd2, Qd3, Qd4, Qd5, Qd6, Qd7, Qd8, Qd9, and Qd10, as the differential quantization parameter of the current block.

When the second statistical information of the previously reconstructed samples is lower than the first threshold value and the third statistical information of the previously reconstructed samples is higher than or equal to the third threshold value, the image decoding device 100 may obtain a plurality of sixth differential quantization parameters Qe1, Qe2, Qe3, Qe4, Qe5, Qe6, Qe7, Qe8, Qe9, and Qe10 by changing some of the first differential quantization parameters. The image decoding device 100 may obtain a differential quantization parameter corresponding to the first statistical information of the previously reconstructed samples among the sixth differential quantization parameters Qe1, Qe2, Qe3, Qe4, Qe5, Qe6, Qe7, Qe8, Qe9, and Qe10, as the differential quantization parameter of the current block.

When the second statistical information of the previously reconstructed samples is higher than or equal to the first threshold value and the third statistical information of the previously reconstructed samples is higher than or equal to the third threshold value, the image decoding device 100 may obtain a plurality of seventh differential quantization parameters Qf1, Qf2, Qf3, Qf4, Qf5, Qf6, Qf7, Qf8, Qf9, and Qf10 by changing some of the first differential quantization parameters. The image decoding device 100 may obtain a differential quantization parameter corresponding to the first statistical information of the previously reconstructed samples among the seventh differential quantization parameters Qf1, Qf2, Qf3, Qf4, Qf5, Qf6, Qf7, Qf8, Qf9, and Qf10, as the differential quantization parameter of the current block.

Specifically, when the previously reconstructed samples are concentrated in a low luma range, the image decoding device 100 and the image encoding device 800 may obtain the fourth differential quantization parameters by subtracting integers higher than or equal to 0, from the first differential quantization parameters corresponding to the low luma range. The image decoding device 100 and the image encoding device 800 may reduce data loss due to inverse quantization and quantization for the low luma range, by using the fourth differential quantization parameters.

Since the previously reconstructed samples are concentrated in a low luma range, a high luma range may not strongly influence image quality. Therefore, the image decoding device 100 and the image encoding device 800 may obtain the fourth differential quantization parameters by adding integers higher than or equal to 0, to the first differential quantization parameters corresponding to the high luma range.

When the previously reconstructed samples are mainly distributed in a low luma range and are widely distributed to a high luma range, the image decoding device 100 and the image encoding device 800 may obtain the sixth quantization parameters by subtracting integers higher than or equal to 0, from the first differential quantization parameters corresponding to the low luma range. The image encoding device 100 and the image encoding device 800 may obtain the sixth quantization parameters by adding integers higher than or equal to 0, to the first differential quantization parameters corresponding to the high luma range.

When the previously reconstructed samples are mainly distributed in a low luma range and are widely distributed to a high luma range (see the table 620), the high luma range may also influence image quality. Therefore, when the previously reconstructed samples are mainly distributed in a low luma range and are widely distributed to a high luma range (see the table 620), amounts by which the first differential quantization parameters are changed may be small compared to the case when the previously reconstructed samples are concentrated in a low luma range (see the table 600).

When the previously reconstructed samples are concentrated in a high luma range, the image encoding device 100 and the image encoding device 800 may obtain the fifth differential quantization parameters by subtracting integers higher than or equal to 0, from the first differential quantization parameters corresponding to the high luma range. The image decoding device 100 and the image encoding device 800 may reduce data loss due to inverse quantization and quantization for the low luma range, by using the fifth differential quantization parameters.

Since the previously reconstructed samples are concentrated in a high luma range, a low luma range may not strongly influence image quality. Therefore, the image encoding device 100 and the image encoding device 800 may obtain the fifth differential quantization parameters by adding integers higher than or equal to 0, to the first differential quantization parameters corresponding to the low luma range.

When the previously reconstructed samples are mainly distributed in a high luma range and are widely distributed to a low luma range, the image decoding device 100 and the image encoding device 800 may obtain the seventh differential quantization parameters by subtracting integers higher than or equal to 0, from the first differential quantization parameters corresponding to the high luma range. The image encoding device 100 and the image encoding device 800 may obtain the seventh differential quantization parameters by adding integers higher than or equal to 0, to the first differential quantization parameters corresponding to the low luma range.

When the previously reconstructed samples are mainly distributed in a high luma range and are widely distributed to a low luma range (see the table 630), image data of the low luma range may also influence image quality. Therefore, when the previously reconstructed samples are mainly distributed in a high luma range and are widely distributed to a low luma range (see the table 630), amounts by which the first differential quantization parameters are changed may be small compared to the case when the previously reconstructed samples are concentrated in a high luma range (see the table 610).

The fourth differential quantization parameters may be differential quantization parameters in a case when the previously reconstructed samples are concentrated in a low luma range. The fourth differential quantization parameters corresponding to a low luma range 601 may have values lower than or equal to those of the fifth differential quantization parameters corresponding to a low luma range 611, the sixth differential quantization parameters corresponding to a low luma range 621, and the seventh differential quantization parameters corresponding to a low luma range 631.

The fourth differential quantization parameters corresponding to a high luma range 602 may have values higher than or equal to those of the fifth differential quantization parameters corresponding to a high luma range 612, the sixth differential quantization parameters corresponding to a high luma range 622, and the seventh differential quantization parameters corresponding to a high luma range 632.

The fifth differential quantization parameters may be differential quantization parameters in a case when the previously reconstructed samples are concentrated in a high luma range. The fifth differential quantization parameters corresponding to the low luma range 611 may have values higher than or equal to those of the fourth differential quantization parameters corresponding to the low luma range 601, the sixth differential quantization parameters corresponding to the low luma range 621, and the seventh differential quantization parameters corresponding to the low luma range 631.

The fifth differential quantization parameters corresponding to the high luma range 612 may have values lower than or equal to those of the fourth differential quantization parameters corresponding to the high luma range 602, the sixth differential quantization parameters corresponding to the high luma range 622, and the seventh differential quantization parameters corresponding to the high luma range 632.

As described above, the second threshold value may be a reference value for determining whether samples are within a high luma range or a low luma range. The image decoding device 100 may include samples lower than the second threshold value, in a low luma range. The image decoding device 100 may include samples higher than or equal to the second threshold value, in a high luma range. The second threshold value may be predetermined by the image decoding device 100 and the image encoding device 800.

For example, the second threshold value may be a value near TH3. The image decoding device 100 may obtain the fourth differential quantization parameters Qc1, Qc2, and Qc3 or the sixth differential quantization parameters Qe1, Qe2, and Qe3 by subtracting predetermined integers higher than or equal to 0, from the first differential quantization parameters Q1, Q2, and Q3 corresponding to the low luma ranges 410 to 412 lower than the second threshold value. That is, the fourth differential quantization parameters Qc1, Qc2, and Qc3 or the sixth differential quantization parameters Qe1, Qe2, and Qe3 corresponding to the sample ranges lower than the second threshold value may be lower than the first differential quantization parameters Q1, Q2, and Q3 corresponding to the sample ranges lower than the second threshold value. At least one of the fourth differential quantization parameters Qc1, Qc2, and Qc3 may be lower than or equal to at least one of the sixth differential quantization parameters Qe1, Qe2, and Qe3.

The image decoding device 100 may obtain the fourth differential quantization parameters Qc4, Qc5, Qc6, Qc7, Qc8, Qc9, and Qc10 or the sixth differential quantization parameters Qe4, Qe5, Qe6, Qe7, Qe8, Qe9, and Qe10 by adding predetermined integers higher than or equal to 0, to the first differential quantization parameters Q4, Q5, Q6, Q7, Q8, Q9, and Q10 corresponding to the high luma ranges 413 to 419 higher than or equal to the second threshold value.

The image decoding device 100 may obtain the fifth differential quantization parameters Qd1, Qd2, and Qd3 or the seventh differential quantization parameters Qf1, Qf2, and Qf3 by adding predetermined integers higher than or equal to 0, to the first differential quantization parameters Q1, Q2, and Q3 corresponding to the low luma ranges 410 to 412 lower than the second threshold value.

The image decoding device 100 may obtain the fifth differential quantization parameters Qd4, Qd5, Qd6, Qd7, Qd8, Qd9, and Qd10 or the seventh differential quantization parameters Qf4, Qf5, Qf6, Qf7, Qf8, Qf9, and Qf10 by subtracting predetermined integers higher than or equal to 0, from the first differential quantization parameters Q4, Q5, Q6, Q7, Q8, Q9, and Q10 corresponding to the high luma ranges 413 to 419 higher than or equal to the second threshold value. That is, the fifth differential quantization parameters Qd4, Qd5, Qd6, Qd7, Qd8, Qd9, and Qd10 or the seventh differential quantization parameters Qf4, f5, Qf6, Qf7, Qf8, Qf9, and Qf10 corresponding to the sample ranges higher than or equal to the second threshold value may be lower than or equal to the first differential quantization parameters Q4, Q5, Q6, Q7, Q8, Q9, and Q10 corresponding to the sample ranges higher than or equal to the second threshold value. At least one of the fifth differential quantization parameters Qd4, Qd5, Qd6, Qd7, Qd8, Qd9, and Qd10 may be lower than or equal to at least one of the seventh differential quantization parameters Qf4, Qf5, Qf6, Qf7, Qf8, Qf9, and Qf10.

The image decoding device 100 may determine the fourth differential quantization parameters Qc1, Qc2, and Qc3 corresponding to the sample range 601 lower than the second threshold value, to be lower than or equal to the fifth differential quantization parameters Qd1, Qd2, and Qd3 corresponding to the sample range 611 lower than the second threshold value, the sixth differential quantization parameters Qe1, Qe2, and Qe3 corresponding to the sample range 621 lower than the second threshold value, and the seventh differential quantization parameters Qf1, Qf2, and Qf3 corresponding to the sample range 631 lower than the second threshold value. When it is inferred based on the previously reconstructed samples that the samples of the current block are concentrated in a low luma range, the image decoding device 100 or the image encoding device 800 may inversely quantize or normally quantize the current block based on the fourth differential quantization parameters. The image decoding device 100 or the image encoding device 800 may reduce data loss due to inverse quantization or quantization of the current block.

The image decoding device 100 may determine the fifth differential quantization parameters Qd4, Qd5, Qd6, Qd7, Qd8, Qd9, and Qd10 corresponding to the sample range 612 higher than or equal to the second threshold value, to be lower than or equal to the fourth differential quantization parameters Qc4, Qc5, Qc6, Qc7, Qc8, Qc9, and Qc10 corresponding to the sample range 602 higher than or equal to the second threshold value, the sixth differential quantization parameters Qe4, Qe5, Qe6, Qe7, Qe8, Qe9, and Qe10 corresponding to the sample range 622 higher than or equal to the second threshold value, and the seventh differential quantization parameters Qf4, Qf5, Qf6, Qf7, Qf8, Qf9, and Qf10 corresponding to the sample range 632 higher than or equal to the second threshold value. When it is inferred based on the previously reconstructed samples that the samples of the current block are concentrated in a high luma range, the image decoding device 100 or the image encoding device 800 may inversely quantize or normally quantize the current block based on the fifth differential quantization parameters. The image decoding device 100 or the image encoding device 800 may reduce data loss due to inverse quantization or quantization of the current block.

FIG. 7 illustrates a table comparatively showing sizes of differential quantization parameters of the current block based on statistical information of the previously reconstructed samples, according to an embodiment.

When the second statistical information of the previously reconstructed samples is lower than the first threshold value, the image decoding device 100 may classify the second statistical information as a low luma value. The fact that the second statistical information is classified as a low luma value may mean that the previously reconstructed samples are mainly distributed in a low luma range. In this case, a fact that the third statistical information of the previously reconstructed samples is lower than the third threshold value may mean that the previously reconstructed samples are concentrated in the low luma range. The image decoding device 100 may obtain the fourth differential quantization parameters Qc1, Qc2, Qc3, Qc4, Qc5, Qc6, Qc7, Qc8, Qc9, and Qc10 by changing some of the first differential quantization parameters. In addition, the image decoding device 100 may obtain a differential quantization parameter of the current block corresponding to the first statistical information of the previously reconstructed samples, among the fourth differential quantization parameters Qc1, Qc2, Qc3, Qc4, Qc5, Qc6, Qc7, Qc8, Qc9, and Qc10.

When the first statistical information of the previously reconstructed samples is included in a low luma range, the differential quantization parameter of the current block may be A. Alternatively, when the first statistical information of the previously reconstructed samples is included in a high luma range, the differential quantization parameter of the current block may be E.

When the second statistical information of the previously reconstructed samples is lower than the first threshold value, the image decoding device 100 may classify the second statistical information as a low luma value. The fact that the second statistical information is classified as a low luma value may mean that the previously reconstructed samples are mainly distributed in a low luma range. In this case, a fact that the third statistical information of the previously reconstructed samples is higher than or equal to the third threshold value may mean that the previously reconstructed samples are mainly distributed in the low luma range and are widely distributed to a high luma range. The image decoding device 100 may obtain the sixth differential quantization parameters Qe1, Qe2, Qe3, Qe4, Qe5, Qe6, Qe7, Qe8, Qe9, and Qe10 by changing some of the first differential quantization parameters. The image decoding device 100 may obtain the differential quantization parameter of the current block corresponding to the first statistical information of the previously reconstructed samples, among the sixth differential quantization parameters Qe1, Qe2, Qe3, Qe4, Qe5, Qe6, Qe7, Qe8, Qe9, and Qe10.

When the first statistical information of the previously reconstructed samples is included in a low luma range, the differential quantization parameter of the current block may be C. Alternatively, when the first statistical information of the previously reconstructed samples is included in a high luma range, the differential quantization parameter of the current block may be G.

When the second statistical information of the previously reconstructed samples is higher than or equal to the first threshold value, the image decoding device 100 may classify the second statistical information as a high luma value. The fact that the second statistical information is classified as a high luma value may mean that the previously reconstructed samples are mainly distributed in a high luma range. In this case, a fact that the third statistical information of the previously reconstructed samples is lower than the third threshold value may mean that the previously reconstructed samples is are concentrated in the high luma range. The image decoding device 100 may obtain the fifth differential quantization parameters Qd1, Qd2, Qd3, Qd4, Qd5, Qd6, Qd7, Qd8, Qd9, and Qd10 by changing some of the first differential quantization parameters. In addition, the image decoding device 100 may obtain the differential quantization parameter of the current block corresponding to the first statistical information of the previously reconstructed samples, among the fifth differential quantization parameters Qd1, Qd2, Qd3, Qd4, Qd5, Qd6, Qd7, Qd8, Qd9, and Qd10.

When the first statistical information of the previously reconstructed samples is included in a low luma range, the differential quantization parameter of the current block may be B. Otherwise, when the first statistical information of the previously reconstructed samples is included in a high luma range, the differential quantization parameter of the current block may be F.

When the second statistical information of the previously reconstructed samples is higher than or equal to the first threshold value, the image decoding device 100 may classify the second statistical information as a high luma value. The fact that the second statistical information is classified as a high luma value may mean that the previously reconstructed samples are mainly distributed in a high luma range. In this case, a fact that the third statistical information of the previously reconstructed samples is higher than or equal to the third threshold value may mean that the previously reconstructed samples are mainly distributed in the high luma range and are widely distributed to a low luma range. The image decoding device 100 may obtain the seventh differential quantization parameters Qf1, Qf2, Qf3, Qf4, Qf5, Qf6, Qf7, Qf8, Qf9, and Qf10 by changing some of the first differential quantization parameters. In addition, the image decoding device 100 may obtain the differential quantization parameter of the current block corresponding to the first statistical information of the previously reconstructed samples, among the seventh differential quantization parameters Qf1, Qf2, Qf3, Qf4, Qf5, Qf6, Qf7, Qf8, Qf9, and Qf10.

When the first statistical information of the previously reconstructed samples are included in a low luma range, the differential quantization parameter of the current block may be D. Otherwise, when the first statistical information of the previously reconstructed samples are included in a high luma range, the differential quantization parameter of the current block may be H.

Referring back to FIG. 5, the image decoding device 100 may determine the second differential quantization parameters Qa1, Qa2, and Qa3 corresponding to the low luma range 510 lower than the second threshold value, to be lower than or equal to the third differential quantization parameters Qb1, Qb2, and Qb3 corresponding to the low luma range 570 lower than the second threshold value.

A or C may be one of the second differential quantization parameters Qa1, Qa2, and Qa3 corresponding to the low luma range 510. B or D may be one of the third differential quantization parameters Qb1, Qb2, and Qb3 corresponding to the low luma range 570. That is, the image decoding device 100 may determine A to be lower than or equal to B. In addition, the image decoding device 100 may determine C to be lower than or equal to D.

The image decoding device 100 may determine the third differential quantization parameters Qb4, Qb5, Qb6, Qb7, Qb8, Qb9, and Qb10 corresponding to the high luma range 580 higher than the second threshold value, to be lower than or equal to the second differential quantization parameters Qa4, Qa5, Qa6, Qa7, Qa8, Qa9, and Qa10 corresponding to the high luma range 520 higher than the second threshold value.

E or G may be one of the second differential quantization parameters Qa4, Qa5, Qa6, Qa7, Qa8, Qa9, and Qa10 corresponding to the high luma range 520. F or H may be one of the third differential quantization parameters Qb4, Qb5, Qb6, Qb7, Qb8, Qb9, and Qb10 corresponding to the high luma range 580. That is, the image decoding device 100 may determine E to be higher than or equal to F. In addition, the image decoding device 100 may determine G to be higher than or equal to H.

Referring back to FIG. 6, the image decoding device 100 may determine the fourth differential quantization parameters Qc1, Qc2, and Qc3 corresponding to the sample range 601 lower than the second threshold value, to be lower than or equal to the fifth differential quantization parameters Qd1, Qd2, and Qd3 corresponding to the sample range 611 lower than the second threshold value, the sixth differential quantization parameters Qe1, Qe2, and Qe3 corresponding to the sample range 621 lower than the second threshold value, and the seventh differential quantization parameters Qf1, Qf2, and Qf3 corresponding to the sample range 631 lower than the second threshold value.

A may be one of the fourth differential quantization parameters Qc1, Qc2, and Qc3 corresponding to the sample range 601 lower than the second threshold value. B may be one of the fifth differential quantization parameters Qd1, Qd2, and Qd3 corresponding to the sample range 611 lower than the second threshold value. C may be one of the sixth differential quantization parameters Qe1, Qe2, and Qe3 corresponding to the sample range 621 lower than the second threshold value. D may be one of the seventh differential quantization parameters Qf1, Qf2, and Qf3. The image decoding device 100 may set A to be lower than or equal to C. The image decoding device 100 may set C to be lower than or equal to D. The image decoding device 100 may set D to be lower than or equal to B.

The image decoding device 100 may determine the fifth differential quantization parameters Qd4, Qd5, Qd6, Qd7, Qd8, Qd9, and Qd10 corresponding to the sample range 612 higher than or equal to the second threshold value, to be lower than or equal to the fourth differential quantization parameters Qc4, Qc5, Qc6, Qc7, Qc8, Qc9, and Qc10 corresponding to the sample range 602 higher than or equal to the second threshold value, the sixth differential quantization parameters Qe4, Qe5, Qe6, Qe7, Qe8, Qe9, and Qe10 corresponding to the sample range 622 higher than or equal to the second threshold value, and the seventh differential quantization parameters Qf4, Qf5, Qf6, Qf7, Qf8, Qf9, and Qf10 corresponding to the sample range 632 higher than or equal to the second threshold value.

E may be one of the fourth differential quantization parameters Qc4, Qc5, Qc6, Qc7, Qc8, Qc9, and Qc10 corresponding to the sample range 602 higher than or equal to the second threshold value. F may be one of the fifth differential quantization parameters Qd4, Qd5, Qd6, Qd7, Qd8, Qd9, and Qd10 corresponding to the sample range 612 higher than or equal to the second threshold value. G may be one of the seventh differential quantization parameters Qf4, Qf5, Qf6, Qf7, Qf8, Qf9, and Qf10 corresponding to the sample range 632 higher than or equal to the second threshold value. The image decoding device 100 may set F to be lower than or equal to H. The image decoding device 100 may set H to be lower than or equal to G. The image decoding device 100 may set G to be lower than or equal to E.

Figure 8:
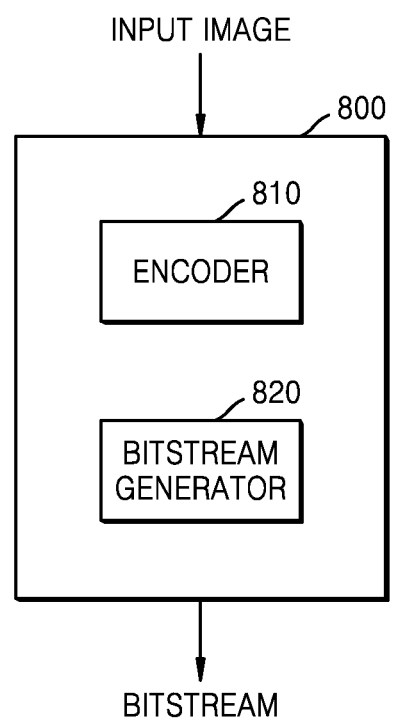
FIG. 8 is a schematic block diagram of the image encoding device according to an embodiment.

FIG. 8 is a schematic block diagram of the image encoding device 800 according to an embodiment.

The image encoding device 800 may include an encoder 810 and a bitstream generator 820. The encoder 810 may receive an input image and encode the input image. The bitstream generator 820 may output a bitstream based on the encoded input image. The image encoding device 800 may transmit the bitstream to the image decoding device 100. Operation of the image encoding device 800 will now be described in detail with reference to FIGS. 9 and 10.

Figure 9:
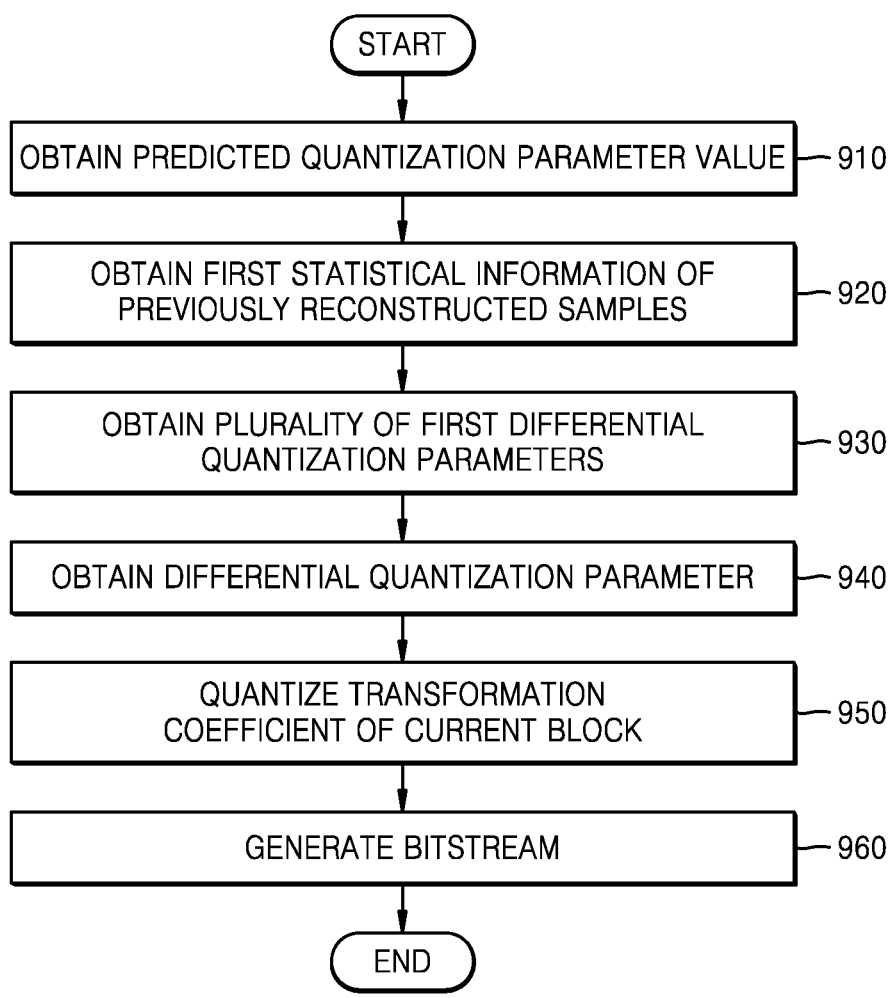
FIG. 9 is a flowchart of an image encoding method according to an embodiment.

FIG. 9 is a flowchart of an image encoding method according to an embodiment.

According to an embodiment of the present disclosure, the encoder 810 may perform an operation 910 for obtaining a predicted quantization parameter value of a current block. The encoder 810 may perform an operation 920 for obtaining first statistical information of samples reconstructed previously to the current block. The encoder 810 may perform an operation 930 for obtaining a plurality of predetermined first differential quantization parameters respectively corresponding to a plurality of sample ranges. The encoder 810 may perform an operation 940 for obtaining a differential quantization parameter of the current block corresponding to the first statistical information of the previously reconstructed samples, among the first differential quantization parameters. The encoder 810 may perform an operation 950 for quantizing a transformation coefficient of the current block based on the predicted quantization parameter value and the differential quantization parameter of the current block. The bitstream generator 820 may perform an operation 960 for generating a bitstream based on the predicted quantization parameter value and the quantized transformation coefficient.

The operation 930 for obtaining the predetermined first differential quantization parameters respectively corresponding to the sample ranges, and the operation 940 for obtaining the differential quantization parameter of the current block corresponding to the first statistical information of the previously reconstructed samples, among the first differential quantization parameters, by the image encoding device 800 are the same as those described above in relation to FIGS. 1 to 7 and thus detailed descriptions thereof will not be provided herein.

In addition, as described above in relation to FIGS. 4 to 7, the image encoding device 800 may obtain a plurality of second differential quantization parameters to a plurality of seventh differential quantization parameters based on at least one of second statistical information and third statistical information of the previously reconstructed samples and at least one of first to third threshold values. These operations are the same as those described above in relation to FIGS. 4 to 7 and thus detailed descriptions thereof will not be provided herein.

The image encoding device 800 and the image decoding device 100 may obtain the differential quantization parameter of the current block based on the predetermined first differential quantization parameters to the seventh differential quantization parameters. Therefore, the image encoding device 800 does not need to transmit the differential quantization parameter to the image decoding device 100. Instead, the image encoding device 800 may transmit, to the image decoding device 100, information indicating whether the differential quantization parameter is transmitted. The number of bits transmitted from the image encoding device 800 to the image decoding device 100 may be reduced and thus data transmission efficiency may be increased.

Figure 10:
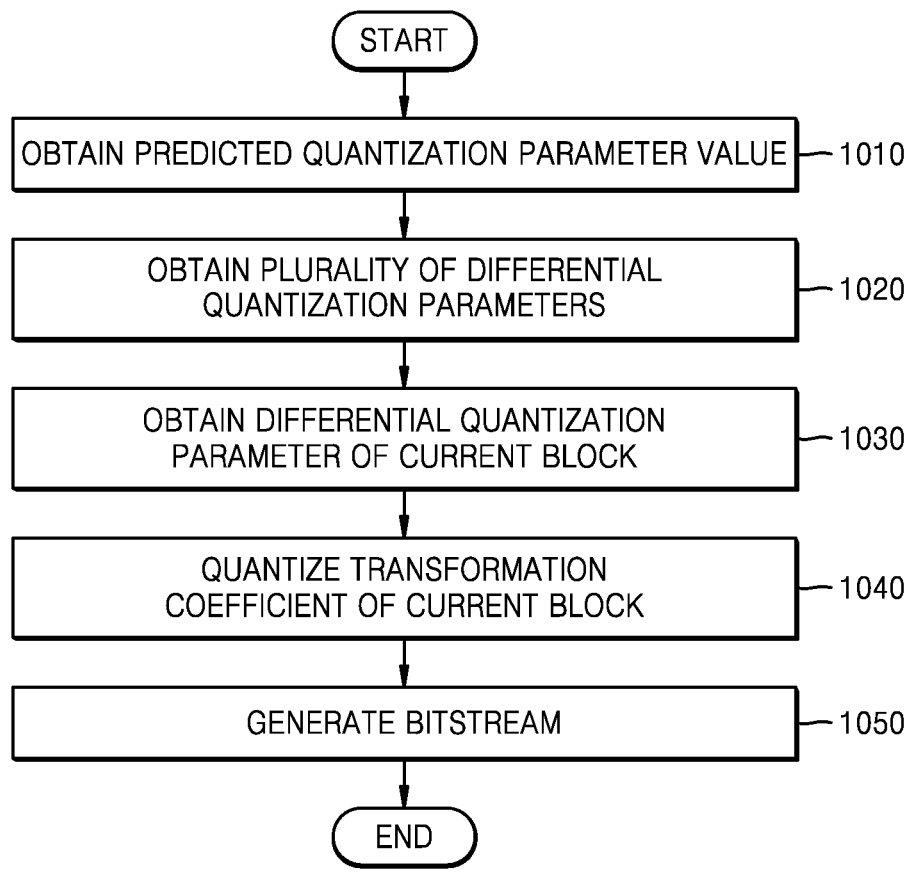
FIG. 10 is a flowchart of an image encoding method according to another embodiment.

FIG. 10 is a flowchart of an image encoding method according to another embodiment.

The encoder 810 may perform an operation 1010 for obtaining a predicted quantization parameter value of a current block. The encoder 810 may perform an operation 1020 for obtaining a plurality of differential quantization parameters respectively corresponding to a plurality of sample ranges, based on a result of comparing second statistical information of original samples of the current block to a first threshold value. The encoder 810 may perform an operation 1030 for obtaining a differential quantization parameter of the current block corresponding to first statistical information of the original samples of the current block, among the differential quantization parameters. The encoder 810 may perform an operation 1040 for quantizing a transformation coefficient of the current block based on the predicted quantization parameter value and the differential quantization parameter of the current block. The bitstream generator 820 may perform an operation 1050 for generating a bitstream based on the predicted quantization parameter value, the differential quantization parameter of the current block, and the quantized transformation coefficient of the current block.

Except that statistical information of "the samples reconstructed previously to the current block" is used in FIGS. 1 to 7 but "statistical information of the original samples of the current block" is used in operations 1020 and 1030 of the image encoding device 800, operations 1020 and 1030 are the same as those described above in relation to FIGS. 4 to 7 and thus detailed descriptions thereof will not be provided herein.

The image encoding device 800 may obtain a plurality of second differential quantization parameters to a plurality of seventh differential quantization parameters based on at least one of the second statistical information and third statistical information of "the original samples of the current block" and at least one of first to third threshold values. These operations are the same as those described above in relation to FIGS. 4 to 7 and thus detailed descriptions thereof will not be provided herein.

The image encoding device 800 may obtain the differential quantization parameter of the current block based on a plurality of predetermined first differential quantization parameters to the seventh differential quantization parameters. The image encoding device 800 transmits the obtained differential quantization parameter to the image decoding device 100. Therefore, the image encoding device 800 and the image decoding device 100 according to the present disclosure may accurately encode and decode an image.

Alternatively, the image encoding device 800 may transmit, to the image decoding device 100, information indicating whether the differential quantization parameter is transmitted. When the information indicates that the differential quantization parameter is transmitted, the image encoding device 800 may transmit, to the image decoding device 100, the bitstream including information about the predicted quantization parameter value, the differential quantization parameter of the current block, and the quantized transformation coefficient of the current block. The image decoding device 100 may obtain from the information about the differential quantization parameter from the bitstream received from the image encoding device 800. The image encoding device 800 may determine the differential quantization parameter based on the information about the differential quantization parameter. When the information indicates that the differential quantization parameter is not transmitted, the image encoding device 800 may transmit, to the image decoding device 100, the bitstream including information about the predicted quantization parameter value and the quantized transformation coefficient of the current block. The image decoding device 100 may obtain the differential quantization parameter of the current block based on statistical information of samples reconstructed previously to the current block.

Hereinafter, a method of determining a data unit of an image according to an embodiment will be described with reference to FIGS. 11 to 24.

Figure 11:
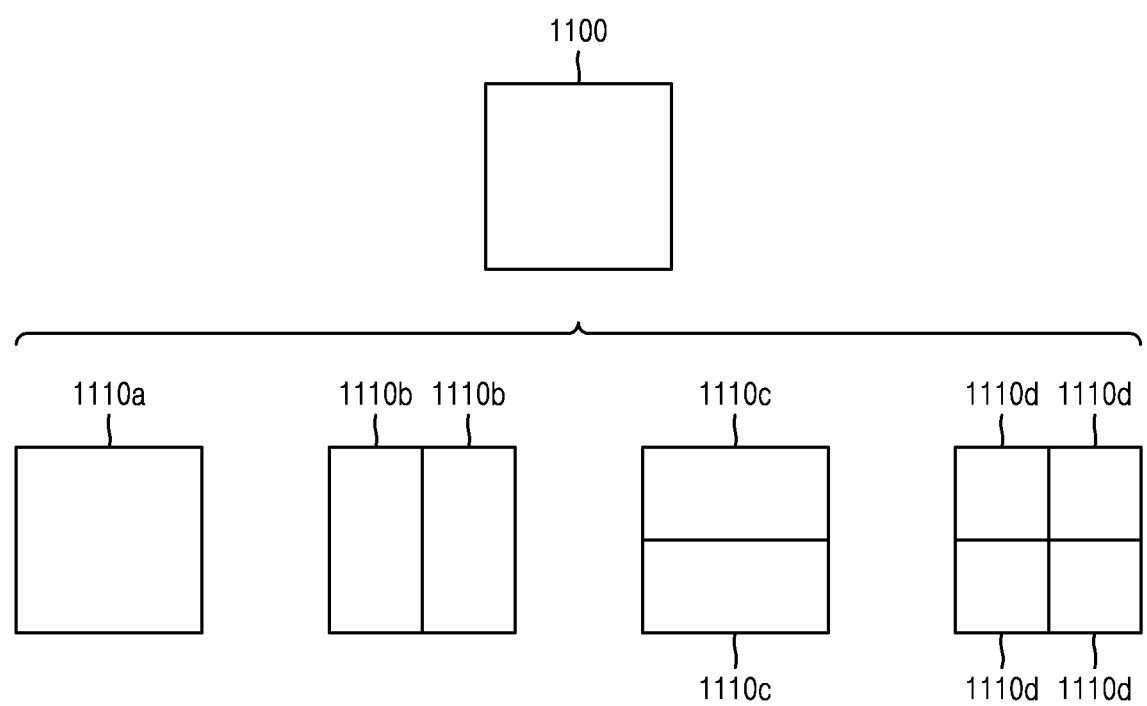
FIG. 11 illustrates a process of determining at least one coding unit when a current coding unit is split, according to an embodiment.

FIG. 11 illustrates a process of determining at least one coding unit when the image decoding device 100 splits a current coding unit, according to an embodiment.

According to an embodiment, the image decoding device 100 may determine, by using the block shape information, a shape of a coding unit, or may determine, by using the split shape information, a shape according to which the coding unit is to be split. In other words, a method of splitting a coding unit, which is indicated by the split shape information, may be determined based on which block shape is indicated by the block shape information used by the image decoding device 100.

According to an embodiment, the image decoding device 100 may use the block shape information indicating that a current coding unit has a square shape. For example, the image decoding device 100 may determine whether to split a square coding unit or not, whether to split the square coding unit vertically, whether to split the square coding unit horizontally, or whether to split the square coding unit into four coding units, according to the split shape information. Referring to FIG. 11, when block shape information of a current coding unit 1100 indicates a square shape, a decoder 1130 may not split a coding unit 1110*a* having the same size as the current coding unit 1100 according to split shape information indicating no split, or may determine coding units 1110*b* through 1110*d* split based on split shape information indicating a predetermined split method.

Referring to FIG. 11, the image decoding device 100 may determine the two coding units 1110*b* obtained by splitting the current coding unit 1100 in a vertical direction based on split shape information indicating split in a vertical direction, according to an embodiment. The image decoding device 100 may determine the two coding units 1110*c* obtained by splitting the current coding unit 1100 in a horizontal direction based on split shape information indicating split in a horizontal direction. The image decoding device 100 may determine the four coding units 1110*d* obtained by splitting the current coding unit 1100 in vertical and horizontal directions based on split shape information indicating split in vertical and horizontal directions. However, a split shape for splitting a square coding unit may not be limitedly interpreted to above shapes, and may include various shapes that may be indicated by split shape information. Predetermined split shapes for splitting a square coding unit will be described in detail below through various embodiments.

FIG. 12 illustrates a process of determining at least one coding unit when the image decoding device 100 splits a coding unit having non-square shape, according to an embodiment.

According to an embodiment, the image decoding device 100 may use block shape information indicating that a current coding unit has a non-square shape. The image decoding device 100 may determine whether not to split the current coding unit having the non-square shape, or whether to split the current coding unit having the non-square shape using a predetermined method. Referring to FIG. 12, when block shape information of a current coding unit 1200 or 1250 indicates a non-square shape, the image decoding device 100 may not split a coding unit 1210 or 1260 having the same size as the current coding unit 1200 or 1250 according to split shape information indicating no split, or may determine coding units 1220*a*, 1220*b*, 1230*a*, 1230*b*, 1230*c*, 1270*a*, 1270*b*, 1280*a*, 1280*b*, and 1280*c* split according to split shape information indicating a predetermined split method. A predetermined split method of splitting a non-square coding unit will be described in detail later through various embodiments.

According to an embodiment, the image decoding device 100 may determine, by using the split shape information, a shape of a coding unit is split, and in this case, the split shape information may indicate the number of at least one coding unit generated when a coding unit is split. Referring to FIG. 12, when the split shape information indicates that the current coding unit 1200 or 1250 is split into two coding units, the image decoding device 100 may determine the two coding units 1220*a* and 1220*b* or 1270*a* and 1270*b*, which are respectively included in the current coding unit 1200 or 1250 by splitting the current coding unit 1200 or 1250 based on the split shape information.

According to an embodiment, when the image decoding device 100 splits the current coding unit 1200 or 1250 having the non-square shape based on the split shape information, the image decoding device 100 may split the current coding unit 1200 or 1250 having the non-square shape in consideration of a location of a longer side. For example, the image decoding device 100 may determine a plurality of coding units by splitting the current coding unit 1200 or 1250 in a direction of splitting the longer sides of the current coding unit 1200 or 1250 in consideration of the shape of the current coding unit 1200 or 1250.

According to an embodiment, when split shape information indicates that a coding unit is split into an odd number of blocks, the image decoding device 100 may determine an odd number of coding units included in the current coding unit 1200 or 1250. For example, when split shape information indicates that the current coding unit 1200 or 1250 is split into three coding units, the image decoding device 100 may split the current coding unit 1200 or 1250 into the three coding units 1230*a* through 1230*c* or 1280*a* through 1280*c*. According to an embodiment, the image decoding device 100 may determine the odd number of coding units included in the current coding unit 1200 or 1250, wherein sizes of the determined coding units are not the same. For example, a size of the coding unit 1230*b* or 1280*b* from among the odd number of coding units 1230*a* through 1230*c* or 1280*a* through 1280*c* may be different from sizes of the coding units 1230*a* and 1230*c* or 1280*a* or 1280*c*. In other words, coding units that may be determined when the current coding unit 1200 or 1250 is split may have different types of sizes, and in some cases, the odd number of coding units 1230*a* through 1230*c* and 1280*a* through 1280*c* may have different sizes.

According to an embodiment, when split shape information indicates that a coding unit is split into an odd number of blocks, the image decoding device 100 may determine an odd number of coding units included in the current coding unit 1200 or 1250 and in addition, set a predetermined limit on at least one coding unit from among the odd number of coding units generated by splitting the current coding unit 1200 or 1250. Referring to FIG. 12, the image decoding device 100 may decode the coding unit 1230*b* or 1280*b* at the center of the three coding units 1230a through 1230c or 1280a through 1280c generated when the current coding unit 1200 or 1250 is split in a different manner from the coding units 1230a and 1230c or 1280a and 1280c. For example, the image decoding device 100 may limit the coding unit 1230b or 1280b at the center not to be further split unlike the coding units 1230a and 1230c or 1280a and 1280c, or to be split only a certain number of times.

Figure 13:
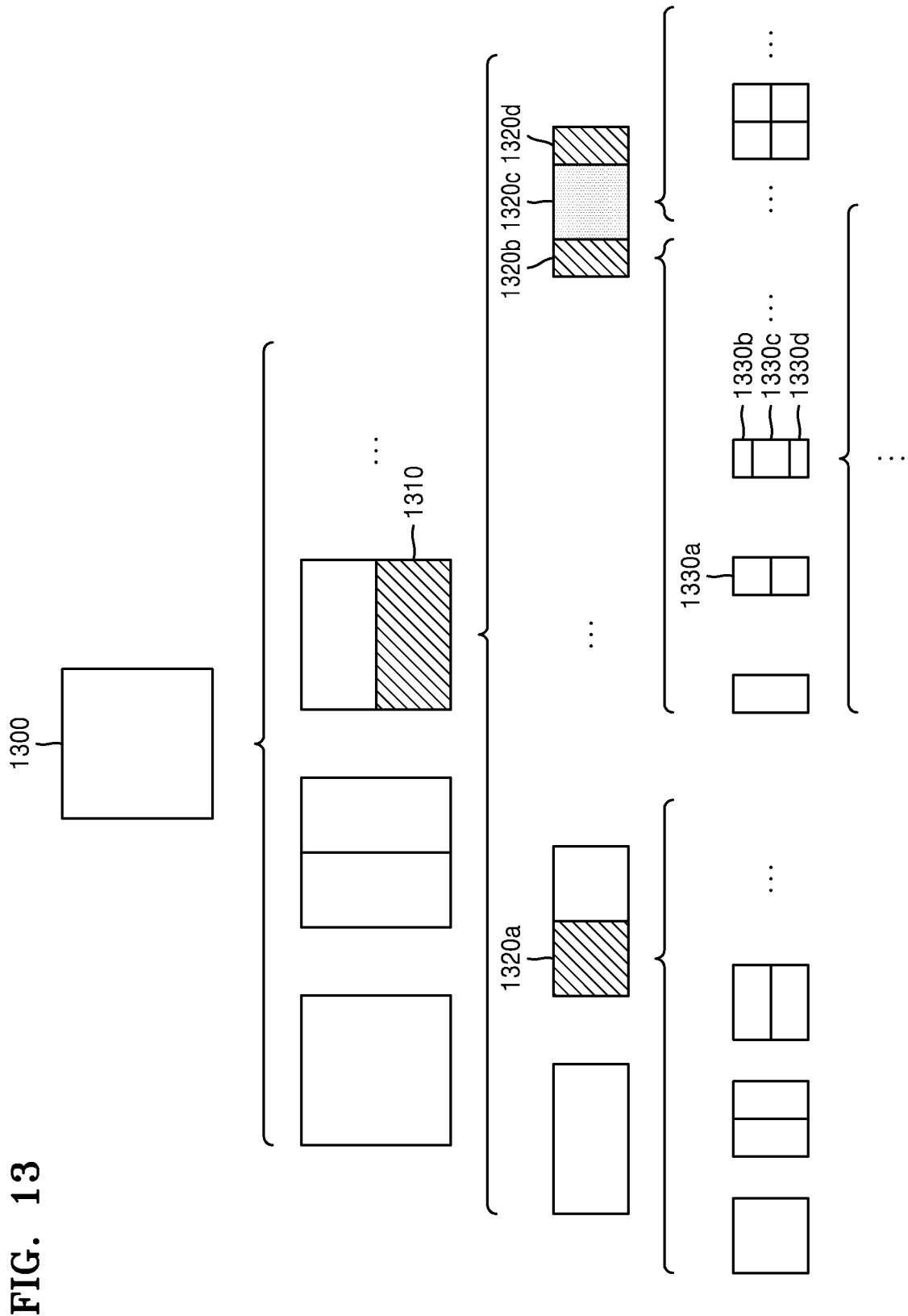
FIG. 13 illustrates a process of splitting a coding unit based on at least one of block shape information and split shape information, according to an embodiment.

FIG. 13 illustrates a process of splitting, by the image decoding device 100, a coding unit based on at least one of block shape information and split shape information, according to an embodiment.

According to an embodiment, the image decoding device 100 may determine whether to split a first coding unit 1300 having a square shape into coding units based on at least one of block shape information and split shape information. According to an embodiment, when the split shape information indicates splitting of the first coding unit 1300 in a horizontal direction, the image decoding device 100 may determine a second coding unit 1310 by splitting the first coding unit 1300 in the horizontal direction. The terms "first coding unit", "second coding unit", and "third coding unit" according to an embodiment are used in the context of splitting a coding unit. For example, a second coding unit may be determined when a first coding unit is split and a third coding unit may be determined when the second coding unit is split. Relationships between the first through third coding units used hereinafter may be understood to follow the above order characteristics.

According to an embodiment, the image decoding device 100 may determine whether to split the determined second coding unit 1310 into coding units based on at least one of block shape information and split shape information. Referring to FIG. 13, the image decoding device 100 may split the second coding unit 1310, which has a non-square shape determined by splitting the first coding unit 1300, into at least one third coding unit, for example, third coding units 1320a through 1320d, based on at least one of block shape information and split shape information, or may not split the second coding unit 1310. The image decoding device 100 may obtain at least one of block shape information and split shape information, the image decoding device 100 may split the first coding unit 1300 based on at least one of the block shape information and the split shape information to obtain a plurality of second coding units (for example, the second coding unit 1310) having various shapes, and the second coding unit 1310 may be split according to a manner of splitting the first coding unit 1300 based on at least one of the block shape information and the split shape information. According to an embodiment, when the first coding unit 1300 is split into the second coding units 1310 based on at least one of block shape information and split shape information about the first coding unit 1300, the second coding unit 1310 may also be split into the third coding units, for example, the third coding units 1320a through 1320d, based on at least one of block shape information and split shape information about the second coding unit 1310. In other words, a coding unit may be recursively split based on at least one of split shape information and block shape information related to the coding unit. Accordingly, a square coding unit may be determined from a non-square coding unit, and such a square coding unit may be recursively split to determine a non-square coding unit. Referring to FIG. 13, a predetermined coding unit (for example, a coding unit located at the center or a coding unit having a square shape) from among the odd number of third coding units 1320b through 1320d that are determined when the second coding unit 1310 having a non-square shape is split may be recursively split. According to an embodiment, the square third coding unit 1320c that is one of the odd number of third coding units 1320b through 1320d may be split in a horizontal direction to be split into a plurality of fourth coding units. A non-square fourth coding unit 1340 that is one of the plurality of fourth coding units may be split into a plurality of coding units again. For example, the non-square fourth coding unit 1340 may be split into an odd number of coding units 13130a through 1350c again. A method used to recursively split a coding unit will be described below through various embodiments.

According to an embodiment, the image decoding device 100 may determine to split each of the third coding units (for example, the third coding units 1320a through 1320d) into coding units or not to split the second coding unit 1310 based on at least one of block shape information and split shape information. The image decoding device 100 may split the second coding unit 1310 having a non-square shape into the odd number of third coding units 1320b through 1320d, according to an embodiment. The image decoding device 100 may set a predetermined limitation on a predetermined third coding unit from among the odd number of third coding units 1320b through 1320d. For example, the image decoding device 100 may limit the coding unit 1320c located at the center from among the odd number of third coding units 1320b through 1320d to be split no more or to be split to a settable number of times. Referring to FIG. 13, the image decoding device 100 may limit the coding unit 1320c located at the center from among the odd number of third coding units 1320b through 1320d included in the second coding unit 1310 having a non-square shape to be split no more, to be split into a predetermined split manner (for example, split only into four coding units or split into a shape corresponding to that into which the second coding unit 1310 is split), or to be split only a predetermined number of times (for example, split only n times, wherein n>0). However, the limitations on the coding unit 1320c located at the center are simply embodiments, and thus the present disclosure should not be interpreted limitedly to the above embodiments, and it should be interpreted that the limitations include various limitations of decoding the coding unit 1320c located at the center differently from the coding units 1320b and 1320d.

According to an embodiment, the image decoding device 100 may obtain, from a predetermined location in a current coding unit, at least one of block shape information and split shape information used to split the current coding unit.

Figure 14:
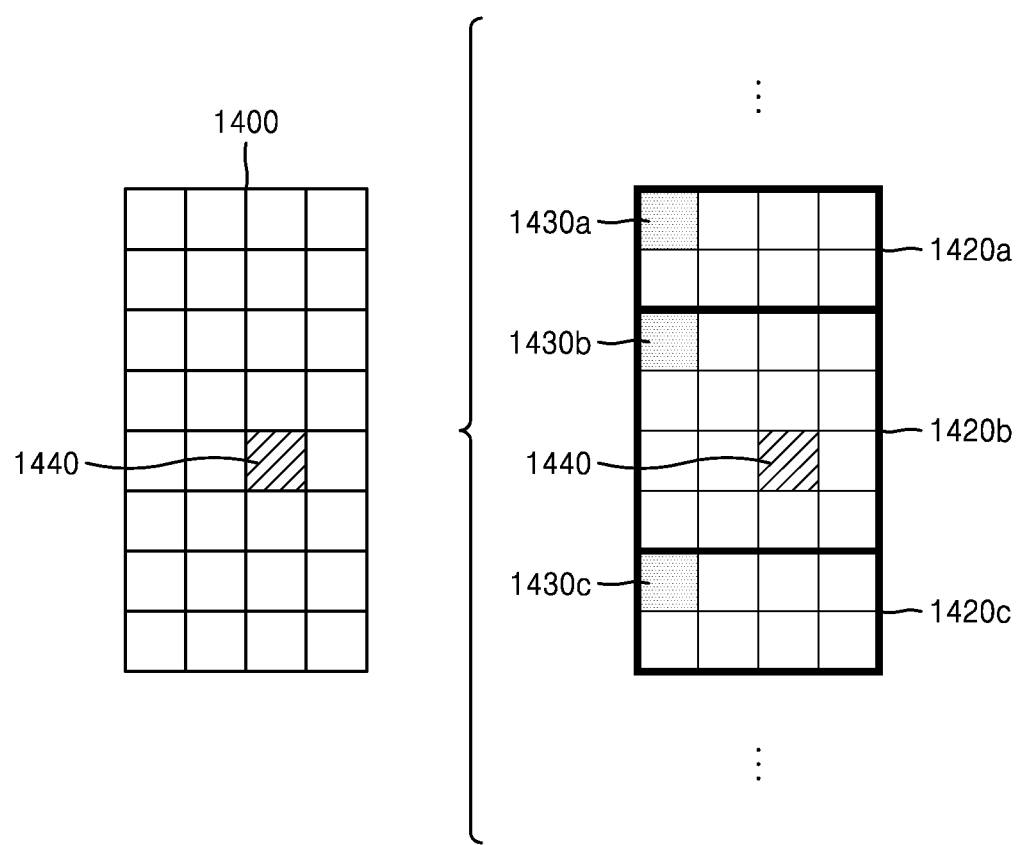
FIG. 14 illustrates a method of determining a predetermined coding unit from among an odd number of coding units, according to an embodiment.

FIG. 14 illustrates a method of determining, by the image decoding device 100, a predetermined coding unit from among an odd number of coding units, according to an embodiment.

Referring to FIG. 14, at least one of block shape information and split shape information of a current coding unit 1400 may be obtained from a sample at a predetermined location (for example, a sample 1440 located at the center) from among a plurality of samples included in the current coding unit 1400. However, the predetermined location in the current coding unit 1400 for obtaining at least one of the block shape information and the split shape information should not be limitedly interpreted to the center in FIG. 14, but should be interpreted to include various locations (for example, uppermost, lowermost, left, right, upper left, lower left, upper right, and lower right locations) in the current coding unit 1400. The image decoding device 100 may obtain at least one of the block shape information and the split shape information from the predetermined location to determine to split or not to split the current coding unit into coding units having various shapes and sizes.

According to an embodiment, when the current coding unit is split into a predetermined number of coding units, the image decoding device 100 may select one of the coding units. A method of selecting one of a plurality of coding units may vary, and descriptions about such a method will be described below through various embodiments.

According to an embodiment, the image decoding device 100 of the image decoding device 100 may split the current coding unit into the plurality of coding units, and determine the coding unit at the predetermined location.

According to an embodiment, the image decoding device 100 may use information indicating a location of each of an odd number of coding units so as to determine a coding unit located at the center of the odd number of coding units. Referring to FIG. 14, the image decoding device 100 may determine an odd number of coding units 1420a through 1420c by splitting the current coding unit 1400. The image decoding device 100 may determine the coding unit 1420b at the center by using information about locations of the odd number of coding units 1420a through 1420c. For example, the image decoding device 100 may determine the coding unit 1420 located at the center by determining locations of the coding units 1420a through 1420c based on information indicating locations of predetermined samples included in the coding units 1420a through 1420c. In detail, the image decoding device 100 may determine the coding unit 1420b located at the center by determining the locations of the coding units 1420a through 1420c based on information indicating locations of upper left samples 1430a through 1430c of the coding units 1420a trough 1420c.

According to an embodiment, the information indicating the locations of the upper left samples 1430a through 1430c respectively included in the coding units 1420a through 1420c may include information about locations or coordinates in a picture of the coding units 1420a through 1420c. According to an embodiment, the information indicating the locations of the upper left samples 1430a through 1430c respectively included in the coding units 1420a through 1420c may include information indicating widths or heights of the coding nits 1420a through 1420c included in the current coding unit 1400, wherein the widths or heights may correspond to information indicating differences between coordinates in the picture of the coding units 1420a through 1420c. In other words, the image decoding device 100 may determine the coding unit 1420b located at the center by directly using the information about the locations or coordinates in the picture of the coding units 1420a through 1420c, or by using the information about the widths or heights of the coding units, which indicate difference values between coordinates.

According to an embodiment, the information indicating the location of the upper left sample 1430a of the top coding unit 1420a may indicate (xa, ya) coordinates, information indicating the location of the upper left sample 1430b of the center coding unit 1420b may indicate (xb, yb) coordinates, and the information indicating the location of the upper left sample 1430c of the bottom coding unit 1420c may indicate (xc, yc) coordinates. The image decoding device 100 may determine the center coding unit 1420b by using the coordinates of the upper left samples 1430a through 1430c respectively included in the coding units 1420a through 1420c. For example, when the coordinates of the upper left samples 1430a through 1430c are aligned in an ascending order or descending order, the center coding unit 1420b including (xb, yb) that is coordinates of the upper left sample 1430b may be determined as a coding unit located at the center from among the coding units 1420a through 1420c determined when the current coding unit 1400 is split. Here, the coordinates indicating the locations of the upper left samples 1430a through 1430c may indicate coordinates indicating absolute locations in the picture, and further, may use (dxb, dyb) coordinates that are information indicating a relative location of the upper left sample 1430b of the center coding unit 1420b and (dxc, dyc) coordinates that are information indicating a relative location of the upper left sample 1430c of the bottom coding unit 1420c, based on the location of the upper left sample 1430c of the top coding unit 1420a. Also, a method of determining a coding unit at a predetermined location by using coordinates of a sample included in a coding unit as information indicating a location of the sample should not be limitedly interpreted to the above method, and may be interpreted to various arithmetic methods capable of using coordinates of a sample.

According to an embodiment, the image decoding device 100 may split the current coding unit 1400 into the plurality of coding units 1420a through 1420c, and select a coding unit from among the coding units 1420a through 1420c according to a predetermined criterion. For example, the image decoding device 100 may select the coding unit 1420b that has a different size from among the coding units 1420a through 1420c.

According to an embodiment, the image decoding device 100 may determine the width or height of each of the coding units 1420a through 1420c by using the (xa, ya) coordinates that are the information indicating the location of the upper left sample 1430a of the top coding unit 1420a, the (xb, yb) coordinates that are the information indicating the location of the upper left sample 1430b of the center coding unit 1420b, and the (xc, yc) coordinates that are the information indicating the location of the upper left sample 1430c of the bottom coding unit 1420c. The image decoding device 100 may determine a size of each of the coding units 1420a through 1420c by using the coordinates (xa, ya), (xb, yb), and (xc, yc) indicating the locations of the coding units 1420a through 1420c.

According to an embodiment, the image decoding device 100 may determine the width of the top coding unit 1420a to xb-xa and the height to yb-ya. According to an embodiment, the image decoding device 100 may determine the width of the center coding unit 1420b to xc-xb and the height to yc-yb. According to an embodiment, the image decoding device 100 may determine the width or height of the bottom coding unit by using the width or height of the current coding unit, and the width and height of the top coding unit 1420a and the center coding unit 1420b. The image decoding device 100 may determine one coding unit having a size different from other coding units based on the determined widths and heights of the coding units 1420a through 1420c. Referring to FIG. 14, the image decoding device 100 may determine, as the coding unit at the predetermined location, the center coding unit 1420b having a size different from sizes of the top coding unit 1420a and the bottom coding unit 1420c. However, since a process of determining, by the image decoding device 100, a coding unit having a size different from other coding units is only an embodiment of determining a coding unit at a predetermined location by using sizes of coding units determined based on sample coordinates, various processes of determining a coding unit at a predetermined location by comparing sizes of coding units determined according to predetermined sample coordinates may be used.

However, a location of a sample considered to determine a location of a coding unit should not be limitedly interpreted to the upper left, but may be interpreted that information about a location of an arbitrary sample included in a coding unit is usable.

According to an embodiment, the image decoding device 100 may select a coding unit at a predetermined location from among an odd number of coding units that are determined when a current coding unit is split, in consideration of a shape of the current coding unit. For example, when the current coding unit has a non-square shape in which a width is longer than a height, the image decoding device 100 may determine the coding unit at the predetermined location along a horizontal direction. In other words, the image decoding device 100 may determine a coding unit from among coding units having different locations in the horizontal direction, and set a limitation on the coding unit. When the current coding unit has the non-square shape in which the height is longer than the width, the image decoding device 100 may determine the coding unit at the predetermined location along a vertical direction. In other words, the image decoding device 100 may determine a coding unit from among coding units having different locations in the vertical direction, and set a limitation on the coding unit.

According to an embodiment, the image decoding device 100 may use information indicating a location of each of an even number of coding units in order to determine a coding unit at a predetermined location from among the even number of coding units. The image decoding device 100 may determine the even number of coding units by splitting a current coding unit, and determine the coding unit at the predetermined location by using the information about the locations of the even number of coding units. Detailed processes thereof may be similar to processes of determining a coding unit at a predetermined location (for example, a center location) from among an odd number of coding units, which have been described above with reference to FIG. 14, and thus descriptions thereof are not provided again.

According to an embodiment, when a current coding unit having a non-square shape is split into a plurality of coding units, predetermined information about a coding unit at a predetermined location may be used during a split process in order to determine the coding unit at the predetermined location from among the plurality of coding units. For example, the image decoding device 100 of the image decoding device 100 may use at least one of block shape information and split shape information, which are stored in a sample included in a center coding unit during a split process in order to determine a coding unit located at the center from among a plurality of coding units obtained by splitting a current coding unit.

Referring to FIG. 14, the image decoding device 100 may split the current coding unit 1400 into the plurality of coding units 1420a through 1420c based on at least one of block shape information and split shape information, and determine the coding unit 1420b located at the center from among the plurality of coding units 1420a through 1420c. In addition, the image decoding device 100 may determine the coding unit 1420b located at the center in consideration of a location where at least one of the block shape information and the split shape information is obtained. In other words, at least one of the block shape information and the split shape information of the current coding unit 1400 may be obtained from the sample 1440 located at the center of the current coding unit 1400, and when the current coding unit 1400 is split into the plurality of coding units 1420a through 1420c based on at least one of the block shape information and the split shape information, the coding unit 1420b including the sample 1440 may be determined as the coding unit located at the center. However, information used to determine a coding unit located at the center should not be limitedly interpreted to at least one of block shape information and split shape information, and various types of information may be used during a process of determining a coding unit located at the center.

According to an embodiment, predetermined information for identifying a coding unit at a predetermined location may be obtained from a predetermined sample included in a coding unit to be determined. Referring to FIG. 14, the image decoding device 100 may use at least one of block shape information and split shape information obtained from a sample located at a predetermined location in the current coding unit 1400 (for example, a sample located at the center of the current coding unit 1400) in order to determine a coding unit at a predetermined location from among the plurality of coding units 1420a through 1420c determined when the current coding unit 1400 is split (for example, a coding unit located at the center from among the plurality of coding units). In other words, the image decoding device 100 may determine the sample at the predetermined location in consideration of a block shape of the current coding unit 1400, and the image decoding device 100 may determine and set a predetermined limitation on the coding unit 1420b including the sample from which predetermined location (for example, at least one of the block shape information and the split shape information) is obtained, from among the plurality of coding units 1420a through 1420c determined when the current coding unit 1400 is split. Referring to FIG. 14, according to an embodiment, the image decoding device 100 may determine the sample 1440 located at the center of the current coding unit 1400, as the sample from which the predetermined information is obtained, and the image decoding device 100 may set the predetermined location during a decoding process, on the coding unit 1420b including the sample 1440. However, a location of a sample from which predetermined information is obtained should not be limitedly interpreted to the above location, and the sample may be interpreted to samples at arbitrary locations included in the coding unit 1420 determined to be limited.

According to an embodiment, a location of a sample from which predetermined location is obtained may be determined based on a shape of the current coding unit 1400. According to an embodiment, block shape information may be used to determine whether a shape of a current coding unit is a square or a non-square, and a location of a sample from which predetermined information is obtained may be determined based on the shape. For example, the image decoding device 100 may determine, as a sample from which predetermined information is obtained, a sample located on a boundary of splitting at least one of a width and a height of a current coding unit into halves by using at least one of information about the width of the current coding unit and information about the height of the current coding unit. As another example, when block shape information about a current coding unit indicates a non-square shape, the image decoding device 100 may determine, as a sample from which predetermined information is obtained, one of samples adjacent to a boundary of splitting a longer side of the current coding unit into halves.

According to an embodiment, when a current coding unit is split into a plurality of coding units, the image decoding device 100 may use at least one of block shape information and split shape information in order to determine a coding unit at a predetermined location from among the plurality of coding units. According to an embodiment, the image decoding device 100 may obtain at least one of the block shape information and the split shape information from a sample at a predetermined location included in the coding unit, and the image decoding device 100 may split the plurality of coding units generated when the current coding unit is split by using at least one of the split shape information and the block shape information obtained from the sample at the predetermined location included in each of the plurality of coding units. In other words, the coding unit may be recursively split by using at least one of the block shape information and the split shape information obtained from the sample at the predetermined location in each coding unit. Since a recursive split process of a coding unit has been described above with reference to FIG. 13, details thereof are not provided again.

According to an embodiment, the image decoding device 100 may determine at least one coding unit by splitting a current coding unit, and determine an order of decoding the at least one coding unit according to a predetermined block (for example, a current coding unit).

FIG. 15 illustrates an order of processing a plurality of coding units when the image decoding device 100 determines the plurality of coding units by splitting a current coding unit, according to an embodiment.

According to an embodiment, the image decoding device 100 may determine, according to block shape information and split shape information, second coding units 1510a and 1510b by splitting a first coding unit 1500 in a vertical direction, second coding units 1530a and 1530b by splitting the first coding unit 1500 in a horizontal direction, or second coding units 1550a through 1550d by splitting the first coding unit 1500 in vertical and horizontal directions.

Referring to FIG. 15, the image decoding device 100 may determine an order such that the second coding units 1510a and 1510b determined by splitting the first coding unit 1500 in the vertical direction to be processed in a horizontal direction 1510c. The image decoding device 100 may determine a processing order of the second coding units 1530a and 1530b determined by splitting the first coding unit 1500 in the horizontal direction to be in a vertical direction 1530c. The image decoding device 100 may determine the second coding units 1550a through 1550d determined by splitting the first coding unit 1500 in the vertical and horizontal directions to be processed according to a predetermined order (for example, a raster scan order or a z-scan order 1550e) in which coding units in one row are processed and then coding units in a next row are processed.

According to an embodiment, the image decoding device 100 may recursively split coding units. Referring to FIG. 15, the image decoding device 100 may determine a plurality of coding units 1510a, 1510b, 1530a, 1530b, 1550a, 1550b, 1550c, and 1550d by splitting the first coding unit 1500, and recursively split each of the determined plurality of coding units 1510a, 1510b, 1530a, 1530b, 1550a, 1550b, 1550c, and 1550d. A method of splitting the plurality of coding units 1510a, 1510b, 1530a, 1530b, 1550a, 1550b, 1550c, and 1550d may be similar to a method of splitting the first coding unit 1500. Accordingly, the plurality of coding units 1510a, 1510b, 1530a, 1530b, 1550a, 1550b, 1550c, and 1550d may each be independently split into a plurality of coding units. Referring to FIG. 15, the image decoding device 100 may determine the second coding units 1510a and 1510b by splitting the first coding unit 1500 in the vertical direction, and also, may determine to split or not to split each of the second coding units 1510a and 1510b independently.

According to an embodiment, the image decoding device 100 may split the left second coding unit 1510a in the horizontal direction to obtain third coding units 1520a and 1520b, and may not split the right second coding unit 1510b.

According to an embodiment, a processing order of coding units may be determined based on a split process of coding units. In other words, a processing order of split coding units may be determined based on a processing order of coding units before being split. The image decoding device 100 may determine an order of processing the third coding units 1520a and 1520b determined when the left second coding unit 1510a is split independently from the right second coding unit 1510b. Since the third coding units 1520a and 1520b are determined when the left second coding unit 1510a is split in the horizontal direction, the third coding units 1520a and 1520b may be processed in a vertical direction 1520c. Also, since the order of processing the left second coding unit 1510a and the right second coding unit 1510b is in the horizontal direction 1510c, the third coding units 1520a and 1520b included in the left second coding unit 1510a may be processed in the vertical direction 1520c and then the right second coding unit 1510b may be processed. Since the above description is for describing a process of determining a processing order according to coding units before being split, the process should not be limitedly interpreted to the above embodiments, and various methods of independently processing coding units split and determined in various shapes according to a predetermined order may be used.

FIG. 16 illustrates a process of determining, by the image decoding device 100, that a current coding unit is split into an odd number of coding units when coding units are unable to be processed in a predetermined order, according to an embodiment.

According to an embodiment, the image decoding device 100 may determine that the current coding unit is split into the odd number of coding units based on obtained block shape information and split shape information. Referring to FIG. 16, a first coding unit 1600 having a square shape may be split into second coding units 1610a and 1610b having non-square shapes, and the second coding units 1610a and 1610b may be independently split into third coding units 1620a through 1620e. According to an embodiment, the image decoding device 100 may determine a plurality of the third coding units 1620a and 1620b by splitting the left coding unit 1610a from among the second coding units in a horizontal direction, and the right coding unit 1610b may be split into an odd number of the third coding units 1620c through 1620e.

According to an embodiment, the image decoding device 100 may determine whether a coding unit split into an odd number exists by determining whether the third coding units 1620a through 1620e are processable in a predetermined order. Referring to FIG. 16, the image decoding device 100 may determine the third coding units 1620a through 1620e by recursively splitting the first coding unit 1600. The image decoding device 100 may determine, based on at least one of block shape information and split shape information, whether there is a coding unit split into an odd number from among the first coding unit 1600, the second coding units 1610a and 1610b, and the third coding units 1620a through 1620e. For example, a coding unit located at the right from among the second coding units 1610a and 1610b may be split into the odd number of third coding units 1620c through 1620e. An order of processing a plurality of coding units included in the first coding unit 1600 may be a predetermined order 1630 (for example, a z-scan order), and the image decoding device 100 may determine whether the third coding units 1620c through 1620e determined when the right second coding unit 1610b is split into an odd number satisfy a condition of being processable according to the predetermined order.

According to an embodiment, the image decoding device 100 may determine whether the third coding units 1620a through 1620e included in the first coding unit 1600 satisfy a condition of being processable according to a predetermined order, wherein the condition is related to whether at least one of a width and a height of the second coding units 1610a and 1610b is split into halves along boundaries of the third coding units 1620a through 1620e. For example, the third coding units 1620a and 1620b that are determined when the left second coding unit 1610a having a non-square shape is split into halves satisfy the condition, but the third coding units 1620c through 1620e do not satisfy the condition since the boundaries of the third coding units 1620c through 1620e that are determined when the right second coding unit 1610b is split into three coding units are unable to split a width or height of the right second coding unit 1610b into halves. Also, the image decoding device 100 may determine disconnection of a scan order when the condition is dissatisfied, and determine that the right second coding unit 1610b is split into an odd number of coding units based on the determination result. According to an embodiment, when a coding unit is split into an odd number of coding units, the image decoding device 100 may set a predetermined limitation on a coding unit at a predetermined location from among the coding units, and since details about the limitation or the predetermined location have been described above through various embodiments, details thereof are not provided again.

Figure 17:
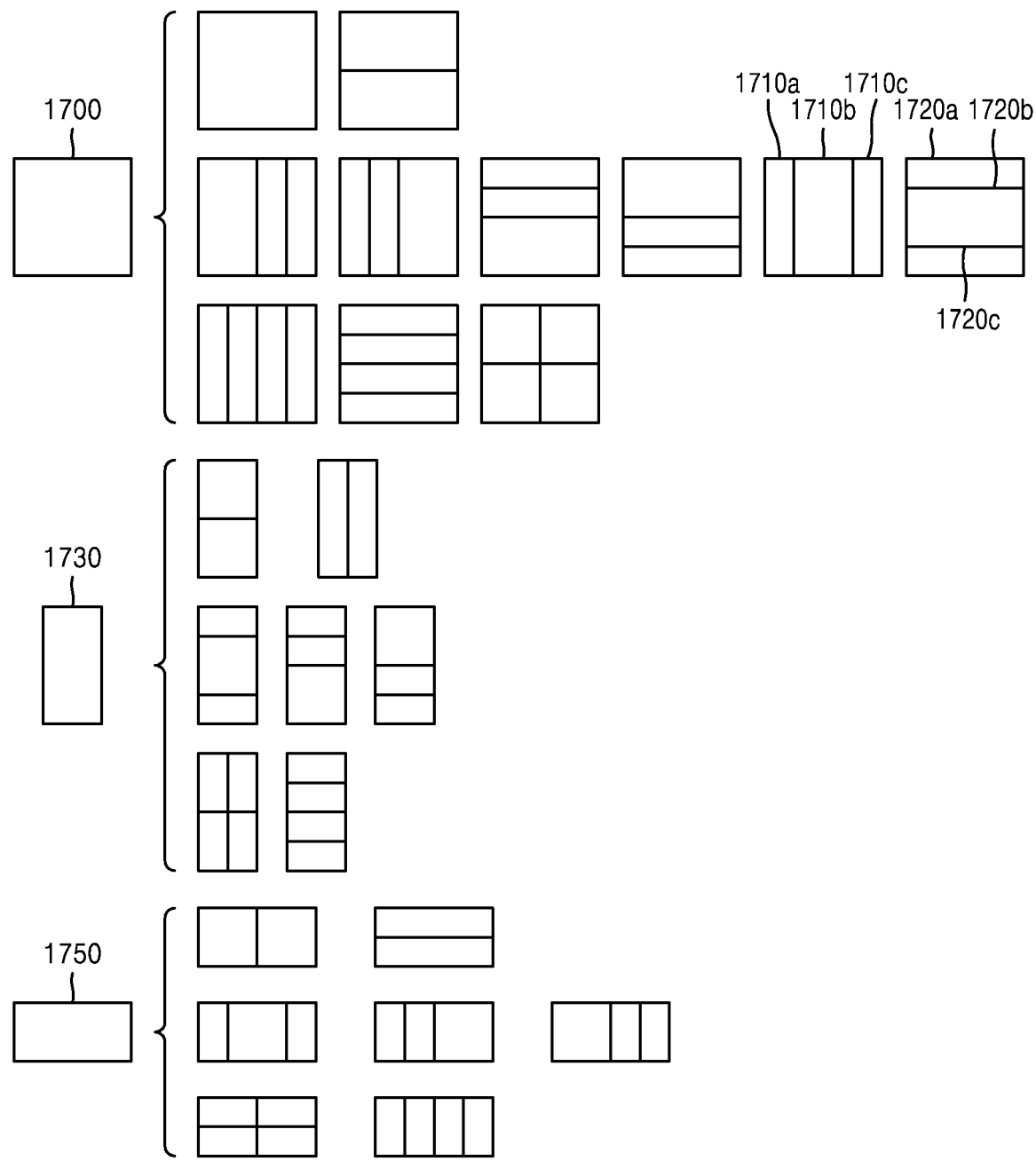
FIG. 17 illustrates a process of determining at least one coding unit when a first coding unit is split, according to an embodiment.

FIG. 17 illustrates a process of determining, by the image decoding device 100, at least one coding unit when a first coding unit 1700 is split, according to an embodiment.

According to an embodiment, the image decoding device 100 may split the first coding unit 1700 based on at least one of block shape information and split shape information obtained through the bitstream obtainer 110. The first coding unit 1700 having a square shape may be split into four coding units having square shapes or non-square shapes. For example, referring to FIG. 17, when block shape information indicates that the first coding unit 1700 is a square and split shape information indicates that the first coding unit 1700 is split into non-square coding units, the image decoding device 100 may split the first coding unit 1700 into a plurality of non-square coding units. In detail, when the split shape information indicates that the first coding unit 1700 is split into a horizontal or vertical direction to determine an odd number of coding units, the image decoding device 100 may split the first coding unit 1700 having a square shape into, as the odd number of coding units, second coding units 1710a through 1710c determined when the first coding unit 1700 is split in the vertical direction, or second coding units 1720a through 1720c determined when the first coding unit 1700 is split in the horizontal direction.

According to an embodiment, the image decoding device 100 may determine whether the second coding units 1710a through 1710c and 1720a through 1720c included in the first coding unit 1700 satisfy a condition of being processable according to a predetermined order, wherein the condition is related to whether at least one of the width and the height of the first coding unit 1700 is split into halves along the boundaries of the second coding units 1710a through 1710c and 1720a through 1720c. Referring to FIG. 17, since the boundaries of the second coding units 1710a through 1710c determined when the first coding unit 1700 having a square shape is split in the vertical direction are unable to split the width of the first coding unit 1700 into halves, it may be determined that the first coding unit 1700 does not satisfy the condition of being processable according to the predetermined order. Also, since the boundaries of the second coding units 1720a through 1720c determined when the first coding unit 1700 having a square shape is split in the horizontal direction are unable to split the width of the first coding unit 1700 into halves, it may be determined that the first coding unit 1700 does not satisfy the condition of being processable according to the predetermined order. When the condition is dissatisfied, the image decoding device 100 determines disconnection of a scan order and may determine that the first coding unit 1700 is split into an odd number of coding units based on the determination result. According to an embodiment, when a coding unit is split into an odd number of coding units, the image decoding device 100 may set a predetermined limitation on a coding unit at a predetermined location from among the coding units, and since details about the limitation or the predetermined location have been described above through various embodiments, details thereof are not provided again.

According to an embodiment, the image decoding device 100 may determine coding units having various shapes by splitting a first coding unit.

Referring to FIG. 17, the image decoding device 100 may split the first coding unit 1700 having a square shape and a first coding unit 1730 or 1750 having a non-square shape into coding units having various shapes.

Figure 18:
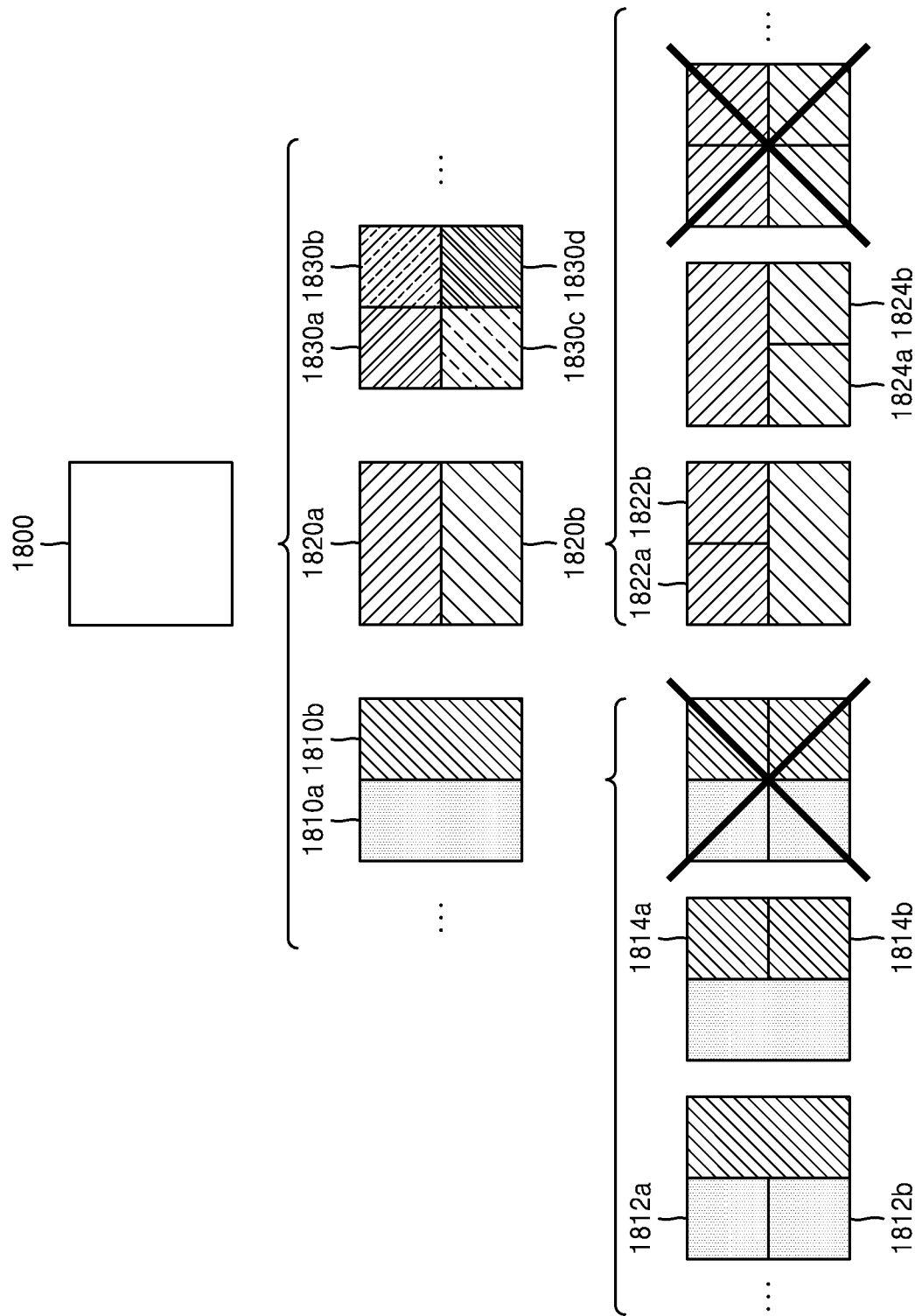
FIG. 18 illustrates that a shape of a second coding unit that is splittable is limited when the second coding unit having a non-square shape, which is determined when a first coding unit is split, satisfies a predetermined condition, according to an embodiment.

FIG. 18 illustrates that a shape of a second coding unit that is splittable is limited by the image decoding device 100 when the second coding unit having a non-square shape, which is determined when a first coding unit 1800 is split, satisfies a predetermined condition, according to an embodiment.

According to an embodiment, the image decoding device 100 may determine, based on at least one of block shape information and split shape information obtained through the receiver 110, to split the first coding unit 1800 having a square shape into second coding units 1810a, 1810b, 1820a, and 1820b having non-square shapes. The second coding units 1810a, 1810b, 1820a, and 1820b may be independently split. Accordingly, the image decoding device 100 may determine to split or not to split the second coding units 1810a, 1810b, 1820a, and 1820b based on at least one of block shape information and split shape information related to each of the second coding units 1810a, 1810b, 1820a, and 1820b. According to an embodiment, the image decoding device 100 may determine third coding units 1812a and 1812b by splitting the left second coding unit 1810a having a non-square shape and determined when the first coding unit 1800 is split in a vertical direction. However, when the left second coding unit 1810a is split in a horizontal direction, the image decoding device 100 may limit the right second coding unit 1810b not to be split in the horizontal direction like a direction in which the left second coding unit 1810a is split. When the right second coding unit 1810b is split in the same direction and third coding units 1814a and 1814b are determined, the third coding units 1812a, 1812b, 1814a, and 18014b may be determined when the left second coding unit 1810a and the right second coding unit 1810b are independently split in the horizontal direction. However, this is the same result as the image decoding device 100 splitting the first coding unit 1000 into four second coding nits 1830a through 1830d having square shapes based on at least one of block shape information and split shape information, and thus may be inefficient in terms of image decoding.

According to an embodiment, the image decoding device 100 may determine third coding units 1822a, 1822b, 1824a, and 1824b by splitting the second coding units 1820a or 1820b having a non-square shape and determined when the first coding unit 1800 is split in the horizontal direction. However, when one of second coding units (for example, the top second coding unit 1820a) is split in the vertical direction, the image decoding device 100 may limit the other second coding unit (for example, the bottom second coding unit 1820b) not to be split in the vertical direction like a direction in which the top second coding unit 1820a is split based on the above reasons.

Figure 19:
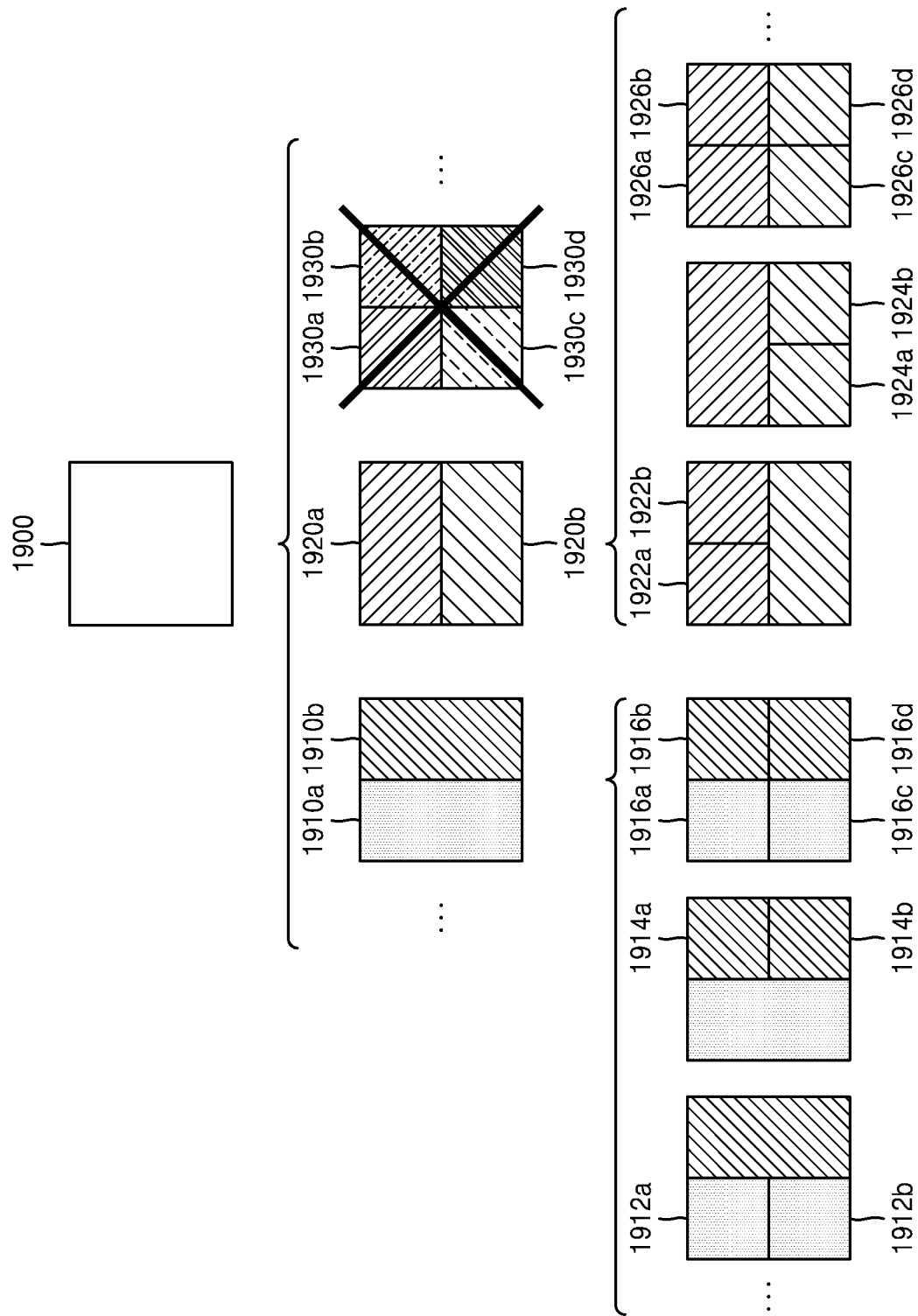
FIG. 19 illustrates a process of splitting a coding unit having a square shape when split shape information does not indicate splitting of the coding unit into four coding units having square shapes, according to an embodiment.

FIG. 19 illustrates a process of splitting, by the image decoding device 100, a coding unit having a square shape when split shape information does not indicate splitting of the coding unit into four coding units having square shapes, according to an embodiment.

According to an embodiment, the image decoding device 100 may determine second coding units 1910a, 1910b, 1920a, 1920b, and so on by splitting a first coding unit 1900 based on at least one of block shape information and split shape information. The split shape information may include information about various shapes into which a coding unit is splittable, but sometimes, the information about various shapes may not include information for splitting a coding unit into four square coding units. According to such split shape information, the image decoding device 100 is unable to split the first coding unit 1900 having a square shape into four square second coding units 1930a through 1930d. Based on the split shape information, the image decoding device 100 may determine the second coding units 1910a, 1910b, 1920a, 1920b, and so on having non-square shapes.

According to an embodiment, the image decoding device 100 may independently split the second coding units 1910a, 1910b, 1920a, 1920b, and so on having non-square shapes. Each of the second coding units 1910a, 1910b, 1920a, 1920b, and so on may be split in a predetermined order through a recursive method that may correspond to a method of splitting the first coding unit 1900 based on at least one of block shape information and split shape information.

For example, the image decoding device 100 may determine third coding units 1912a and 1912b having square shapes by splitting the left second coding unit 1910a in a horizontal direction and determine third coding units 1914a and 1914b having square shapes by splitting the right second coding unit 1910b in a horizontal direction. Also, the image decoding device 100 may determine third coding units 1916a through 1916d having square shapes by splitting both the left second coding unit 1910a and the right second coding unit 1910b in the horizontal direction. In this case, coding units may be determined in the same manner in which the first coding unit 1910 is split into the four square second coding units 1930a through 1930d.

As another example, the image decoding device 100 may determine third coding units 1922a and 1922b having square shapes by splitting the top second coding unit 1920a in the vertical direction and determine third coding units 1924a and 1924b having square shapes by splitting the bottom second coding unit 1920b in the vertical direction. Also, the image decoding device 100 may determine third coding units 1922a, 1922b, 1924a, and 1924b having square shapes by splitting both the top second coding unit 1920a and the bottom second coding unit 1920b in the vertical direction. In this case, coding units may be determined in the same manner in which the first coding unit 1910 is split into the four square second coding units 1930a through 1930d.

FIG. 20 illustrates that a processing order between a plurality of coding units may be changed according to a split process of a coding unit, according to an embodiment.

According to an embodiment, the image decoding device 100 may split a first coding unit 2000 based on block shape information and split shape information. When the block shape information indicates a square shape and the split shape information indicates that the first coding unit 2000 is split in at least one of a horizontal direction and a vertical direction, the image decoding device 100 may split the first coding unit 2000 to determine second coding units (for example, second coding units 2010a, 2010b, 2020a, 2020b, 2030a, 2030b, 2030c, 2030d, and so on). Referring to FIG. 20, the second coding units 2010a, 2010b, 2020a, and 2020b having non-square shapes and determined when the first coding unit 2000 is split only in the horizontal or vertical direction may each be independently split based on block shape information and split shape information about each of the second coding units 2010a, 2010b, 2020a, and 2020b. For example, the image decoding device 100 may determine third coding units 2016a through 2016d by splitting the second coding units 2010a and 2010b in the horizontal direction, wherein the second coding units 2010a and 2010b are generated when the first coding unit 2000 is split in the vertical direction, and may determine third coding units 2026a through 2026d by splitting the second coding units 2020a and 2020b in the horizontal direction, wherein the second coding units 2020a and 2020b are generated when the first coding unit 2000 is split in the horizontal direction. Since split processes of the second coding units 2010a, 2010b, 2020a, and 2020b have been described with reference to FIG. 19, details thereof are not provided again.

According to an embodiment, the image decoding device 100 may process coding units according to a predetermined order. Since characteristics about processing of coding units according to a predetermined order have been described above with reference to FIG. 15, details thereof are not provided again. Referring to FIG. 20, the image decoding device 100 may determine four square third coding units 2016a through 2016d or 2026a through 2026d by splitting the first coding unit 2000 having a square shape. According to an embodiment, the image decoding device 100 may determine a processing order of the third coding units 2016a through 2016d or 2026a through 2026d according to a shape of the first coding unit 2000 being split.

According to an embodiment, the image decoding device 100 may determine the third coding units 2016a through 2016d by splitting each of the second coding units 2010a through 2010b in the horizontal direction, wherein the second coding units 2010a and 2010b are generated when the first coding unit 2000 is split in the vertical direction, and the image decoding device 100 may process the third coding units 2016a through 2016d according to an order 2017 of first processing the third coding units 2016a and 2016b included in the left second coding unit 2010a in the vertical direction and then processing the third coding units 2016c and 2016d included in the right second coding unit 2010b in the vertical direction.

According to an embodiment, the image decoding device 100 may determine the second coding units 2026a through 2026d by splitting each of the second coding units 2020a and 2020b in the vertical direction, wherein the second coding units 2020a and 2020b are generated when the first coding unit 2000 is split in the horizontal direction, and the image decoding device 100 may process the third coding units 2026a through 2026d according to an order of first processing the third coding units 2026a and 2026b included in the top second coding unit 2020a in the horizontal direction and then processing the third coding units 2026c and 2026d included in the bottom second coding unit 2020b in the horizontal direction.

Referring to FIG. 20, the third coding units 2016a through 2016d and 2026a through 2026d having square shapes may be determined when each of the second coding units 2010a, 2010b, 2020a, and 2020b are split. The second coding units 2010a and 2010b determined when the first coding unit 2000 is split in the vertical direction and the second coding units 2020a and 2020b determined when the first coding unit 2000 is split in the horizontal direction have different shapes, but according to the third coding units 2016a through 2016d and 2026a through 2026d determined thereafter, the first coding unit 2000 is split into coding units having the same shapes. Accordingly, even when coding units having the same shapes are determined as a result by recursively splitting coding units through different processes based on at least one of block shape information and split shape information, the image decoding device 100 may process the coding units having the same shapes in different orders.

FIG. 21 illustrates a process of determining a depth of a coding unit when a shape and size of the coding unit changes, when a plurality of coding units are determined when the coding unit is recursively split, according to an embodiment.

According to an embodiment, the image decoding device 100 may determine a depth of a coding unit according to a predetermined criterion. For example, the predetermined criterion may be a length of a longer side of the coding unit. When a length of a longer side of a coding unit before being split is 2n times a length of a longer side of a current coding unit, wherein n>0, the image decoding device 100 may determine that a depth of the current coding unit is higher than a depth of the coding unit before being split by n. Hereinafter, a coding unit having a higher depth will be referred to as a coding unit of a lower depth.

Referring to FIG. 21, according to an embodiment, the image decoding device 100 may determine a second coding unit 2102 and a third coding unit 2104 of lower depths by splitting a first coding unit 2100 having a square shape, based on block shape information indicating a square shape (for example, block shape information may indicate '0: SQUARE'). When a size of the first coding unit 2100 having a square shape is 2N×2N, the second coding unit 2102 determined by splitting a width and a height of the first coding unit 2100 by 1/2^1 may have a size of N×N. Also, the third coding unit 2104 determined by splitting a width and a height of the second coding unit 2102 by 1/2 may have a size of N/2×N/2. In this case, a width and a height of the third coding unit 2104 correspond to 1/2^1 times those of the first coding unit 2100. When a depth of the first coding unit 2100 is D, a depth of the second coding unit 2102, which is 1/2^2 times the width and height of the first coding unit 2100, may be D+1, and a depth of the third coding unit 2104, which is 1/2^2 times the width and height of the first coding unit 2100, may be D+2.

According to an embodiment, the image decoding device 100 may determine a second coding unit 2112 or 2122 and a third coding unit 2114 or 2124 of lower depths by splitting a first coding unit 2110 or 2120 having a non-square shape, based on block shape information indicating a non-square shape (for example, the block shape information may indicate '1: NS_VER' indicating that a height is longer than a width or indicate '2: NS_HOR' indicating that a width is longer than a height).

The image decoding device 100 may determine second coding units (for example, the second coding units 2102, 2112, 2122, and so on) by splitting at least one of the width and the height of the first coding unit 2110 having a size of N×2N. In other words, the image decoding device 100 may determine the second coding unit 2102 having a size of N×N or the second coding unit 2122 having a size of N×N/2 by splitting the first coding unit 2110 in a horizontal direction, or determine the second coding unit 2112 having a size of N/2×N by splitting the first coding unit 2110 in horizontal and vertical directions.

According to an embodiment, the image decoding device 100 may determine the second coding units (for example, the second coding units 2102, 2112, 2122, and so on) by splitting at least one of the width and the height of the first coding unit 2120 having a size of 2N×N. In other words, the image decoding device 100 may determine the second coding unit 2102 having a size of N×N or the second coding unit 2112 having a size of N/2×N by splitting the first coding unit 2120 in the vertical direction, or determine the second coding unit 2122 having a size of N×N/2 by splitting the first coding unit 2120 in the horizontal and vertical directions.

According to an embodiment, the image decoding device 100 may determine third coding units (for example, the third coding nits 2104, 2114, 2124, and so on) by splitting at least one of a width and a height of the second coding unit 2102 having a size of N×N. In other words, the image decoding device 100 may determine the third coding unit 2104 having a size of N/2×N/2, the third coding unit 2114 having a size of N/2^2×N/2, or the third coding unit 2124 having a size of N/2×N/2^2 by splitting the second coding unit 2102 in vertical and horizontal directions.

According to an embodiment, the image decoding device 100 may determine the third coding units (for example, the third coding units 2104, 2114, 2124, and so on) by splitting at least one of a width and a height of the second coding unit 2112 having a size of N/2×N. In other words, the image decoding device 100 may determine the third coding unit 2104 having a size of N/2×N/2 or the third coding unit 2124 having a size of N/2×N/2^2 by splitting the second coding unit 2112 in a horizontal direction, or determine the third coding unit 2114 having a size of N/2^×N/2 by splitting the second coding unit 2112 in vertical and horizontal directions.

According to an embodiment, the image decoding device 100 may determine the third coding units (for example, the third coding units 2104, 2114, 2124, and so on) by splitting at least one of a width and a height of the second coding unit 2114 having a size of N×N/2. In other words, the image decoding device 100 may determine the third coding unit 2104 having a size of N/2×N/2 or the third coding unit 2114 having a size of N/2^2×N/2 by splitting the second coding unit 2112 in a vertical direction, or determine the third coding unit 2124 having a size of N/2×N/2^2 by splitting the second coding unit 2112 in vertical and horizontal directions.

According to an embodiment, the image decoding device 100 may split coding units having square shapes (for example, the first coding units 2100, 2102, and 2104) in a horizontal or vertical direction. For example, the first coding unit 2100 having a size of 2N×2N may be split in the vertical direction to determine the first coding unit 2110 having a size of N×2N or in the horizontal direction to determine the first coding unit 2120 having a size of 2N×N. According to an embodiment, when a depth is determined based on a length of a longest side of a coding unit, a depth of a coding unit determined when the first coding unit 2100 having a size of 2N×2N is split in the horizontal or vertical direction may be the same as a depth of the first coding unit 2100.

According to an embodiment, the width and height of the third coding unit 2114 or 2124 may be 1/2^2 times the first coding unit 2110 or 2120. When the depth of the first coding unit 2110 or 2120 is D, the depth of the second coding unit 2112 or 2114, which is 1/2 times the width and height of the first coding unit 2110 or 2120, may be D+1, and the depth of the third coding unit 2114 or 2124, which is 1/2^2 times the width and height of the first coding unit 2110 or 2120, may be D+2.

Figure 22:
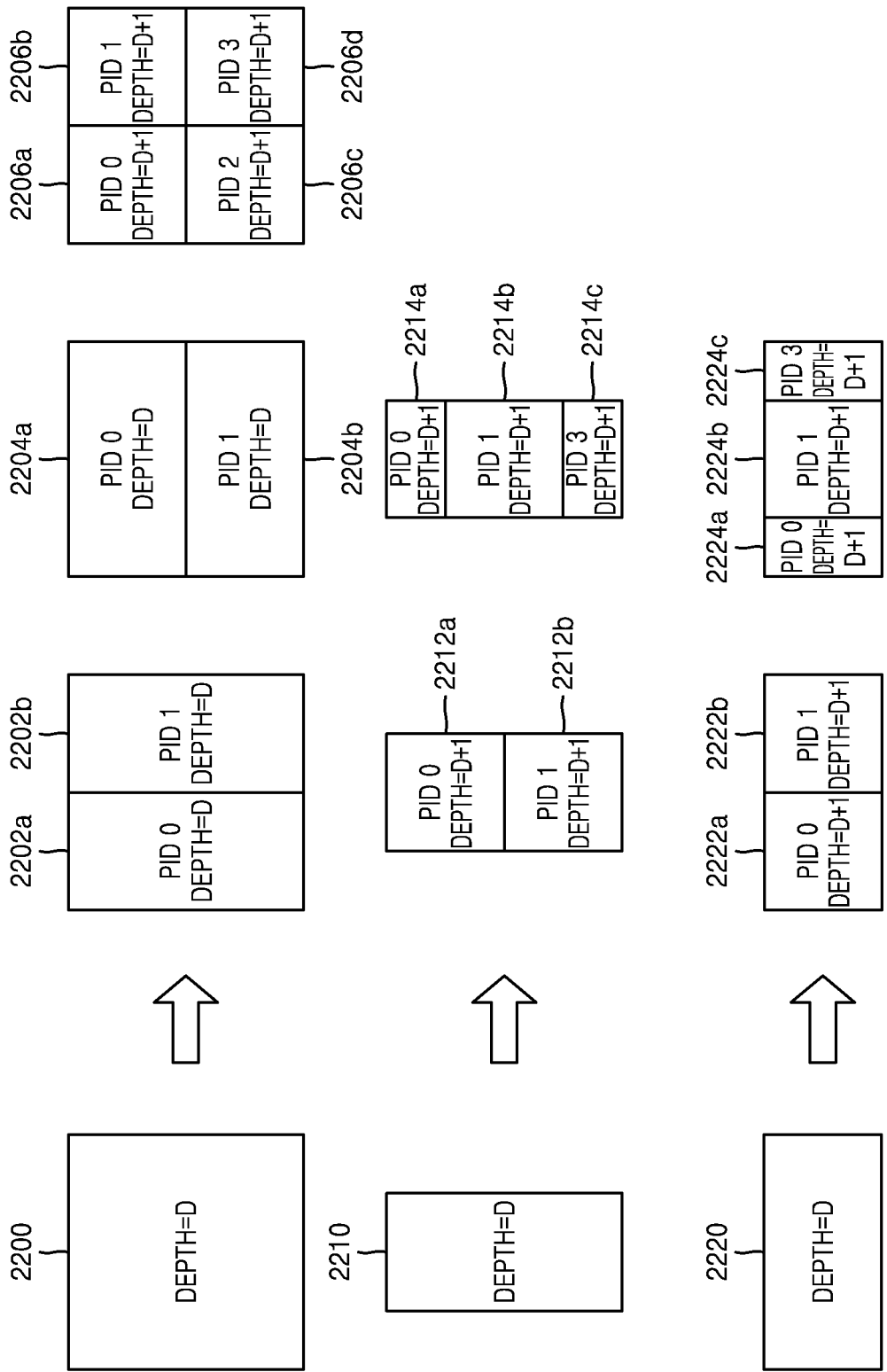
FIG. 22 illustrates a depth determinable according to shapes and sizes of coding units, and a part index (PID) for distinguishing the coding units, according to an embodiment.

FIG. 22 illustrates a depth determinable according to shapes and sizes of coding units, and a part index (PID) for distinguishing the coding units, according to an embodiment.

According to an embodiment, the image decoding device 100 may determine second coding units having various shapes by splitting a first coding unit 2200 having a square shape. Referring to FIG. 22, the image decoding device 100 may determine second coding units 2202a, 2202b, 2204a, 2204b, 2206a, 2206b, 2206c, and 2206d by splitting the first coding unit 2200 in at least one of a vertical direction and a horizontal direction, according to split shape information. In other words, the image decoding device 100 may determine the second coding units 2202a, 2202b, 2204a, 2204b, 2206a, 2206b, 2206c, and 2206d based on split shape information about the first coding unit 2200.

According to an embodiment, depths of the second coding units 2202a, 2202b, 2204a, 2204b, 2206a, 2206b, 2206c, and 2206d determined according to the split shape information about the first coding unit 2200 having a square shape may be determined based on lengths of longer sides. For example, since lengths of longer sides of the second coding units 2202a, 2202b, 2204a, and 2204b having non-square shapes are the same as a length of one side of the first coding unit 2200 having a square shape, depths of the first coding unit 2200 and the second coding units 2202a, 2202b, 2204a, and 2204b having non-square shapes may be D, i.e., the same. On the other hand, when the image decoding device 100 split the first coding unit 2200 into the four second coding units 2206a through 2206d having square shapes based on split shape information, since a length of one side of each of the second coding units 2206a through 2206d having square shapes is 1/2 of a length of one side of the first coding unit 2200, depths of the second coding units 2206a through 2206d may be D+1, i.e., one depth lower than the depth D of the first coding unit 2200.

According to an embodiment, the image decoding device 100 may split a first coding unit 2210 having a height longer than a width into a plurality of second coding units 2212a and 2212b, or 2214a, 2214b, and 2214c by splitting the first coding unit 2210 in a horizontal direction according to split shape information. According to an embodiment, the image decoding device 100 may split a first coding unit 2220 having a width longer than a height into a plurality of second coding units 2222a and 2222b, or 2224a, 2224b, and 2224c by splitting the first coding unit 2220 in a vertical direction according to split shape information.

According to an embodiment, depths of the second coding units 2212a, 2212b, 2214a, 2214b, 2216a, 2216b, 2216c, and 2216d determined according to the split shape information about the first coding unit 2210 or 2220 having a non-square shape may be determined based on lengths of longer sides. For example, since a length of one side of each of the second coding units 2212a and 2212b having square shapes is 1/2 of a length of one side of the first coding unit 2210 having a non-square shape in which a height is longer than a width, the depths of the second coding units 2202a, 2202b, 2204a, and 2204b having square shapes are D+1, i.e., one depth lower than the depth D of the first coding unit 2210 having a non-square shape.

Also, the image decoding device 100 may split the first coding unit 2210 having a non-square shape into an odd number of the second coding units 2214a through 2214c based on split shape information. The odd number of second coding units 2214a through 2214c may include the second coding units 2214a and 2214c having non-square shapes and the second coding unit 2214b having a square shape. Here, since lengths of longer sides of the second coding units 2214a and 2214c having non-square shapes and a length of one side of the second coding unit 2214b having a square shape are 1/2 of a length of one side of the first coding unit 2210, depths of the second coding units 2214a through 2214c may be D+1, i.e., one depth lower than the depth D of the first coding unit 2210. The image decoding device 100 may determine depths of coding units related to the first coding unit 2220 having a non-square shape in which a width is longer than a height in the similar manner as depths of coding units related to the first coding unit 2210 are determined.

According to an embodiment, while determining PIDs for distinguishing coding units, the image decoding device 100 may determine the PIDs based on size ratios between the coding units when an odd number of the coding units do not have the same size. Referring to FIG. 22, the coding unit 2214b located at the center of the odd number of coding units 2214a through 2214c has the same width as the coding units 2214a and 2214c, but has a height twice higher than heights of the coding units 2214a and 2214c. In this case, the coding unit 2214b located at the center may include two of each of the coding units 2214a and 2214c. Accordingly, when a PID of the coding unit 2214b located at the center according to a scan order is 1, a PID of the coding unit 2214c located in a next order may be increased by 2, i.e., 3. In other words, values of PIDs may be discontinuous. According to an embodiment, the image decoding device 100 may determine whether an odd number of coding units have the same size based on discontinuity of PIDs for distinguishing the coding units.

According to an embodiment, the image decoding device 100 may determine whether a plurality of coding units determined when a current coding unit is split have certain split shapes based on values of PIDs for distinguishing the coding units. Referring to FIG. 22, the image decoding device 100 may determine an even number of the coding units 2212a and 2212b or an odd number of the coding units 2214a through 2214c by splitting the first coding unit 2210 having a rectangular shape in which a height is longer than a width. The image decoding device 100 may use an ID indicating each coding unit in order to distinguish a plurality of coding units. According to an embodiment, the PID may be obtained from a sample at a predetermined location (for example, an upper left sample) of each coding unit.

According to an embodiment, the image decoding device 100 may determine a coding unit at a predetermined location from among coding units determined via split, by using PIDs for distinguishing the coding units. According to an embodiment, when split shape information about the first coding unit 2210 having a rectangular shape in which a height is longer than a width indicates split into three coding units, the image decoding device 100 may split the first coding unit 2210 into the three coding units 2214a through 2214c. The image decoding device 100 may allocate a PID to each of the three coding units 2214a through 2214c. The image decoding device 100 may compare PIDs of coding units in order to determine a center coding unit from among an odd number of coding units. The image decoding device 100 may determine the coding unit 2214b having a PID corresponding to a center value from among PIDs as a coding unit located at the center from among coding units determined when the first coding unit 2210 is split, based on PIDs of the coding units. According to an embodiment, the image decoding device 100 may determine PIDs based on size ratios between coding units when the coding units do not have the same size, while determining the PIDs for distinguishing the coding units. Referring to FIG. 22, the coding unit 2214b generated when the first coding unit 2210 is split may have the same width as the coding units 2214a and 2214c, but may have a height twice higher than heights of the coding units 2214a and 2214c. In this case, when the PID of the coding unit 2214b located at the center is 1, the PID of the coding unit 2214c located in a next order may be increased by 2, i.e., 3. As such, when an increase range changes while PIDs are uniformly increasing, the image decoding device 100 may determine that a coding unit is split into a plurality of coding units including a coding unit having a different size from other coding units. According to an embodiment, when split shape information indicates split into an odd number of coding units, the image decoding device 100 may split a current coding unit into an odd number of coding units in which a coding unit at a predetermined location (for example, a center coding unit) has a different size from other coding units. In this case, the image decoding device 100 may determine the center coding unit having the different size by using PIDs of the coding units. However, since the PID, and a size or location of a coding unit at a predetermined location are specified to describe an embodiment, and thus an embodiment is not limited thereto, and various PIDs, and various locations and sizes of a coding unit may be used.

According to an embodiment, the image decoding device 100 may use a predetermined data unit from which a coding unit starts to be recursively split.

Figure 23:
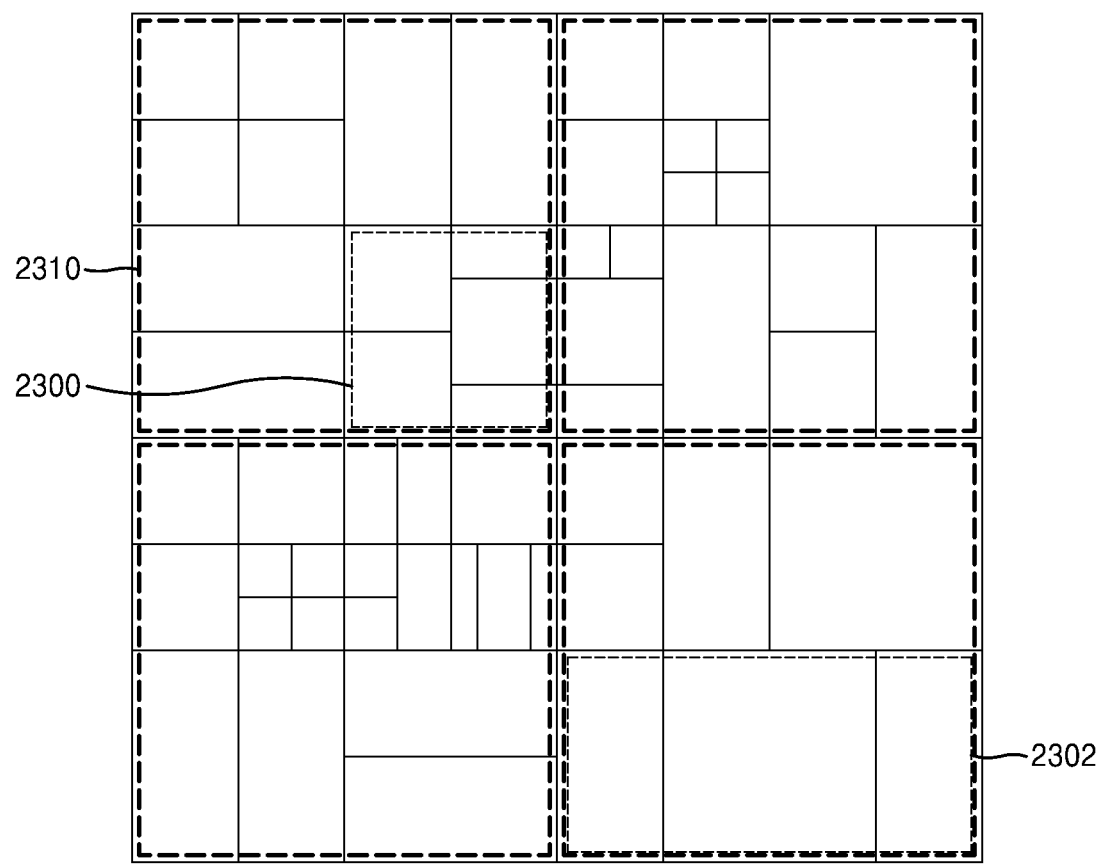
FIG. 23 illustrates that a plurality of coding units are determined according to a plurality of predetermined data units included in a picture, according to an embodiment.

FIG. 23 illustrates that a plurality of coding units are determined according to a plurality of predetermined data units included in a picture, according to an embodiment.

According to an embodiment, a predetermined data unit may be defined as a data unit from which a coding unit starts to be recursively split by using at least one of block shape information and split shape information. In other words, the predetermined data unit may correspond to a coding unit of an uppermost depth used while determining a plurality of coding units splitting a current picture. Hereinafter, for convenience of description, such a predetermined data unit is referred to as a reference data unit.

According to an embodiment, a reference data unit may indicate a predetermined size and shape. According to an embodiment, a reference coding unit may include M×N samples. Here, M and N may be the same, and may be an integer expressed as a multiple of 2. In other words, a reference data unit may indicate a square shape or a non-square shape, and may later be split into an integer number of coding units.

According to an embodiment, the image decoding device 100 may split a current picture into a plurality of reference data units. According to an embodiment, the image decoding device 100 may split the plurality of reference data units obtained by splitting the current picture by using split information about each of the reference data units. Split processes of such reference data units may correspond to split processes using a quad-tree structure.

According to an embodiment, the image decoding device 100 may pre-determine a smallest size available for the reference data unit included in the current picture. Accordingly, the image decoding device 100 may determine the reference data unit having various sizes that are equal to or larger than the smallest size, and determine at least one coding unit based on the determined reference data unit by using block shape information and split shape information.

Referring to FIG. 23, the image decoding device 100 may use a reference coding unit 2300 having a square shape, or may use a reference coding unit 2302 having a non-square shape. According to an embodiment, a shape and size of a reference coding unit may be determined according to various data units (for example, a sequence, a picture, a slice, a slice segment, and a largest coding unit) that may include at least one reference coding unit.

According to an embodiment, the receiver 110 of the image decoding device 100 may obtain, from a bitstream, at least one of information about a shape of a reference coding unit and information about a size of the reference coding unit, according to the various data units. Processes of determining at least one coding unit included in the reference coding unit 2300 having a square shape have been described above through processes of splitting the current coding unit 300 of FIG. 11, and processes of determining at least one coding unit included in the reference coding unit 2300 having a non-square shape have been described above through processes of splitting the current coding unit 400 or 450 of FIG. 12, and thus details thereof are not provided again.

According to an embodiment, in order to determine a size and shape of a reference coding unit according to some data units pre-determined based on a predetermined condition, the image decoding device 100 may use a PID for distinguishing the reference coding unit. In other words, the receiver 110 may obtain, from a bitstream, only a PID for distinguishing a size and shape of a reference coding unit as a data unit satisfying a predetermined condition (for example, a data unit having a size equal to or smaller than a slice) from among various data units (for example, a sequence, a picture, a slice, a slice segment, and a largest coding unit), according to slices, slice segments, and largest coding units. The image decoding device 100 may determine the size and shape of the reference data unit according to data units that satisfy the predetermined condition, by using the PID. When information about a shape of a reference coding unit and information about a size of a reference coding unit are obtained from a bitstream and used according to data units having relatively small sizes, usage efficiency of the bitstream may not be sufficient, and thus instead of directly obtaining the information about the shape of the reference coding unit and the information about the size of the reference coding unit, only a PID may be obtained and used. In this case, at least one of the size and the shape of the reference coding unit related to the PID indicating the size and shape of the reference coding unit may be pre-determined. In other words, the image decoding device 100 may select at least one of the pre-determined size and shape of the reference coding unit according to the PID so as to determine at least one of the size and shape of the reference coding unit included in a data unit that is a criterion for obtaining the PID.

According to an embodiment, the image decoding device 100 may use at least one reference coding unit included in one largest coding unit. In other words, a largest coding unit splitting an image may include at least one reference coding unit, and a coding unit may be determined when each of the reference coding unit is recursively split. According to an embodiment, at least one of a width and height of the largest coding unit may be an integer times at least one of a width and height of the reference coding unit. According to an embodiment, a size of a reference coding unit may be equal to a size of a largest coding unit, which is split n times according to a quad-tree structure. In other words, the image decoding device 100 may determine a reference coding unit by splitting a largest coding unit n times according to a quad-tree structure, and split the reference coding unit based on at least one of block shape information and split shape information according to various embodiments.

Figure 24:
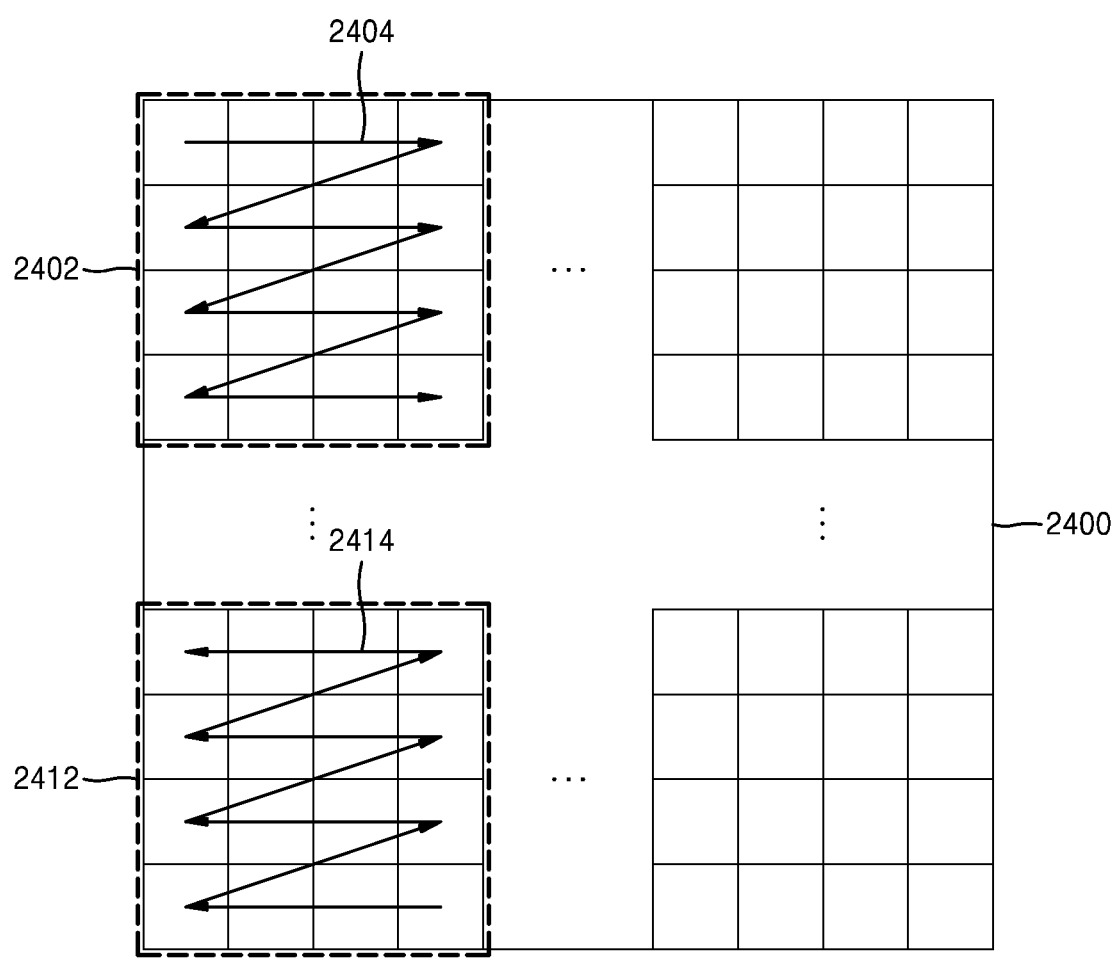
FIG. 24 illustrates a processing block that is a criterion in determining a determining order of a reference coding unit included in a picture, according to an embodiment.

FIG. 24 illustrates a processing block that is a criterion in determining a determining order of a reference coding unit included in a picture 2400, according to an embodiment.

According to an embodiment, the image decoding device 100 may determine at least one processing block splitting a picture. A processing block is a data unit including at least one reference coding unit splitting an image, and the at least one reference coding unit included in the processing block may be determined in a certain order. In other word, a determining order of the at least one reference coding unit determined in each processing block may correspond to one of various orders for determining a reference coding unit, and may vary according to processing blocks. A determining order of a reference coding unit determined per processing block may be one of various orders, such as a raster scan order, a Z-scan order, an N-scan order, an up-right diagonal scan order, a horizontal scan order, and a vertical scan order, but should not be limitedly interpreted by the scan orders.

According to an embodiment, the image decoding device 100 may determine a size of at least one processing block included in an image by obtaining information about a size of a processing block. The image decoding device 100 may obtain, from a bitstream, the information about a size of a processing block to determine the size of the at least one processing block included in the image. The size of the processing block may be a predetermined size of a data unit indicated by the information about a size of a processing block.

According to an embodiment, the receiver 110 of the image decoding device 100 may obtain, from the bitstream, the information about a size of a processing block according to certain data units. For example, the information about a size of a processing block may be obtained from the bitstream in data units of images, sequences, pictures, slices, and slice segments. In other words, the receiver 110 may obtain, from the bitstream, the information about a size of a processing block according to such several data units, and the image decoding device 100 may determine the size of at least one processing block splitting the picture by using the obtained information about a size of a processing block, wherein the size of the processing block may be an integer times a size of a reference coding unit.

According to an embodiment, the image decoding device 100 may determine sizes of processing blocks 2402 and 2412 included in the picture 2400. For example, the image decoding device 100 may determine a size of a processing block based on information about a size of a processing block, the information obtained from a bitstream. Referring to FIG. 24, the image decoding device 100 may determine horizontal sizes of the processing blocks 2402 and 2412 to be four times a horizontal size of a reference coding unit, and a vertical size thereof to be four times a vertical size of the reference coding unit, according to an embodiment. The image decoding device 100 may determine a determining order of at least one reference coding unit in at least one processing block.

According to an embodiment, the image decoding device 100 may determine each of the processing blocks 2402 and 2412 included in the picture 2400 based on a size of a processing block and may determine a determining order of at least one reference coding unit included in each of the processing blocks 2402 and 2412. According to an embodiment, determining of a reference coding unit may include determining of a size of the reference coding unit.

According to an embodiment, the image decoding device 100 may obtain, from a bitstream, information about a determining order of at least one reference coding unit included in at least one processing block, and determine the determining order of the at least one reference coding unit based on the obtained information. The information about a determining order may be defined as an order or direction of determining reference coding units in a processing block. In other words, an order of determining reference coding units may be independently determined per processing block.

According to an embodiment, the image decoding device 100 may obtain, from a bitstream, information about a determining order of a reference coding unit according to certain data units. For example, the bitstream obtainer 110 may obtain, from the bitstream, the information about a determining order of a reference coding unit according to data units, such as images, sequences, pictures, slices, slice segments, and processing blocks. Since the information about a determining order of a reference coding unit indicates a determining order of a reference coding unit in a processing block, the information about a determining order may be obtained per certain data unit including an integer number of processing blocks.

According to an embodiment, the image decoding device 100 may determine at least one reference coding unit based on the determined order.

According to an embodiment, the receiver 110 may obtain, from the bitstream, information about a determining order of a reference coding unit, as information related to the processing blocks 2402 and 2412, and the image decoding device 100 may determine an order of determining at least one reference coding unit included in the processing blocks 2402 and 2412 and determine at least one reference coding unit included in the picture 2400 according to a determining order of a coding unit. Referring to FIG. 24, the image decoding device 100 may determine determining orders 2404 and 2414 of at least one reference coding unit respectively related to the processing blocks 2402 and 2412. For example, when information about a determining order of a reference coding unit is obtained per processing block, determining orders of a reference coding unit related to the processing blocks 2402 and 2412 may be different from each other. When the determining order 2404 related to the processing block 2402 is a raster scan order, reference coding units included in the processing block 2402 may be determined according to the raster scan order. On the other hand, when the determining order 2414 related to the processing block 2412 is an inverse order of a raster scan order, reference coding units included in the processing block 2412 may be determined in the inverse order of the raster scan order.

The image decoding device 100 may decode determined at least one reference coding unit, according to an embodiment. The image decoding device 100 may decode an image based on reference coding units determined through above embodiments. Examples of a method of decoding a reference coding unit may include various methods of decoding an image.

According to an embodiment, the image decoding device 100 may obtain, from a bitstream, and use block shape information indicating a shape of a current coding unit or split shape information indicating a method of splitting the current coding unit. The block shape information or the split shape information may be included in a bitstream related to various data units. For example, the image decoding device 100 may use the block shape information or split shape information, which is included in a sequence parameter set, a picture parameter set, a video parameter set, a slice header, and a slice segment header. Also, the image decoding device 100 may obtain, from a bitstream, and use syntax related to the block shape information or the split shape information, according to largest coding units, reference coding units, and processing blocks.

While this disclosure has been particularly shown and described with reference to embodiments thereof, it will be understood by those of ordinary skill in the art that various changes in form and details may be made therein without departing from the spirit and scope of the disclosure as defined by the appended claims. The embodiments should be considered in a descriptive sense only and not for purposes of limitation. Therefore, the scope of the disclosure is defined not by the detailed description of the disclosure but by the appended claims, and all differences within the scope will be construed as being included in the present disclosure.

The embodiments of the present disclosure may be written as computer programs and may be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), etc.

The invention claimed is:

1. An image decoding method comprising:
   receiving a bitstream;
   obtaining a predicted quantization parameter value and a quantized transformation coefficient of a current block from the bitstream;
   obtaining a differential quantization parameter of the current block based on statistical information of samples reconstructed previously to the current block;
   obtaining a quantization parameter of the current block based on the differential quantization parameter of the current block and the predicted quantization parameter value; and
   inversely quantizing the quantized transformation coefficient of the current block based on the quantization parameter of the current block,
   wherein the obtaining of the differential quantization parameter of the current block further comprises:
      obtaining first statistical information of the previously reconstructed samples, the first statistical information being used to obtain the differential quantization parameter of the current block;
      obtaining a plurality of predetermined first differential quantization parameters respectively corresponding to a plurality of sample ranges;
      obtaining the differential quantization parameter of the current block corresponding to the first statistical information of the previously reconstructed samples, among the plurality of predetermined first differential quantization parameters;
      obtaining a plurality of second differential quantization parameters by changing some of the plurality of predetermined first differential quantization parameters when second statistical information of the previously reconstructed samples is lower than a first threshold value;
      obtaining a plurality of third differential quantization parameters by changing some of the plurality of predetermined first differential quantization parameters when the second statistical information of the previously reconstructed samples is higher than or equal to the first threshold value; and
      obtaining the differential quantization parameter of the current block corresponding to the first statistical information of the previously reconstructed samples, among the plurality of second differential quantization parameters or the plurality of third differential quantization parameters, and
   wherein the plurality of second differential quantization parameters corresponding to a sample range lower than a second threshold value are lower than or equal to the plurality of predetermined first differential quantization parameters corresponding to the sample range lower than the second threshold value,
   wherein the plurality of third differential quantization parameters corresponding to a sample range higher than or equal to the second threshold value are lower than or equal to the plurality of predetermined first differential quantization parameters corresponding to the sample range higher than or equal to the second threshold value, and
   wherein each of the first statistical information and the second statistical information of the previously reconstructed samples comprises at least one of an average, a media, a maximum value, and a minimum value of the previously reconstructed samples.

2. The image decoding method of claim 1, wherein the obtaining of the differential quantization parameter of the current block further comprises:
   obtaining a plurality of fourth differential quantization parameters by changing some of the plurality of predetermined first differential quantization parameters when the second statistical information of the previously reconstructed samples is lower than the first threshold value and third statistical information of the previously reconstructed samples is lower than a third threshold value;
   obtaining a plurality of fifth differential quantization parameters by changing some of the plurality of predetermined first differential quantization parameters when the second statistical information of the previously reconstructed samples is higher than or equal to the first threshold value and the third statistical information of the previously reconstructed samples is lower than the third threshold value;
   obtaining a plurality of sixth differential quantization parameters by changing some of the plurality of predetermined first differential quantization parameters when the second statistical information of the previously reconstructed samples is lower than the first threshold value and the third statistical information of the previously reconstructed samples is higher than or equal to the third threshold value;
   obtaining a plurality of seventh differential quantization parameters by changing some of the plurality of predetermined first differential quantization parameters when the second statistical information of the previously reconstructed samples is higher than or equal to the first threshold value and the third statistical information of the previously reconstructed samples is higher than or equal to the third threshold value; and obtaining the differential quantization parameter of the current block corresponding to the first statistical information of the previously reconstructed samples, among the plurality of fourth, fifth, sixth, or seventh differential quantization parameters, wherein the pluralities of fourth and sixth differential quantization parameters corresponding to a sample range lower than the second threshold value are lower than or equal to the plurality of predetermined first differential quantization parameters corresponding to the sample range lower than the second threshold value, wherein the pluralities of fifth and seventh differential quantization parameters corresponding to a sample range higher than or equal to the second threshold value are lower than or equal to the plurality of predetermined first differential quantization parameters corresponding to the sample range higher than or equal to the second threshold value, and wherein the third statistical information comprises at least one of a variance and a standard deviation of the previously reconstructed samples.

3. The image decoding method of claim 2, wherein the plurality of fourth differential quantization parameters corresponding to the sample range lower than the second threshold value are lower than or equal to the pluralities of fifth, sixth, and seventh differential quantization parameters corresponding to the sample range lower than the second threshold value, and wherein the plurality of fifth differential quantization parameters corresponding to the sample range higher than or equal to the second threshold value are lower than or equal to the pluralities of fourth, sixth, and seventh differential quantization parameters corresponding to the sample range higher than or equal to the second threshold value.

4. An image decoding device comprising:

at least one processor configured to receive a bitstream, to obtain a predicted quantization parameter value and a quantized transformation coefficient of a current block from the bitstream, to obtain a differential quantization parameter of the current block based on statistical information of samples reconstructed previously to the current block, to obtain a quantization parameter of the current block based on the differential quantization parameter of the current block and the predicted quantization parameter value, and to inversely quantize the quantized transformation coefficient of the current block based on the quantization parameter of the current block, wherein, when the at least one processor obtains the differential quantization parameter of the current block, the at least one processor is further configured to:

obtain first statistical information of the previously reconstructed samples, the first statistical information being used to obtain the differential quantization parameter of the current block, obtain a plurality of predetermined first differential quantization parameters respectively corresponding to a plurality of sample ranges, obtain the differential quantization parameter of the current block corresponding to the first statistical information of the previously reconstructed samples, among the plurality of predetermined first differential, obtain a plurality of second differential quantization parameters by changing some of the plurality of predetermined first differential quantization parameters when second statistical information of the previously reconstructed samples is lower than a first threshold value, obtain a plurality of third differential quantization parameters by changing some of the plurality of predetermined first differential quantization parameters when the second statistical information of the previously reconstructed samples is higher than or equal to the first threshold value, and obtain the differential quantization parameter of the current block corresponding to the first statistical information of the previously reconstructed samples, among the plurality of second differential quantization parameters or the plurality of third differential quantization parameters, wherein the plurality of second differential quantization parameters corresponding to a sample range lower than a second threshold value are lower than or equal to the plurality of predetermined first differential quantization parameters corresponding to the sample range lower than the second threshold value, wherein the plurality of third differential quantization parameters corresponding to a sample range higher than or equal to the second threshold value are lower than or equal to the plurality of predetermined first differential quantization parameters corresponding to the sample range higher than or equal to the second threshold value, and wherein each of the first statistical information and the second statistical information of the previously reconstructed samples comprises at least one of an average, a median, a maximum value, and a minimum value of the previously reconstructed samples.

5. The image decoding device of claim 4, wherein the at least one processor is further configured to obtain a plurality of fourth differential quantization parameters by changing some of the plurality of predetermined first differential quantization parameters when the second statistical information of the previously reconstructed samples is lower than the first threshold value and third statistical information of the previously reconstructed samples is lower than a third threshold value, obtain a plurality of fifth differential quantization parameters by changing some of the plurality of predetermined first differential quantization parameters when the second statistical information of the previously reconstructed samples is higher than or equal to the first threshold value and the third statistical information of the previously reconstructed samples is lower than the third threshold value, obtain a plurality of sixth differential quantization parameters by changing some of the plurality of predetermined first differential quantization parameters when the second statistical information of the previously reconstructed samples is lower than the first threshold value and the third statistical information of the previously reconstructed samples is higher than or equal to the third threshold value, obtain a plurality of seventh differential quantization parameters by changing some of the plurality of predetermined first differential quantization parameters when the second statistical information of the previously reconstructed samples is higher than or equal to the first threshold value and the third statistical information of the previously reconstructed samples is higher than or equal to the third threshold value, and obtain the differential quantization parameter of the current block corresponding to the first statistical information of the previously reconstructed samples, among the plurality of fourth, fifth, sixth, or seventh differential quantization parameters,
- wherein the pluralities of fourth and sixth differential quantization parameters corresponding to a sample range lower than the second threshold value are lower than or equal to the plurality of predetermined first differential quantization parameters corresponding to the sample range lower than the second threshold value,
- wherein the pluralities of fifth and seventh differential quantization parameters corresponding to a sample range higher than or equal to the second threshold value are lower than or equal to the plurality of predetermined first differential quantization parameters corresponding to the sample range higher than or equal to the second threshold value, and
- wherein the third statistical information comprises at least one of a variance and a standard deviation of the previously reconstructed samples.

6. The image decoding device of claim 5, wherein the plurality of fourth differential quantization parameters corresponding to the sample range lower than the second threshold value are lower than or equal to the pluralities of fifth to seventh differential quantization parameters corresponding to the sample range lower than the second threshold value, and
- wherein the plurality of fifth differential quantization parameters corresponding to the sample range higher than or equal to the second threshold value are lower than or equal to the pluralities of fourth, sixth, and seventh differential quantization parameters corresponding to the sample range higher than or equal to the second threshold value.

7. An image encoding method comprising:
- obtaining a predicted quantization parameter value of a current block;
- obtaining first statistical information of samples reconstructed previously to the current block;
- obtaining a plurality of predetermined first differential quantization parameters respectively corresponding to a plurality of sample ranges;
- obtaining a differential quantization parameter of the current block corresponding to the first statistical information of the previously reconstructed samples, among the plurality of predetermined first differential quantization parameters;
- quantizing a transformation coefficient of the current block based on the predicted quantization parameter value and the differential quantization parameter of the current block; and
- generating a bitstream based on the predicted quantization parameter value and the quantized transformation coefficient,
- wherein the obtaining of the differential quantization parameter of the current block further comprises:
  - obtaining a plurality of second differential quantization parameters by changing some of the plurality of predetermined first differential quantization parameters when second statistical information of the previously reconstructed samples is lower than a first threshold value;
  - obtaining a plurality of third differential quantization parameters by changing some of the plurality of predetermined first differential quantization parameters when the second statistical information of the previously reconstructed samples is higher than or equal to the first threshold value; and
  - obtaining the differential quantization parameter of the current block corresponding to the first statistical information of the previously reconstructed samples, among the plurality of second differential quantization parameters or the plurality of third differential quantization parameters, and
- wherein the plurality of second differential quantization parameters corresponding to a sample range lower than a second threshold value are lower than or equal to the plurality of predetermined first differential quantization parameters corresponding to the sample range lower than the second threshold value,
- wherein the plurality of third differential quantization parameters corresponding to a sample range higher than or equal to the second threshold value are lower than or equal to the plurality of predetermined first differential quantization parameters corresponding to the sample range higher than or equal to the second threshold value, and
- wherein each of the first statistical information and the second statistical information of the previously reconstructed samples comprises at least one of an average, a median, a maximum value, and a minimum value of the previously reconstructed samples.

8. An image encoding device comprising:
at least one processor configured to obtain a predicted quantization parameter value of a current block, to obtain first statistical information of samples reconstructed previously to the current block, to obtain a plurality of predetermined first differential quantization parameters respectively corresponding to a plurality of sample ranges, to obtain a differential quantization parameter of the current block corresponding to the first statistical information of the previously reconstructed samples, among the plurality of predetermined first differential quantization parameters, and quantize a transformation coefficient of the current block based on the predicted quantization parameter value and the differential quantization parameter of the current block,
to generate a bitstream based on the predicted quantization parameter value and the quantized transformation coefficient,
wherein, when the at least one processor obtains the differential quantization parameter of the current block, the at least one processor is further configured to:
- obtain a plurality of second differential quantization parameters by changing some of the plurality of predetermined first differential quantization parameters when second statistical information of the previously reconstructed samples is lower than a first threshold value,
- obtain a plurality of third differential quantization parameters by changing some of the plurality of predetermined first differential quantization parameters when the second statistical information of the previously reconstructed samples is higher than or equal to the first threshold value, and
- obtain the differential quantization parameter of the current block corresponding to the first statistical information of the previously reconstructed samples, among the plurality of second differential quantization parameters or the plurality of third differential quantization parameters, wherein the plurality of second differential quantization parameters corresponding to a sample range lower than a second threshold value are lower than or equal to the plurality of predetermined first differential quantization parameters corresponding to the sample range lower than the second threshold value, wherein the plurality of third differential quantization parameters corresponding to a sample range higher than or equal to the second threshold value are lower than or equal to the plurality of predetermined first differential quantization parameters corresponding to the sample range higher than or equal to the second threshold value, and wherein each of the first statistical information and the second statistical information of the previously reconstructed samples comprises at least one of an average, a median, a maximum value, and a minimum value of the previously reconstructed samples.

9. An image encoding method comprising:
obtaining a predicted quantization parameter value of a current block;
obtaining a plurality of predetermined first differential quantization parameters respectively corresponding to a plurality of sample ranges, based on a result of comparing second statistical information of original samples of the current block to a first threshold value;
obtaining a differential quantization parameter of the current block corresponding to first statistical information of the original samples of the current block, among the plurality of predetermined first differential quantization parameters;
quantizing a transformation coefficient of the current block based on the predicted quantization parameter value and the differential quantization parameter of the current block; and
generating a bitstream based on the predicted quantization parameter value, the differential quantization parameter of the current block, and the quantized transformation coefficient of the current block, wherein the obtaining of the differential quantization parameter of the current block further comprises:
obtaining a plurality of second differential quantization parameters by changing some of the plurality of predetermined first differential quantization parameters when second statistical information of the previously reconstructed samples is lower than the first threshold value;
obtaining a plurality of third differential quantization parameters by changing some of the plurality of predetermined first differential quantization parameters when the second statistical information of the previously reconstructed samples is higher than or equal to the first threshold value;
obtaining the differential quantization parameter of the current block corresponding to the first statistical information of the previously reconstructed samples, among the plurality of second differential quantization parameters or the plurality of third differential quantization parameters, wherein the plurality of second differential quantization parameters corresponding to a sample range lower than a second threshold value are lower than or equal to the plurality of predetermined first differential quantization parameters corresponding to the sample range lower than the second threshold value, wherein the plurality of third differential quantization parameters corresponding to a sample range higher than or equal to the second threshold value are lower than or equal to the plurality of predetermined first differential quantization parameters corresponding to the sample range higher than or equal to the second threshold value, and wherein each of the first statistical information and the second statistical information of the previously reconstructed samples comprises at least one of an average, a median, a maximum value, and a minimum value of the previously reconstructed samples.

* * * * *